(12) United States Patent
Zhang et al.

(10) Patent No.: US 11,871,404 B2
(45) Date of Patent: Jan. 9, 2024

(54) INTERFERENCE MITIGATION FOR WIRELESS COMMUNICATION

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 203 days.

(21) Appl. No.: 17/406,915

(22) Filed: Aug. 19, 2021

(65) Prior Publication Data

US 2022/0078817 A1 Mar. 10, 2022

Related U.S. Application Data

(60) Provisional application No. 63/074,967, filed on Sep. 4, 2020.

(51) Int. Cl.
| | |
|---|---|
| *H04W 72/1263* | (2023.01) |
| *H04W 72/0446* | (2023.01) |
| *H04L 27/26* | (2006.01) |
| *H04L 5/14* | (2006.01) |
| *H04W 72/0453* | (2023.01) |

(52) U.S. Cl.
CPC ......... *H04W 72/1263* (2013.01); *H04L 5/14* (2013.01); *H04L 27/2607* (2013.01); *H04L 27/26025* (2021.01); *H04W 72/0446* (2013.01); *H04W 72/0453* (2013.01)

(58) Field of Classification Search
CPC ......... H04W 72/1263; H04W 72/0446; H04W 72/0453; H04L 5/14; H04L 27/26025; H04L 27/2607
See application file for complete search history.

(56) References Cited

U.S. PATENT DOCUMENTS

| | | | |
|---|---|---|---|
| 2016/0233903 A1 | 8/2016 | Wu et al. | |
| 2016/0315754 A1 | 10/2016 | Wu et al. | |
| 2019/0089502 A1 | 3/2019 | Yi et al. | |
| 2019/0222411 A1* | 7/2019 | Xie | ............................ H04L 7/08 |

(Continued)

OTHER PUBLICATIONS

International Search Report and Written Opinion—PCT/US2021/046968—ISA/EPO—dated Dec. 14, 2021.

*Primary Examiner* — Chae S Lee
(74) *Attorney, Agent, or Firm* — Patterson + Sheridan, LLP

(57) ABSTRACT

Aspects relate to techniques for mitigating wireless communication interference. For example, one or more of a cyclic prefix length, a subcarrier spacing, a beam pair, or a frequency domain separation may be changed to mitigate the effects of inter-symbol interference (ISI) at a UE or a base station. A UE may measure a received timing difference between a time at which the UE receives a downlink transmission and a time at which energy from an uplink transmission by the UE is received by the UE. If this received timing difference exceeds a specified duration of time (e.g., the length of a cyclic prefix), the ISI at the UE may increase. In some examples, the interference mitigation techniques described herein may be invoked if there is an increase in the measured received timing difference.

30 Claims, 30 Drawing Sheets

(56) References Cited

U.S. PATENT DOCUMENTS

2019/0246402 A1* 8/2019 Negus .................. H04J 1/00
2020/0235980 A1   7/2020 John Wilson et al.
2022/0182160 A1* 6/2022 Su .................. H04L 27/2691

* cited by examiner

| Parameter/Numerology (μ) | 0 | 1 | 2 | 3 | 4 |
|---|---|---|---|---|---|
| Subcarrier Spacing (kHz) | 15 | 30 | 60 | 120 | 240 |
| OFDM Symbol Duration (μs) | 66.67 | 33.33 | 16.67 | 8.33 | 4.17 |
| Cyclic Prefix Duration (μs) | 4.69 | 2.34 | 1.17 | 0.57 | 0.29 |
| OFDM Symbol including CP (μs) | 71.35 | 35.68 | 17.84 | 8.29 | 4.46 |

FIG. 10

| $\Delta f = 2^\mu \times 15 \ [kHz]$ | Cyclic Prefix |
|---|---|---|
| 0 | 15 | Normal |
| 1 | 30 | Normal |
| 2 | 60 | Normal, Extended |
| 3 | 120 | Normal, Extended |
| 4 | 240 | Normal, Extended |

FIG. 11

INTERFERENCE MITIGATION FOR WIRELESS COMMUNICATION

CROSS-REFERENCE TO RELATED APPLICATION(S)

This application claims benefit of and priority to U.S. Provisional Patent Application Ser. No. 63/074,967, filed Sep. 4, 2020, herein incorporated by reference in its entirety as if fully set forth below and for all applicable purposes.

INTRODUCTION

Field of the Disclosure

The technology discussed below relates generally to wireless communication and, more particularly, to techniques for mitigating wireless communication interference.

DESCRIPTION OF RELATED ART

In wireless communication systems, such as those specified under standards for 5G New Radio (NR), a base station and user equipment (UE) exchange signals using various duplex modes. Duplex modes include half-duplex and full-duplex. In half-duplex communication, only one node (e.g., a UE or a base station) transmits at a time. In full-duplex communication, each node (e.g., a UE and a base station) can transmit at the same time. An example of half-duplex communication is time division duplex (TDD) communication. In 5G NR TDD, uplink signaling (e.g., from a UE to a base station) and downlink signaling (e.g., from the base station to the UE) are separately scheduled in time. Thus, uplink and downlink communications do not occur simultaneously. However, uplink and downlink communications may be transmitted on the same frequencies (e.g., on the same carrier). An example of full-duplex communication is frequency division duplex (FDD) communication. In 5G NR FDD, uplink signaling and downlink signaling are simultaneously scheduled in time. However, uplink and downlink may be transmitted at different frequencies (e.g., on different and spaced apart carriers).

In some examples, TDD may be used in full-duplex communication. For example, base stations and UEs that are each configured with two or more antenna panels may operate in so-called flexible TDD or full-duplex TDD (FD-TDD). An antenna panel includes an array of a plurality of antenna elements. The antenna panel may be referred to as an antenna array module. Antenna panels may be used in beamforming applications. Beamforming may be used to provide spatial diversity between receivers and transmitters. For example, a base station with two antenna panels may direct a transmit beam to a first UE and direct a receive beam toward a second UE, where the first and second UE are at different azimuths relative to the base station. The beams do not interfere with each other because they are directed toward targets that are separated from each other by some angular distance relative to the base station. In another example, a base station and a UE may each have two panels; one panel for transmission and a second panel for reception. Even though the two panels on each device are co-located, full-duplex simultaneous reception and transmission may be achieved in the full duplex-time division duplex (FD-TDD) mode through the use of these panels.

To provide service to a plurality of UEs at a plurality of distances from a base station, the timing between uplink and downlink frames for each UE may be managed. For example, a base station may compensate for propagation delay between the base station and each of the UEs by determining a respective timing advance for each of the UEs to utilize for uplink transmissions to the base station.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

The disclosure relates in some aspects to techniques for mitigating wireless communication interference (e.g., inter-symbol interference). For example, one or more of a cyclic prefix length, a subcarrier spacing, a beam pair, or a frequency domain separation may be changed to mitigate the effects of interference at a UE or a base station.

In certain aspects, the disclosure is directed to a user equipment (UE) configured for full-duplex (FD) wireless communication. In some examples, the UE includes a memory and a processor coupled to the memory. In some examples, the memory and the processor are configured to transmit, to a base station (BS), a request to modify one or more parameters for FD communication between the UE and one or more BSs including the BS based on the one or more parameters causing a difference in time to be greater than a threshold, the difference in time being between (i) a start of reception at the UE of an uplink transmission transmitted by the UE, and (ii) a start of reception at the UE of a downlink transmission from at least one of the one or more BSs, the uplink transmission and the downlink transmission corresponding to a same scheduled time resource. In some examples, the memory and the processor are configured to communicate with the one or more BSs using one or more modified parameters based on the request.

Certain aspects of the disclosure are directed to a base station (BS) configured for full-duplex (FD) wireless communication. In some examples, the BS includes a memory and a processor coupled to the memory. In some examples, the memory and the processor are configured to receive, from a user equipment (UE), a request to modify one or more parameters for FD communication between the UE and one or more BSs including the BS based on the one or more parameters causing a difference in time to be greater than a threshold, the difference in time being between (i) a start of reception at the UE of an uplink transmission transmitted by the UE, and (ii) a start of reception at the UE of a downlink transmission from at least one of the one or more BSs, the uplink transmission and the downlink transmission corresponding to a same scheduled time resource. In some examples, the memory and the processor are configured to one or more of: transmit, in response to the request, one or more modified parameters to another BS of the one or more BSs, the one or more modified parameters indicating a parameter for FD communication between the UE and the other BS; or communicate with the UE using the one or more modified parameters.

Certain aspects relate to a method of full-duplex (FD) wireless communication by a user equipment (UE). In some examples, the method includes transmitting, to a base station (BS), a request to modify one or more parameters for FD communication between the UE and one or more BSs including the BS based on the one or more parameters causing a difference in time to be greater than a threshold, the difference in time being between (i) a start of reception at the UE of an uplink transmission transmitted by the UE, and (ii) a start of reception at the UE of a downlink transmission from at least one of the one or more BSs, the uplink transmission and the downlink transmission corresponding to a same scheduled time resource. In some examples, the method includes communicating with the one or more BSs using one or more modified parameters based on the request.

Certain aspects relate to a method of full-duplex (FD) wireless communication by a base station (BS). In some examples, the method includes receiving, from a user equipment (UE), a request to modify one or more parameters for FD communication between the UE and one or more BSs including the BS based on the one or more parameters causing a difference in time to be greater than a threshold, the difference in time being between (i) a start of reception at the UE of an uplink transmission transmitted by the UE, and (ii) a start of reception at the UE of a downlink transmission from at least one of the one or more BSs, the uplink transmission and the downlink transmission corresponding to a same scheduled time resource. In some examples, the method includes one or more of: transmitting, in response to the request, one or more modified parameters to another BS of the one or more BSs, the one or more modified parameters indicating a parameter for FD communication between the UE and the other BS; or communicating with the UE using the one or more modified parameters.

Certain aspects relate to a non-transitory computer-readable medium having instructions stored thereon that, when executed by a user equipment (UE), cause the UE device to perform operations. In some examples, the operations include transmitting, to a base station (BS), a request to modify one or more parameters for FD communication between the UE and one or more BSs including the BS based on the one or more parameters causing a difference in time to be greater than a threshold, the difference in time being between (i) a start of reception at the UE of an uplink transmission transmitted by the UE, and (ii) a start of reception at the UE of a downlink transmission from at least one of the one or more BSs, the uplink transmission and the downlink transmission corresponding to a same scheduled time resource. In some examples, the operations include communicating with the one or more BSs using one or more modified parameters based on the request.

Certain aspects relate to a non-transitory computer-readable medium having instructions stored thereon that, when executed by a base station (BS), cause the BS to perform operations. In some examples, the operations include receiving, from a user equipment (UE), a request to modify one or more parameters for FD communication between the UE and one or more BSs including the BS based on the one or more parameters causing a difference in time to be greater than a threshold, the difference in time being between (i) a start of reception at the UE of an uplink transmission transmitted by the UE, and (ii) a start of reception at the UE of a downlink transmission from at least one of the one or more BSs, the uplink transmission and the downlink transmission corresponding to a same scheduled time resource. In some examples, the operations include one or more of: transmitting, in response to the request, one or more modified parameters to another BS of the one or more BSs, the one or more modified parameters indicating a parameter for FD communication between the UE and the other BS; or communicating with the UE using the one or more modified parameters.

Certain aspects relate to a user equipment (UE) for full-duplex (FD) wireless communication. In some examples, the apparatus includes means for transmitting, to a base station (BS), a request to modify one or more parameters for FD communication between the UE and one or more BSs including the BS based on the one or more parameters causing a difference in time to be greater than a threshold, the difference in time being between (i) a start of reception at the UE of an uplink transmission transmitted by the UE, and (ii) a start of reception at the UE of a downlink transmission from at least one of the one or more BSs, the uplink transmission and the downlink transmission corresponding to a same scheduled time resource. In some examples, the apparatus includes means for communicating with the one or more BSs using one or more modified parameters based on the request.

Certain aspects relate to a base station (BS) for full-duplex (FD) wireless communication. In some examples, the apparatus includes means for receiving, from a user equipment (UE), a request to modify one or more parameters for FD communication between the UE and one or more BSs including the BS based on the one or more parameters causing a difference in time to be greater than a threshold, the difference in time being between (i) a start of reception at the UE of an uplink transmission transmitted by the UE, and (ii) a start of reception at the UE of a downlink transmission from at least one of the one or more BSs, the uplink transmission and the downlink transmission corresponding to a same scheduled time resource. In some examples, the apparatus includes means for one or more of: transmitting, in response to the request, one or more modified parameters to another BS of the one or more BSs, the one or more modified parameters indicating a parameter for FD communication between the UE and the other BS; or communicating with the UE using the one or more modified parameters.

In some examples, a UE may measure a received timing difference between a time at which the UE receives a downlink transmission (e.g., at the second antenna panel) and a time at which energy from an uplink transmission by the UE is received by the UE (e.g., at the second antenna panel). If this received timing difference exceeds a particular length of time (e.g., the length of the cyclic prefix), the interference at the UE may increase. According to some aspects of the disclosure, the interference mitigation techniques described herein above may be employed whenever there is an increase in the received timing difference (e.g., the received timing difference exceeds a threshold specified by the base station).

In some examples, a UE and a base station may elect to use an extended cyclic prefix instead of a normal cyclic prefix. Here, since the extended cyclic prefix is longer than the normal cyclic prefix, a receiver of a transmission may be able to effectively decode a received transmission even when the measured received timing difference is longer than the normal cyclic prefix.

In 5G NR systems, the length of a cyclic prefix depends on the subcarrier spacing specified for a transmission. For example, the length of a cyclic prefix defined for a smaller subcarrier spacing (e.g., 15 kHz) is longer than the length of a cyclic prefix defined for a larger subcarrier spacing (e.g., 120 kHz).

In some examples, extended cyclic prefixes may be specified for various subcarrier spacings. For example, a normal extended cyclic prefix and an extended cyclic prefix may be defined for a subcarrier spacing of 120 kHz. As another example, a normal extended cyclic prefix and an extended cyclic prefix may be defined for a subcarrier spacing of 240 kHz. Extended cyclic prefixes may be used for other subcarrier spacings as well. By defining extended cyclic prefixes for larger subcarrier spacing (that generally have shorted cyclic prefixes), interference at a receiver may be reduced (e.g., for full-duplex transmission scenarios where the received timing difference is relatively large).

In some examples, full-duplex communication between a UE and a base station may be switched to a smaller subcarrier spacing to mitigate interference. By switching to a smaller subcarrier spacing (e.g., that generally has a longer cyclic prefix), interference at a receiver may be reduced (e.g., for full-duplex transmission scenarios where the received timing difference is relatively large).

In some examples, full-duplex communication between a UE and a base station may be switched from a first beam pair to a second beam pair to mitigate interference. For example, the second beam pair may provide a shorter received timing difference and/or lower interference (e.g., due to wider spatial separation between the beams).

In some examples, full-duplex communication between a UE and a base station may use a wider frequency domain separation to mitigate interference. For example, additional separation may be provided between a first frequency domain allocation for a first beam of a beam pair and a second frequency domain allocation for a second beam of a beam pair. By providing additional frequency separation, interference (e.g., leakage) may be reduced.

In some examples, a method of wireless communication at a user equipment may include determining that a first subcarrier spacing (SCS) for a first transmission is 120 kilohertz or 240 kilohertz, identifying an extended cyclic prefix (ECP) associated with the first SCS, and encoding or decoding the first transmission. The encoding or decoding the first transmission may be based on the ECP.

In some examples, a user equipment may include a transceiver, a memory, and a processor communicatively coupled to the transceiver and the memory. The processor and the memory may be configured to determine that a first subcarrier spacing (SCS) for a first transmission transmitted or received via the transceiver is 120 kilohertz or 240 kilohertz, identify an extended cyclic prefix (ECP) associated with the first SCS, and encode or decoding the first transmission. The encoding or decoding the first transmission may be based on the ECP.

In some examples, a user equipment may include means for determining that a first subcarrier spacing (SCS) for a first transmission is 120 kilohertz or 240 kilohertz, means for identifying an extended cyclic prefix (ECP) associated with the first SCS, and means for encoding or decoding the first transmission. The encoding or decoding the first transmission may be based on the ECP.

In some examples, an article of manufacture for use by a user equipment includes a computer-readable medium having stored therein instructions executable by one or more processors of the user equipment to determine that a first subcarrier spacing (SCS) for a first transmission is 120 kilohertz or 240 kilohertz, identify an extended cyclic prefix (ECP) associated with the first SCS, and encode or decoding the first transmission. The encoding or decoding the first transmission may be based on the ECP.

One or more of the following features may be applicable to any of the method, the apparatuses, and the computer-readable medium of the preceding paragraphs. The first transmission may be for a full-duplex communication between the user equipment and a base station. A timing difference may be measured between a first timing for a downlink transmission received at the user equipment and a second timing for an uplink transmission received at the user equipment. A determination may be made that the timing difference is greater than a length of a normal cyclic prefix (CP) for the first SCS. The ECP associated with the first SCS may be identified by selecting the ECP after determining that the timing difference is greater than the length of the normal CP for the first SCS.

In some examples, a method of wireless communication at a base station may include specifying that a first subcarrier spacing (SCS) for a first transmission is 120 kilohertz or 240 kilohertz, identifying an extended cyclic prefix (ECP) associated with the first SCS, and encoding or decoding the first transmission. The encoding or decoding the first transmission may be based on the ECP.

In some examples, a base station may include a transceiver, a memory, and a processor communicatively coupled to the transceiver and the memory. The processor and the memory may be configured to specify that a first subcarrier spacing (SCS) for a first transmission transmitted or received via the transceiver is 120 kilohertz or 240 kilohertz, identify an extended cyclic prefix (ECP) associated with the first SCS, and encode or decode the first transmission. The encoding or decoding the first transmission may be based on the ECP.

In some examples, a base station may include means for specifying that a first subcarrier spacing (SCS) for a first transmission is 120 kilohertz or 240 kilohertz, means for identifying an extended cyclic prefix (ECP) associated with the first SCS, and means for encoding or decoding the first transmission. The encoding or decoding the first transmission may be based on the ECP.

In some examples, an article of manufacture for use by a base station includes a computer-readable medium having stored therein instructions executable by one or more processors of the base station to specify that a first subcarrier spacing (SCS) for a first transmission is 120 kilohertz or 240 kilohertz, identify an extended cyclic prefix (ECP) associated with the first SCS, and encode or decode the first transmission. The encoding or decoding the first transmission may be based on the ECP.

One or more of the following features may be applicable to any of the method, the apparatuses, and the computer-readable medium of the preceding paragraphs. The first transmission may be for a full-duplex communication between the base station and a user equipment. An indication may be received of a timing difference measured between a first timing for a downlink transmission received at a user equipment and a second timing for an uplink transmission received at the user equipment. A determination may be made that the timing difference is greater than a length of a normal cyclic prefix (CP) for the first SCS. The ECP associated with the first SCS may be identified by selecting the ECP after determining that the timing difference is greater than the length of the normal CP for the first SCS.

In some examples, a method of wireless communication at a user equipment may include receiving a first indication from a base station, determining that the first indication specifies a first configurable extended cyclic prefix (ECP) to use for a first subcarrier spacing (SCS), and communicating with the base station using the first configurable ECP specified for the first SCS.

In some examples, a user equipment may include a transceiver, a memory, and a processor communicatively coupled to the transceiver and the memory. The processor and the memory may be configured to receive a first indication from a base station via the transceiver, determine that the first indication specifies a first configurable extended cyclic prefix (ECP) to use for a first subcarrier spacing (SCS), and communicate with the base station via the transceiver using the first configurable ECP specified for the first SCS.

In some examples, a user equipment may include means for receiving a first indication from a base station, means for determining that the first indication specifies a first configurable extended cyclic prefix (ECP) to use for a first subcarrier spacing (SCS), and means for communicating with the base station using the first configurable ECP specified for the first SCS.

In some examples, an article of manufacture for use by a user equipment includes a computer-readable medium having stored therein instructions executable by one or more processors of the user equipment to receive a first indication from a base station, determine that the first indication specifies a first configurable extended cyclic prefix (ECP) to use for a first subcarrier spacing (SCS), and communicate with the base station using the first configurable ECP specified for the first SCS.

One or more of the following features may be applicable to any of the method, the apparatuses, and the computer-readable medium of the preceding paragraphs. The first indication may further specify a length of the ECP. The first indication may further specify that the first SCS is 120 kilohertz or 240 kilohertz. A request for the first configurable ECP may be transmitted to the base station prior to receiving the first indication from the base station. The request may be to use the ECP instead of a normal cyclic prefix for the first SCS.

In some examples, a method of wireless communication at a base station may include generating a first indication that specifies a first configurable extended cyclic prefix (ECP) to use for a first subcarrier spacing (SCS), transmitting the first indication to a user equipment, and communicating with the user equipment using the first configurable ECP specified for the first SCS.

In some examples, a base station may include a transceiver, a memory, and a processor communicatively coupled to the transceiver and the memory. The processor and the memory may be configured to generate a first indication that specifies a first configurable extended cyclic prefix (ECP) to use for a first subcarrier spacing (SCS), transmit the first indication to a user equipment via the transceiver, and communicate with the user equipment via the transceiver using the first configurable ECP specified for the first SCS.

In some examples, a base station may include means for generating a first indication that specifies a first configurable extended cyclic prefix (ECP) to use for a first subcarrier spacing (SCS), means for transmitting the first indication to a user equipment, and means for communicating with the user equipment using the first configurable ECP specified for the first SCS.

In some examples, an article of manufacture for use by a base station includes a computer-readable medium having stored therein instructions executable by one or more processors of the base station to generate a first indication that specifies a first configurable extended cyclic prefix (ECP) to use for a first subcarrier spacing (SCS), transmit the first indication to a user equipment, and communicate with the user equipment using the first configurable ECP specified for the first SCS.

One or more of the following features may be applicable to any of the method, the apparatuses, and the computer-readable medium of the preceding paragraphs. The first indication may further specify a length of the ECP. The first indication may further specify that the first SCS is 120 kilohertz or 240 kilohertz. A request for the first configurable ECP may be received from the user equipment prior to transmitting the first indication to the user equipment. The request may be to use the ECP instead of a normal cyclic prefix for the first SCS.

In some examples, a method of wireless communication at a user equipment may include generating at least one request, transmitting the at least one request to a base station, and receiving at least one response to the at least one request from the base station. The at least one request may include at least one of: a request for a smaller subcarrier spacing (SCS) for full-duplex communication, a request for a switch from a first beam pair to a second beam pair for full-duplex communication, a request for additional frequency domain separation for full-duplex communication, or a combination thereof. The at least one response may include at least one of: an indication of the smaller SCS, an indication of the switch from the first beam pair to the second beam pair, an indication of the additional frequency domain separation, or any combination thereof.

In some examples, a user equipment may include a transceiver, a memory, and a processor communicatively coupled to the transceiver and the memory. The processor and the memory may be configured to generate at least one request, transmit the at least one request to a base station via the transceiver, and receive at least one response to the at least one request from the base station via the transceiver. The at least one request may include at least one of: a request for a smaller subcarrier spacing (SCS) for full-duplex communication, a request for a switch from a first beam pair to a second beam pair for full-duplex communication, a request for additional frequency domain separation for full-duplex communication, or a combination thereof. The at least one response may include at least one of: an indication of the smaller SCS, an indication of the switch from the first beam pair to the second beam pair, an indication of the additional frequency domain separation, or any combination thereof.

In some examples, a user equipment may include means for generating at least one request, means for transmitting the at least one request to a base station, and means for receiving at least one response to the at least one request from the base station. The at least one request may include at least one of: a request for a smaller subcarrier spacing (SCS) for full-duplex communication, a request for a switch from a first beam pair to a second beam pair for full-duplex communication, a request for additional frequency domain separation for full-duplex communication, or a combination thereof. The at least one response may include at least one of: an indication of the smaller SCS, an indication of the switch from the first beam pair to the second beam pair, an indication of the additional frequency domain separation, or any combination thereof.

In some examples, an article of manufacture for use by a user equipment includes a computer-readable medium having stored therein instructions executable by one or more processors of the user equipment to generate at least one request, transmit the at least one request to a base station, and receive at least one response to the at least one request from the base station. The at least one request may include at least one of: a request for a smaller subcarrier spacing (SCS) for full-duplex communication, a request for a switch from a first beam pair to a second beam pair for full-duplex communication, a request for additional frequency domain separation for full-duplex communication, or a combination thereof. The at least one response may include at least one of: an indication of the smaller SCS, an indication of the switch from the first beam pair to the second beam pair, an indication of the additional frequency domain separation, or any combination thereof.

One or more of the following features may be applicable to any of the method, the apparatuses, and the computer-readable medium of the preceding paragraphs. A particular SCS may be identified based on a timing difference measured between a first timing for a downlink transmission received at the user equipment and a second timing for an uplink transmission received at the user equipment. The request for the smaller SCS may include an indication of the particular SCS. A particular beam pair may be identified based on a timing difference measured between a first timing for a downlink transmission received at the user equipment and a second timing for an uplink transmission received at the user equipment. The request for the switch from the first beam pair to the second beam pair may specify the particular beam pair as the second beam pair. A particular increase of the frequency domain separation may be identified based on a timing difference measured between a first timing for a downlink transmission received at the user equipment and a second timing for an uplink transmission received at the user equipment. The request for the additional frequency domain separation may specify the particular increase of the frequency domain separation.

In some examples, a method of wireless communication at a base station may include selecting for full-duplex communication with a user equipment at least one of: a smaller subcarrier spacing (SCS), a switch from a first beam pair to a second beam pair, an additional frequency domain separation, or any combination thereof, and transmitting at least one indication of the selecting to the user equipment.

In some examples, a base station may include a transceiver, a memory, and a processor communicatively coupled to the transceiver and the memory. The processor and the memory may be configured to select for full-duplex communication with a user equipment at least one of: a smaller subcarrier spacing (SCS), a switch from a first beam pair to a second beam pair, an additional frequency domain separation, or any combination thereof, and transmit at least one indication of the selecting to the user equipment via the transceiver.

In some examples, a base station may include means for selecting for full-duplex communication with a user equipment at least one of: a smaller subcarrier spacing (SCS), a switch from a first beam pair to a second beam pair, an additional frequency domain separation, or any combination thereof, and means for transmitting at least one indication of the selecting to the user equipment.

In some examples, an article of manufacture for use by a base station includes a computer-readable medium having stored therein instructions executable by one or more processors of the base station to select for full-duplex communication with a user equipment at least one of: a smaller subcarrier spacing (SCS), a switch from a first beam pair to a second beam pair, an additional frequency domain separation, or any combination thereof, and transmit at least one indication of the selecting to the user equipment.

One or more of the following features may be applicable to any of the method, the apparatuses, and the computer-readable medium of the preceding paragraphs. At least one request may be received from the user equipment. The at least one request may include at least one of: a request for the smaller SCS, a request for the switch from the first beam pair to the second beam pair, a request for the additional frequency domain separation, or a combination thereof.

These and other aspects of the disclosure will become more fully understood upon a review of the detailed description, which follows. Other aspects, features, and embodiments of the present disclosure will become apparent to those of ordinary skill in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while example embodiments may be discussed below as device, system, or method embodiments it should be understood that such example embodiments can be implemented in various devices, systems, and methods.

BRIEF DESCRIPTION OF THE DRAWINGS

FIG. 10 is an illustration of OFDM symbol parameters for different subcarrier spacings according to some aspects.

FIG. 11 is an illustration of different cyclic prefixes for different subcarrier spacings according to some aspects.

DETAILED DESCRIPTION

Figure 1:
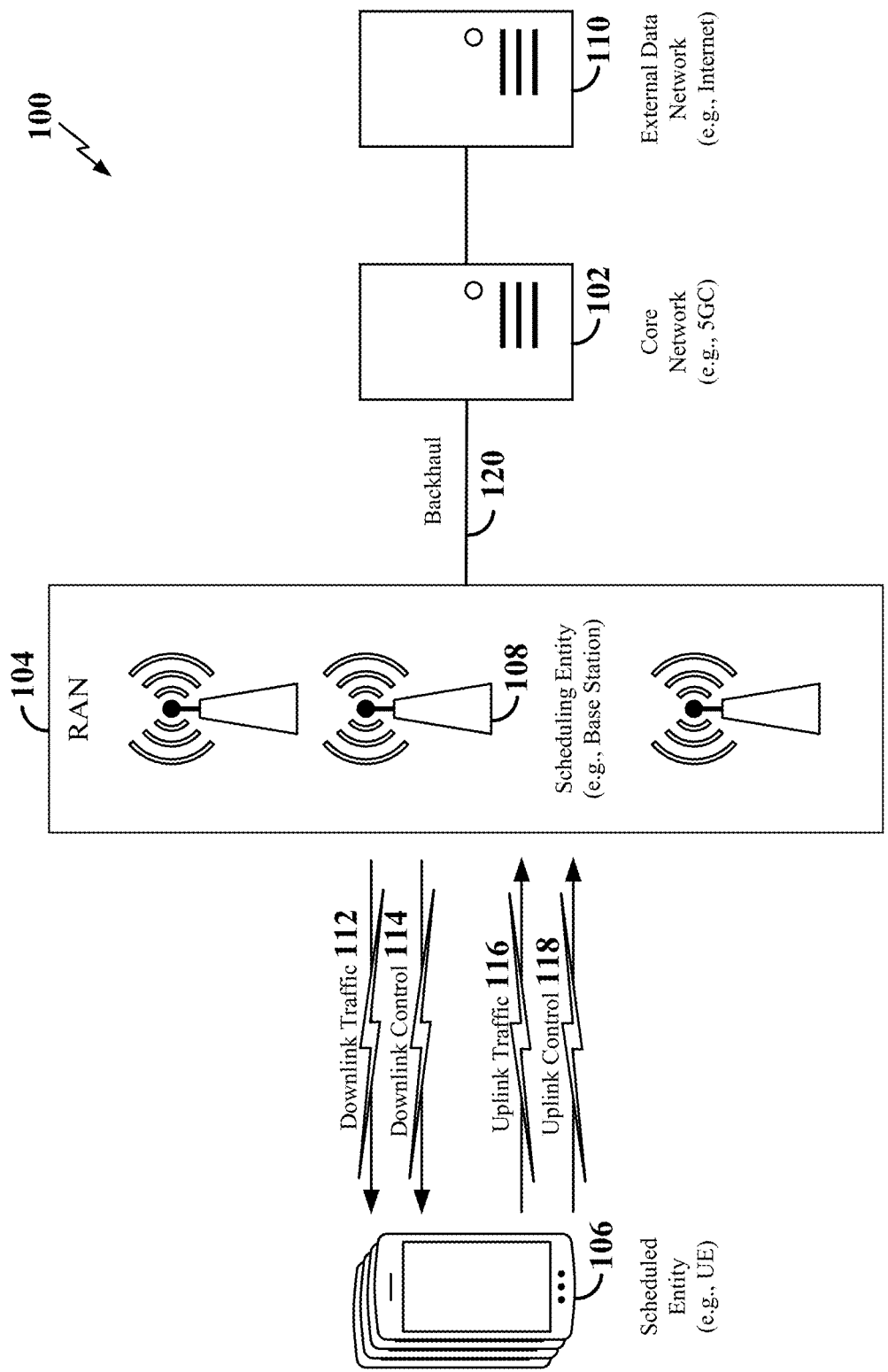
FIG. 1 is a schematic illustration of a wireless communication system according to some aspects.

Within cellular communication networks, wireless communications may occur between user equipment (UEs) and base stations (BSs). In full-duplex (FD) communications, time alignment between uplink and downlink communication periods (e.g., symbols) at a UE and BS may reduce or eliminate interference, such as intra-cellular interference at the BS, self-interference at the UE, etc. However, such as due to mobility of the UEs and/or geographic distances, the UEs and BSs may experience propagation delays that affect the timing at which a downlink signal transmitted by the BS is received by the UE, and the timing at which an uplink signal transmitted by the UE is received by the BS.

Such misalignment may result in increased interference at a device. In particular, the uplink and downlink communication may each include a cyclic prefix (CP). If the CPs of the uplink and downlink communication overlap in time at a particular device (e.g., UE or BS), the device may be able to perform interference cancellation to deal with the effects of any interference between the uplink communication and the downlink communication. However, if the CPs of the uplink and downlink communication do not overlap in time at the device, there may be interference between the communications. Accordingly, certain techniques discussed herein provide for timing alignment of uplink and downlink communications at devices where at least the CPs of the uplink and downlink communications overlap in time at a device, such as to allow for interference cancellation at the device. Such timing alignment may increase reliability of communications, including reducing the need for performing re-transmissions, thereby increasing throughput over the network.

Various aspects of the disclosure may be applicable to FD operation with simultaneous uplink transmissions and downlink transmissions. FD mode may include single band FD (SBFD) in flexible time division duplexing (TDD), but may also include frequency division duplexing (FDD) in paired spectrum, SBFD in unpaired spectrum, partially overlapped frequency spectrum FD, fully overlapped frequency spectrum FD, in-band FD, or other types of full-duplex operation.

This FD capability may be implemented at a base station (e.g., a gNB), a UE, or both. For example, a UE may transmit uplink signals from one panel and receive downlink signals at another panel. In some aspects, full-duplex performance may depend on beam separation and/or other factors. For example, a first pair of beams that has more spatial separation than a second pair of beams may have less self-interference than the second pair of beams.

In some aspects, FD capability may improve (e.g., reduce) latency. For example, in contrast with half-duplex communication where only some of the slots are reserved for uplink transmission, in FD communication a UE might not need to wait for an available uplink slot to transmit uplink information, thereby reducing the latency for the uplink transmission. As another example, a UE may receive downlink signals in slots that are dedicated as uplink-only slots, thereby reducing the latency for the downlink transmission.

In some aspects, FD capability may improve spectrum efficiency (e.g., per cell, per UE, etc.). For example, in FD communication, the same time slots and/or frequency resources may be used concurrently for uplink and downlink transmissions. Here, the downlink frequency band(s) and the uplink frequency band(s) in FD communication may be fully overlapped, partially overlapped, or separated with a guard band in between.

The disclosure relates in some aspects to mitigating interference for FD communication and other types of communication. As discussed herein, this interference may be based on one or more of the relative timing of uplink and downlink transmissions, leakage, or other factors. The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and at least one scheduled entity 106. The at least one scheduled entity 106 may be referred to as a user equipment (UE) 106 in the discussion that follows. The RAN 104 includes at least one scheduling entity 108. The at least one scheduling entity 108 may be referred to as a base station (BS) 108 in the discussion that follows. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be co-located or non-co-located. The TRPs may communicate on the same carrier frequency or different carrier frequencies within the same frequency band or different frequency bands.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, radio frequency (RF) chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
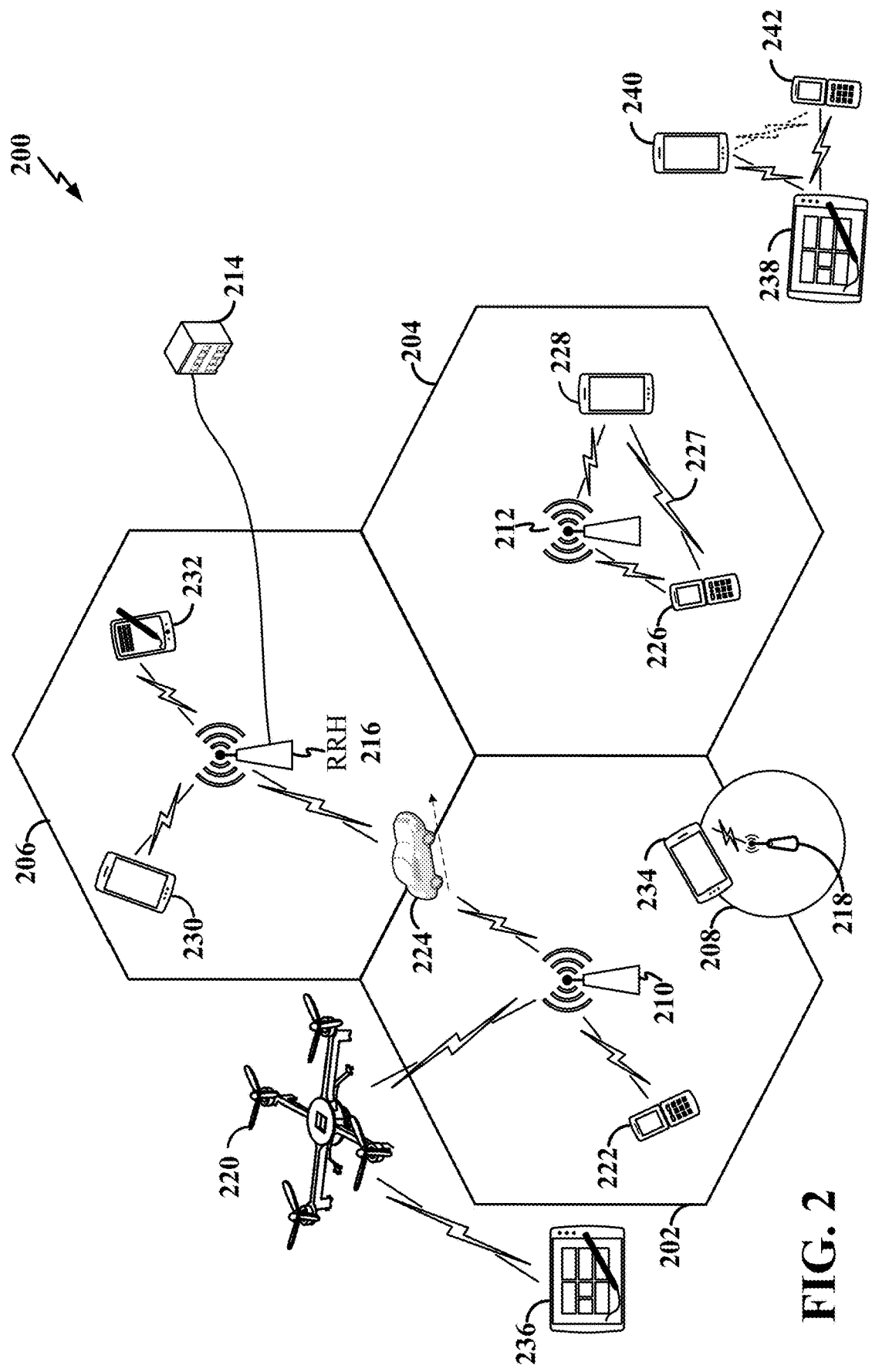
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network (e.g., as illustrated in FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210. In some examples, a UAV 220 may be configured to function as a BS. That is, in some examples, a cell may not necessarily be stationary, and the geographic area of the cell may move according to the location of a mobile base station such as a UAV 220.

In the radio access network 200, the ability for a UE to communicate while moving, independent of its location, is referred to as mobility. The various physical channels between the UE and the radio access network are generally set up, maintained, and released under the control of an access and mobility management function (AMF). The AMF (not shown in FIG. 2) may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and increases the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), also known as flexible duplex.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the UE 238 (e.g., functioning as a scheduling entity). Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic (e.g., a physical sidelink shared channel) and sidelink control (e.g., a physical sidelink control channel).

In some examples, two or more UEs (e.g., UEs 226 and 228) within the coverage area of a serving base station 212 may communicate with both the base station 212 using cellular signals and with each other using direct link signals (e.g., sidelink signals 227) without relaying that communication through the base station. In an example of a V2X network within the coverage area of the base station 212, the base station 212 and/or one or both of the UEs 226 and 228 may function as scheduling entities to schedule sidelink communication between UEs 226 and 228.

Figure 3:
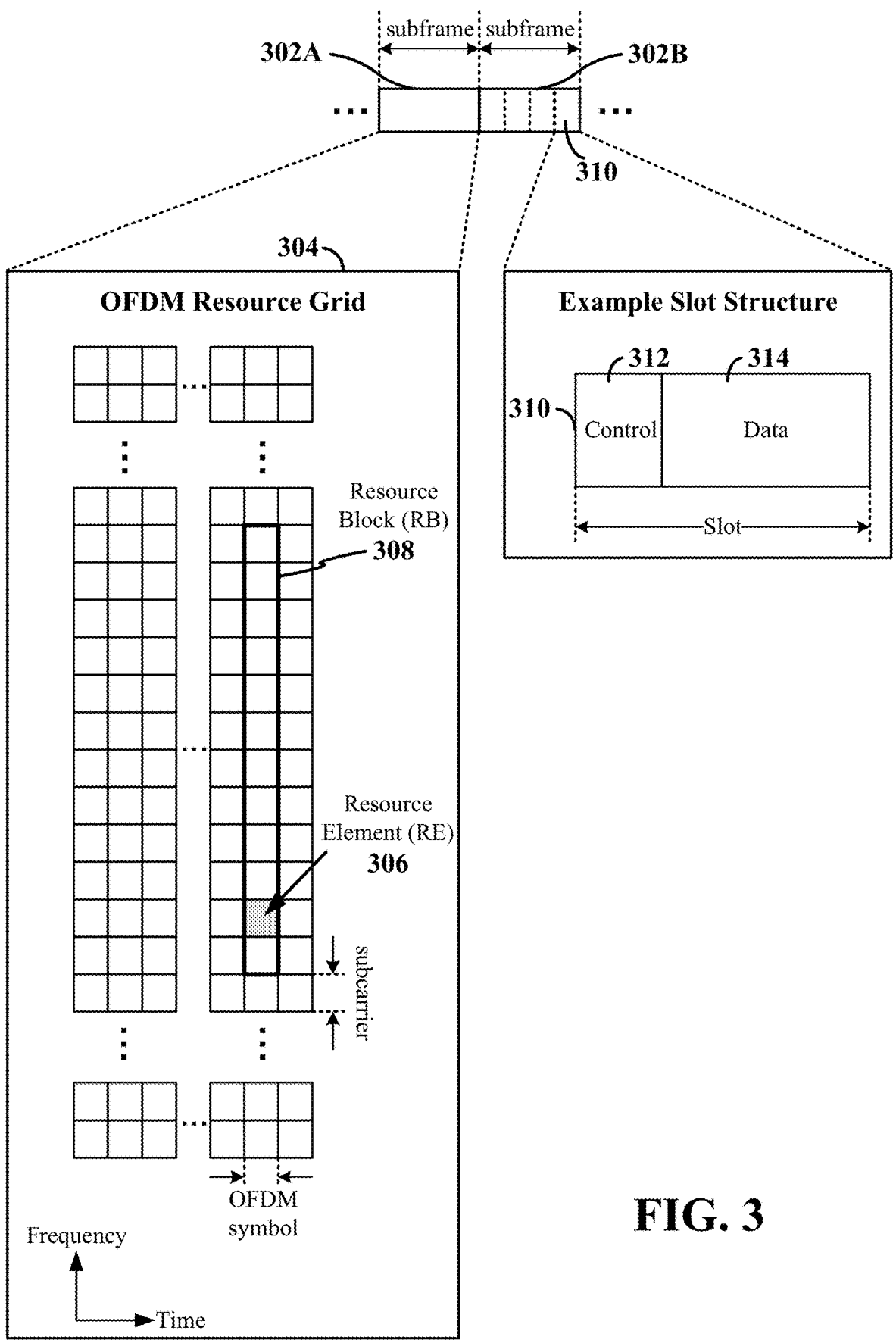
FIG. 3 is a schematic illustration of an example of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example DL subframe (SF) 302A is illustrated, showing an OFDM resource grid 304. However, as those skilled in the art will readily appreciate, the physical layer (PHY) transmission structure for any particular application may vary from the example described here, depending on any number of factors. Here, time is in the horizontal direction with units of OFDM symbols; and frequency is in the vertical direction with units of subcarriers. 5G NR supports a scalable numerology where different numerologies may be used for different radio frequency spectrums, different bandwidths, and the like. For example, sub-carrier spacings (SCSs) of 15 kilohertz (kHz), 30 kHz, 60 kHz, 120 kHz, 240 kHz, 480 kHz, 960 kHz, etc., may be used in different scenarios.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs (e.g., scheduled entities) for downlink, uplink, or sidelink transmissions typically involves scheduling one or more resource elements 306 within one or more sub-bands or bandwidth parts (BWPs). Each BWP may include two or more contiguous or consecutive RBs. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, RSU, etc.) or may be self-scheduled by a UE implementing D2D sidelink communication.

In this illustration, the RB 308 is shown as occupying less than the entire bandwidth of the subframe 302A, with some subcarriers illustrated above and below the RB 308. In a given implementation, the subframe 302A may have a bandwidth corresponding to any number of one or more RBs 308. Further, in this illustration, the RB 308 is shown as occupying less than the entire duration of the subframe 302A, although this is merely one possible example.

Each 1 ms subframe 302A may consist of one or multiple adjacent slots. In the example shown in FIG. 3, one subframe 302B includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS), a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In some examples, a slot 310 may be utilized for broadcast or unicast communication. In V2X or D2D networks, a broadcast communication may refer to a point-to-multipoint transmission by a one device (e.g., a vehicle, base station (e.g., RSU, gNB, eNB, etc.), UE, or other similar device) to other devices. A unicast communication may refer to a point-to-point transmission by a one device to a single other device.

In an example, the control region 312 of the slot 310 may include a physical downlink control channel (PDCCH) including downlink control information (DCI) transmitted by a base station (e.g., gNB, eNB, RSU, etc.) towards one or more of a set of UEs, which may include one or more sidelink devices (e.g., V2X/D2D devices). In some examples, the DCI may include synchronization information to synchronize communication by a plurality of sidelink devices on the sidelink channel. In addition, the DCI may include scheduling information indicating one or more resource blocks within the control region 312 and/or data region 314 allocated to sidelink devices for sidelink communication. For example, the control region 312 of the slot may further include control information transmitted by sidelink devices over the sidelink channel, while the data region 314 of the slot 310 may include data transmitted by sidelink devices over the sidelink channel. In some examples, the control information may be transmitted within a physical sidelink control channel (PSCCH), while the data may be transmitted within a physical sidelink shared channel (PSSCH).

In a DL transmission (e.g., over the Uu interface), the transmitting device (e.g., the scheduling entity) may allocate one or more REs 306 (e.g., within a control region 312) to carry DL control information including one or more DL control channels, such as a PBCH; and/or a physical downlink control channel (PDCCH), etc., to one or more scheduled entities. The transmitting device may further allocate one or more REs 306 to carry other DL signals, such as a DMRS; a phase-tracking reference signal (PT-RS); a channel state information-reference signal (CSI-RS); a primary synchronization signal (PSS); and a secondary synchronization signal (SSS).

The PDCCH may carry downlink control information (DCI) including but not limited to power control commands, scheduling information, a grant, and/or an assignment of REs for DL and UL transmissions. The PHY carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission (e.g., over the Uu interface), the transmitting device (e.g., the scheduled entity) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. For example, the UL control information may include a DMRS or SRS. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a PDSCH; or for an UL transmission, a physical uplink shared channel (PUSCH). In some examples, one or more REs 306 within the data region 314 may be configured to carry SIBs (e.g., SIB1), carrying system information that may enable access to a given cell.

The physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
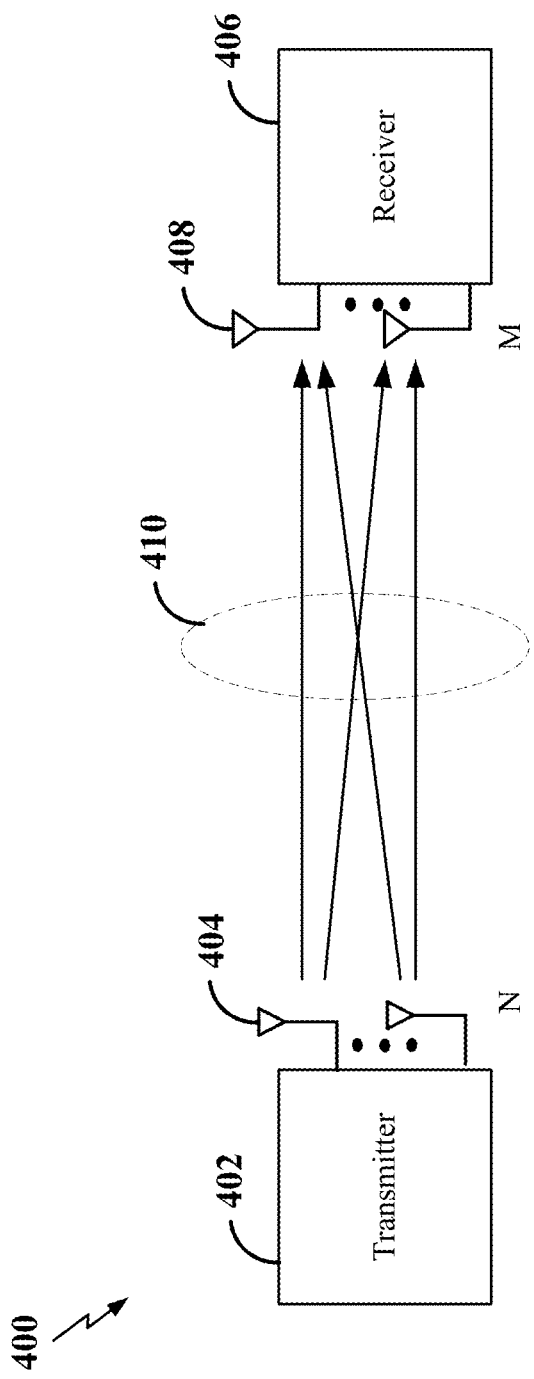
FIG. 4 is a block diagram illustrating an example of a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the wireless communication system 400 (MIMO system) is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-plus-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In 5G New Radio (NR) systems, particularly for above 6 GHz or mmWave systems, beamformed signals may be utilized for most downlink channels, including the physical downlink control channel (PDCCH) and physical downlink shared channel (PDSCH). In addition, broadcast control information, such as a synchronization signal block (SSB), slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH).

A base station (e.g., gNB) may generally be capable of communicating with UEs using transmit beams (e.g., downlink transmit beams) of varying beam widths. For example, a base station may be configured to utilize a wider beam when communicating with a UE that is in motion and a narrower beam when communicating with a UE that is stationary. The UE may further be configured to utilize one or more downlink receive beams to receive signals from the base station. In some examples, to select one or more downlink transmit beams and one or more downlink receive beams for communication with a UE, the base station may transmit a reference signal, such as an SSB or CSI-RS, on each of a plurality of downlink transmit beams in a beam-sweeping manner. The UE may measure the reference signal received power (RSRP) on each of the downlink transmit beams using one or more downlink receive beams on the UE and transmit a beam measurement report to the base station indicating the RSRP of each of the measured downlink transmit beams. The base station may then select one or more serving downlink beams (e.g., downlink transmit beams and downlink receive beams) for communication with the UE based on the beam measurement report. The resulting selected downlink transmit beam and downlink receive beam may form a downlink beam pair link. In other examples, when the channel is reciprocal, the base station may derive the particular downlink beam(s) to communicate with the UE based on uplink measurements of one or more uplink reference signals, such as sounding reference signals (SRSs).

Similarly, uplink beams (e.g., uplink transmit beam(s) at the UE and uplink receive beam(s) at the base station) may be selected by measuring the RSRP of received uplink reference signals (e.g., SRSs) or downlink reference signals (e.g., SSBs or CSI-RSs) during an uplink or downlink beam sweep. For example, the base station may determine the uplink beams either by uplink beam management via a SRS beam sweep with measurement at the base station or by downlink beam management via an SSB/CSI-RS beam sweep with measurement at the UE. The selected uplink beam may be indicated by a selected SRS resource (e.g., time-frequency resources utilized for the transmission of a SRS) when implementing uplink beam management or a selected SSB/CSI-RS resource when implementing downlink beam management. For example, the selected SSB/CSI-RS resource can have a spatial relation to the selected uplink transmit beam (e.g., the uplink transmit beam utilized for the PUCCH, SRS, and/or PUSCH). The resulting selected uplink transmit beam and uplink receive beam may form an uplink beam pair link.

Figure 5:
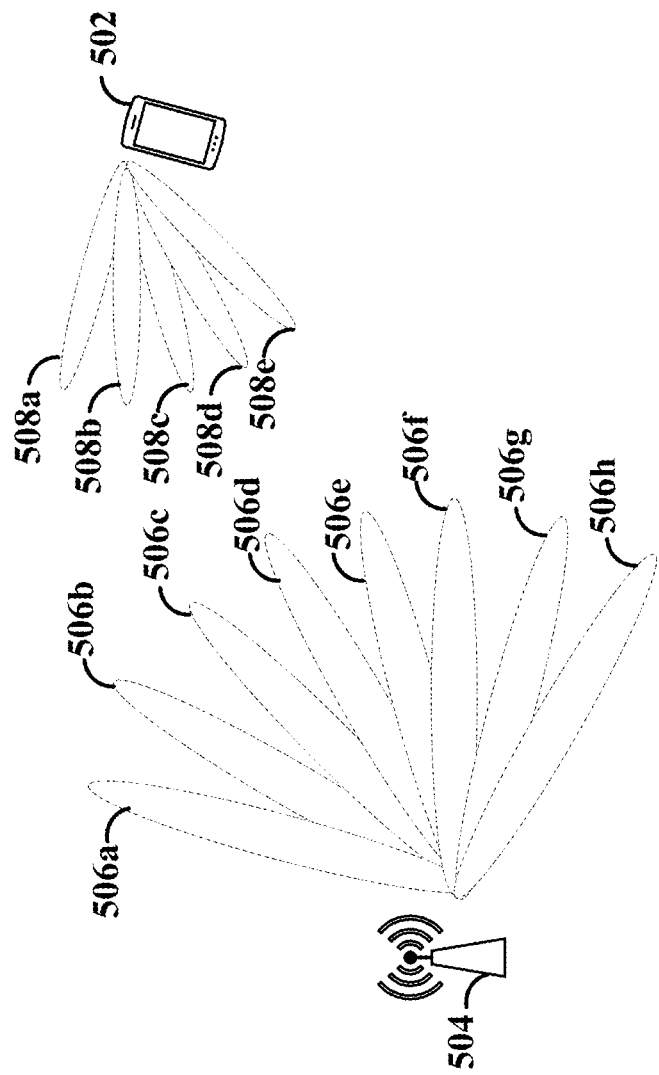
FIG. 5 is a diagram illustrating an example of communication between a radio access network (RAN) node and a wireless communication device using beamforming according to some aspects.

FIG. 5 is a diagram illustrating communication between a base station 504 and a UE 502 using beamformed signals according to some aspects. The base station 504 may be any of the base stations (e.g., gNBs) or scheduling entities illustrated in any of FIGS. 1, 2, 6A-9, 12-15, 17, 22, 26, and 30 and the UE 502 may be any of the UEs or scheduled entities illustrated in in any of FIGS. 1, 2, 6A-9, 12-15, 17, 18, 26, and 28.

In the example shown in FIG. 5, the base station 504 is configured to generate a plurality of beams 506a-506h, each associated with a different beam direction. In addition, the UE 502 is configured to generate a plurality of beams 508a-508e, each associated with a different beam direction. The base station 504 and UE 502 may select one or more beams 506a-506h on the base station 504 and one or more beams 508a-508e on the UE 502 for communication of uplink and downlink signals therebetween using a downlink beam management scheme and/or an uplink beam management scheme.

In an example of a downlink beam management scheme for selection of downlink beams, the base station 504 may be configured to sweep or transmit on each of a plurality of downlink transmit beams 506a-506h during one or more synchronization slots. For example, the base station 504 may transmit a reference signal, such as an SSB or CSI-RS, on each beam in the different beam directions during the synchronization slot. Transmission of the beam reference signals may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). It should be noted that while some beams are illustrated as adjacent to one another, such an arrangement may be different in different aspects. For example, downlink transmit beams 506a-506h transmitted during a same symbol may not be adjacent to one another. In some examples, the base station 504 may transmit more or less beams distributed in all directions (e.g., 360 degrees).

In addition, the UE 502 is configured to receive the downlink beam reference signals on a plurality of downlink receive beams 508a-508e. In some examples, the UE 502 searches for and identifies each of the downlink transmit beams 506a-506h based on the beam reference signals. The UE 502 then performs beam measurements (e.g., RSRP, SINR, reference signal received quality (RSRQ), etc.) on the beam reference signals on each of the downlink receive beams 508a-508e to determine the respective beam quality of each of the downlink transmit beams 506a-506h as measured on each of the downlink receive beams 508a-508e.

The UE 502 can generate and transmit a beam measurement report, including the respective beam index and beam measurement of each downlink transmit beam 506a-506h on each downlink receive beam 508a-508e to the base station 504. The base station 504 may then select one or more downlink transmit beams on which to transmit unicast downlink control information and/or user data traffic to the UE 502. In some examples, the selected downlink transmit beam(s) have the highest gain from the beam measurement report. In some examples, the UE 502 can further identify the downlink transmit beams selected by the base station from the beam measurements. Transmission of the beam measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The base station 504 or the UE 502 may further select a corresponding downlink receive beam on the UE 502 for each selected serving downlink transmit beam to form a respective downlink beam pair link (BPL) for each selected serving downlink transmit beam. For example, the UE 502 can utilize the beam measurements to select the corresponding downlink receive beam for each serving downlink transmit beam. In some examples, the selected downlink receive beam to pair with a particular downlink transmit beam may have the highest gain for that particular downlink transmit beam.

In one example, a single downlink transmit beam (e.g., beam 506d) on the base station 504 and a single downlink receive beam (e.g., beam 508c) on the UE may form a single downlink BPL used for communication between the base station 504 and the UE 502. In another example, multiple downlink transmit beams (e.g., beams 506c, 506d, and 506e) on the base station 504 and a single downlink receive beam (e.g., beam 508c) on the UE 502 may form respective downlink BPLs used for communication between the base station 504 and the UE 502. In another example, multiple downlink transmit beams (e.g., beams 506c, 506d, and 506e) on the base station 504 and multiple downlink receive beams (e.g., beams 508c and 508d) on the UE 502 may form multiple downlink BPLs used for communication between the base station 504 and the UE 502. In this example, a first downlink BPL may include downlink transmit beam 506c and downlink receive beam 508c, a second downlink BPL may include downlink transmit beam 508d and downlink receive beam 508c, and a third downlink BPL may include downlink transmit beam 508e and downlink receive beam 508d.

When the channel is reciprocal, the above-described downlink beam management scheme may also be used to select one or more uplink BPLs for uplink communication from the UE 502 to the base station 504. For example, the downlink BPL formed of beams 506d and 508e may also serve as an uplink BPL. Here, beam 508c is utilized as an uplink transmit beam, while beam 506d is utilized as an uplink receive beam.

In an example of an uplink beam management scheme, the UE 502 may be configured to sweep or transmit on each of a plurality of uplink transmit beams 508a-508e. For example, the UE 502 may transmit a SRS on each beam in the different beam directions. In addition, the base station 504 may be configured to receive the uplink beam reference signals on a plurality of uplink receive beams 506a-506h. In some examples, the base station 504 searches for and identifies each of the uplink transmit beams 508a-508e based on the beam reference signals. The base station 504 then performs beam measurements (e.g., RSRP, SINR, RSRQ, etc.) on the beam reference signals on each of the uplink receive beams 506a-506h to determine the respective beam quality of each of the uplink transmit beams 508a-508e as measured on each of the uplink receive beams 506a-506h.

The base station 504 may then select one or more uplink transmit beams on which the UE 502 will transmit unicast downlink control information and/or user data traffic to the base station 504. In some examples, the selected uplink transmit beam(s) have the highest gain. The base station 504 may further select a corresponding uplink receive beam on the base station 504 for each selected serving uplink transmit beam to form a respective uplink beam pair link (BPL) for each selected serving uplink transmit beam. For example, the base station 504 can utilize the beam measurements to select the corresponding uplink receive beam for each serving uplink transmit beam. In some examples, the selected uplink receive beam to pair with a particular uplink transmit beam may have the highest gain for that particular uplink transmit beam.

The base station 504 may then notify the UE 502 of the selected uplink transmit beams. For example, the base station 504 may provide the SRS resource identifiers (IDs) identifying the SRSs transmitted on the selected uplink transmit beams. In some examples, the base station 504 may apply each selected uplink transmit beam (and corresponding uplink receive beam) to an uplink signal (e.g., PUCCH, PUSCH, SRS, etc.) and transmit the respective SRS resource IDs associated with the selected uplink transmit beams applied to each uplink signal to the UE 502. When the channel is reciprocal, the above-described uplink beam management scheme may also be used to select one or more downlink BPLs for downlink communication from the base station 504 to the UE 502. For example, the uplink BPLs may also be utilized as downlink BPLs.

Figure 6A:
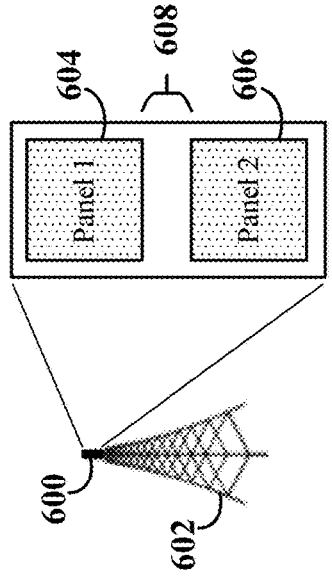
FIGS. 6A and 6B are diagrams depicting communication via two antenna panels according to some aspects.

As mentioned above, a UE and a base station (e.g., gNB) may use full-duplex communication. FIG. 6A is a schematic diagram depicting an antenna array 600 of a TRP atop a tower 602 according to some aspects of the disclosure. The antenna array 600 is divided into two panels (panel 1 604, panel 2 606) with a physical separation 608 therebetween. Each of the two panels may be a subarray of antennas. A given panel may transmit and/or receive a beam or a beam group. A different number of panel may be used in other examples.

Other types of devices may include multi-panel antenna arrays for full-duplex communication. For example, a UE may have a first panel on one side of the UE and a second panel on an opposite side of the UE. As another example, a UE may have four panels, with one panel on each corner of the UE.

Figure 6B:
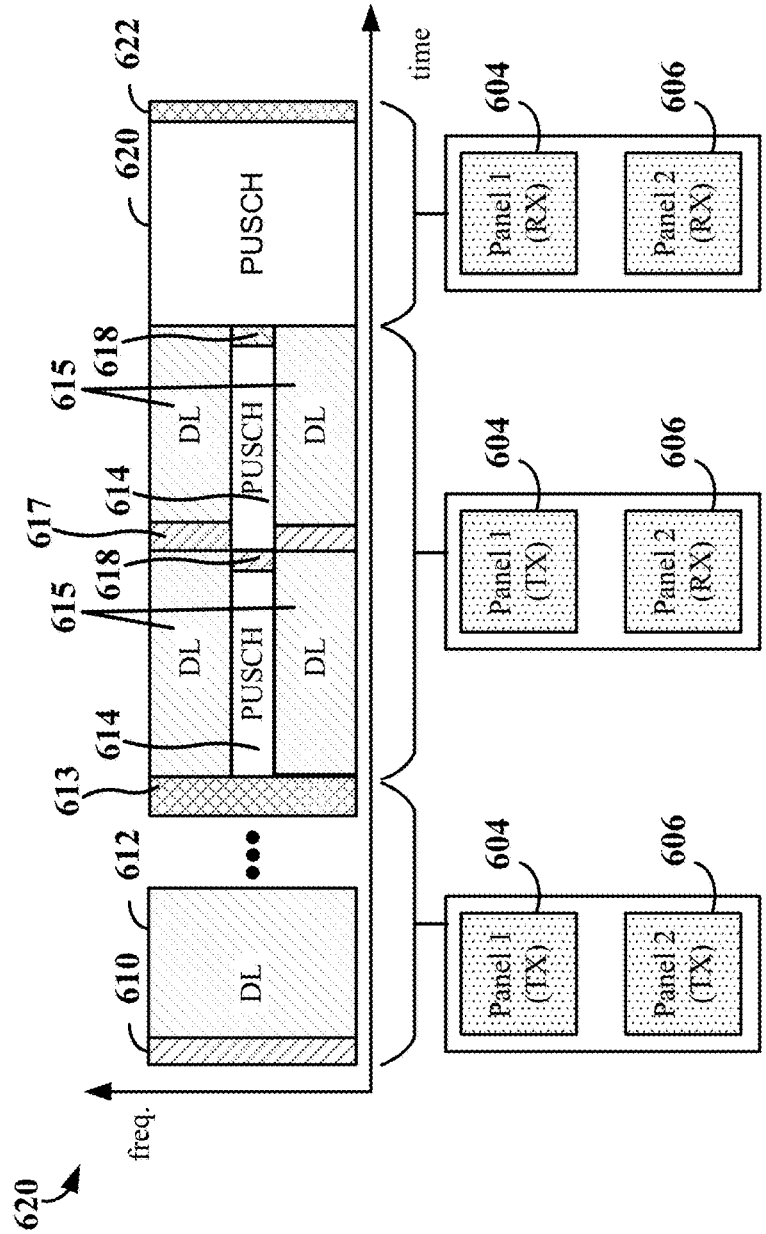

FIG. 6B is a diagram depicting the transmission or reception configuration of the two panels (panel 1 604 and panel 2 606 of FIG. 6A or two panels on a UE, etc.). The transmission (TX) and reception (RX) configurations of the two panels are depicted for various DL and UL channels as may be implemented in a device (e.g., a scheduling entity or a scheduled entity) implementing flexible TDD according to some aspects of the disclosure.

As mentioned above, flexible TDD may involve in some examples using two panels to operate in either a TDD mode (with both panels on the gNB and one or more panels on the UE configured for either DL or UL) or an SBFD mode (with one panel on each of the gNB and UE configured for UL and another panel on each of the gNB and UE configured for DL) as described below with reference to FIG. 6B.

At the left of FIG. 6B, when the antenna array 600 is communicating in only a single direction at a time, both panel 1 604 and panel 2 606 may be configured for the single-direction communication as an example of a TDD mode showing the DL transmission. For example, both panels 604 and 606 may be configured to transmit DL control 610, DL data 612, and DL data 613 as an example of DL transmissions during TDD mode. At the center of FIG. 6B, when the antenna array 600 is simultaneously transmitting a combination of DL data 615 and DL control 617 and receiving UL data (e.g., PUSCH 614) and UL control 618, panel 1 604 may be configured for DL transmission (i.e., TX) and panel 2 606 may be configured for UL reception (i.e., RX). At the right of FIG. 6B, when the antenna array 600 is only receiving UL data (e.g., PUSCH 620) and UL control 622, both panel 1 604 and panel 2 606 may be configured for UL reception. The antenna array 600 is thus configured for both TDD and full duplex operation (e.g., flexible TDD). The physical separation 608 between panel 1 604 and panel 2 606 may provide increased isolation between the panels (e.g., greater than about 50 dB of increased isolation) when compared to two panels without the physical separation 608. The above discussion also may be applicable to an antenna array in another type of device (e.g., a UE, with the references to DL and UL reversed).

Figure 7A:
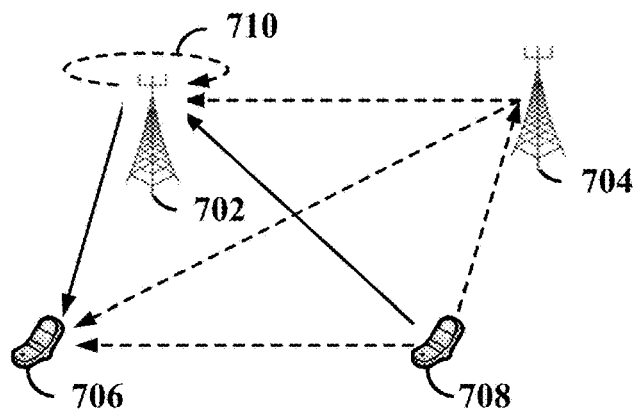
FIGS. 7A, 7B, and 7C are schematic illustrations of sources of interference for base stations and UEs according to some aspects.
Figure 7B:
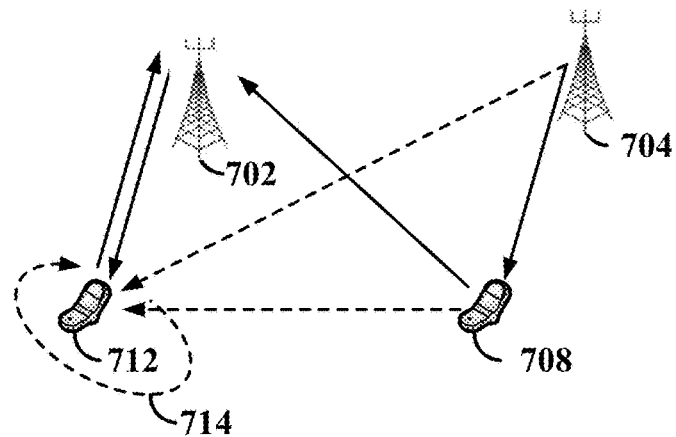
Figure 7C:
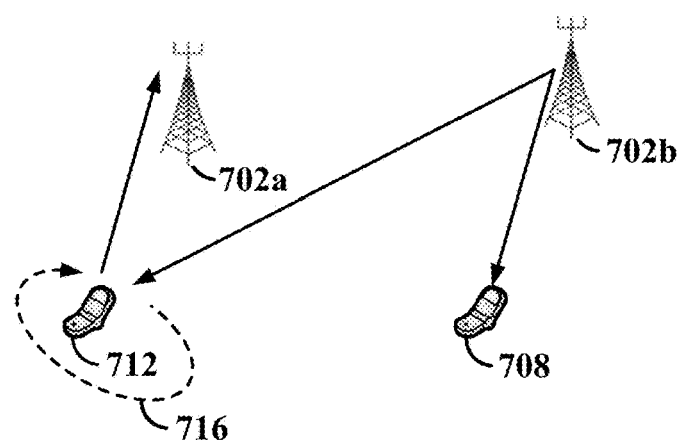

FIGS. 7A, 7B, and 7C are schematic illustrations of a wireless communication network 700 and different sources of interference for a half-duplex UE 706, a first full-duplex UE 712, a second full-duplex UE 708, and different gNB configurations according to some aspects of the disclosure. The UE 706, 708, or 712 may correspond to any of the UEs or scheduled entities shown in in any of FIGS. 1, 2, 5-6, 8-9, 12-15, 17, 18, 26, and 28.

In FIG. 7A, a full-duplex gNB 702 (e.g., a scheduling entity) is transmitting to the half-duplex UE 706. During the time of the transmission from the full-duplex gNB 702 to the half-duplex UE 706, the full-duplex gNB 702 is receiving, at its receiver (not shown), self-interference 710 from its own transmission to the half-duplex UE 706 as well as interference from a neighboring gNB 704 and an uplink transmission from a second full-duplex UE 708. The half-duplex UE 706 is also receiving interference from the second full-duplex UE 708 and the neighboring gNB 704. Because it is a half-duplex UE, the half-duplex UE 706 is not transmitting during the time of the transmission from the full-duplex gNB 702 to the half-duplex UE 706, and therefore, the half-duplex UE 706 receives no self-interference. The full-duplex gNB 702 and neighboring gNB 704 may each correspond to any of the base stations or scheduling entities shown in any of FIGS. 1, 2, 5-6, 8-9, 12-15, 17, 22, 26, and 30, and can be associated with a same base station (e.g., a single gNB) or may each correspond to separate base stations.

In FIG. 7B, the full-duplex gNB 702 is transmitting a downlink transmission to the first full-duplex UE 712. During the time of the transmission of the downlink transmission from the full-duplex gNB 702 to the first full-duplex UE 712, the full-duplex gNB 702 is receiving, at its receiver (not shown), a simultaneous uplink transmission from the first full-duplex UE 712. At the same time as the just mentioned simultaneous downlink and uplink transmissions, the first full-duplex UE 712 is receiving, at its receiver (not shown), self-interference 714 from its own transmission to the full-duplex gNB 702 as well as interference from the neighboring gNB 704 and interference from the second full-duplex UE 708.

FIG. 7C illustrates a full-duplex gNB configured as a multi-TRP base station including a first TRP 702a and a second TRP 702b. The first TRP 702a is receiving an uplink transmission from the first full-duplex UE 712. During the time of the transmission of the uplink transmission to the first TRP 702a, the first full-duplex UE 712 is also receiving a transmission from the second TRP 70b. In addition to the transmission received from the second TRP 718b, the first full-duplex UE 712 is also receiving, at its receiver (not shown), self-interference 716 from its own transmission to the first TRP 702a.

Conventionally, different frequency bands may be allocated for allocated for the transmissions of FIGS. 7A-7B to mitigate the above interference. For the half-duplex UE 706 of FIG. 7A, interference may be mitigated if the interference from the neighboring gNB 704 and second full-duplex UE 708 are at frequencies other than those occupied by the downlink transmission from the full-duplex gNB 702 to the half-duplex UE 706. Similarly, for the first full-duplex UE 712 of FIGS. 7B and 7C, interference may be mitigated if the self-interference 716 from the first full-duplex UE 712, interference from the neighboring gNB 704, and/or interference from the second full-duplex UE 708 are at frequencies other than those occupied by the downlink transmission from the full-duplex gNB 702 to the half-duplex UE 706.

The disclosure relates in some aspects to FD capabilities for wireless communication and interference mitigation for FD communication. Various aspects of the disclosure may be applicable to FD operation with simultaneous uplink transmissions and downlink transmissions in FR2 and/or other frequency bands, which may be referred to herein as "FD mode." FD mode may include SBFD in flexible TDD, but may also include FDD in paired spectrum, SBFD in unpaired spectrum, partially overlapped frequency spectrum FD, fully overlapped frequency spectrum FD, in-band FD, or other types of full-duplex operation.

This FD capability may be implemented at a base station (e.g., a gNB), a UE, or both. For example, a UE may transmit uplink signals from one panel and receive downlink signals at another panel.

In some aspects, full-duplex performance may depend on beam separation and/or other factors. For example, a first pair of beams that has more spatial separation than a second pair of beams may have less self-interference than the second pair of beams.

In some aspects, FD capability may reduce latency. For example, in contrast with half-duplex communication where only some of the slots are reserved for uplink transmission, in FD communication a UE might not need to wait for an available uplink slot to transmit uplink information, thereby reducing the latency for the uplink transmission. As another example, a UE may receive downlink signals in slots that are dedicated as uplink-only slots, thereby reducing the latency for the downlink transmission.

In some aspects, FD capability may increase spectrum efficiency (e.g., per cell, per UE, etc.). For example, in FD communication, the same time slots and/or frequency resources may be used concurrently for uplink and downlink transmissions. Here, the downlink frequency band(s) and the uplink frequency band(s) in FD communication may be fully overlapped, partially overlapped, or separated with a guard band in between. As a result, communication efficiency is increased because both frequency and time resources are utilized concurrently.

The disclosure relates in some aspects to mitigating interference for FD communication and other types of communication. As discussed herein, this interference may be based on one or more of the relative timing of uplink and downlink transmissions, leakage, or other factors.

During operation, a 5G NR uplink allows for uplink intracell orthogonality so that uplink transmissions received from different devices within a cell do not cause interference to each other. A feature for this uplink orthogonality is that the uplink slot boundaries for a given numerology are (approximately) time aligned at the base station. To ensure such receiver-side time alignment, 5G NR includes a mechanism for transmitting a timing advance (TA) signal or indication. While similar to previous technologies such as LTE, timing advance in 5G NR is different in that it uses different timing advance step sizes for different numerologies.

Generally, timing advance is a negative offset applied at a wireless device (e.g., UE), between the start of a downlink (DL) symbol (or subframe) as observed by the device and the start of a symbol in the uplink (UL). By controlling the offset appropriately for each device, the network (e.g., base station or gNB) may control the timing of the signals received at the base station or gNB from the various devices (UEs) in a cell being served. Devices located far from the base station encounter a greater propagation delay, and, therefore, should start their uplink transmissions somewhat in advance, compared to devices located closer to the base station with a less propagation delay.

Figure 8:
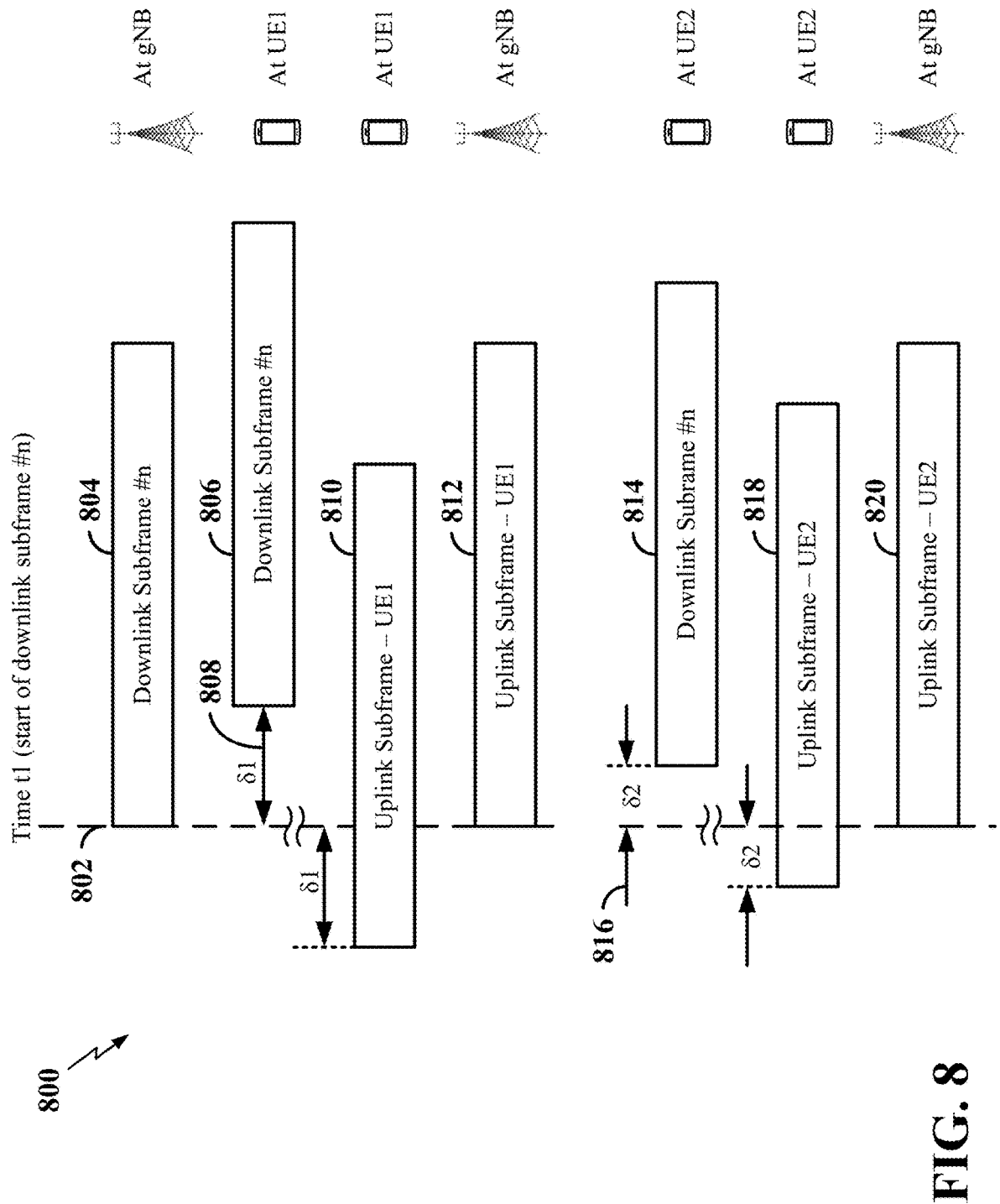
FIG. 8 is a conceptual illustration of uplink and downlink timing according to some aspects.

FIG. 8 illustrates an example of downlink and uplink timing for half-duplex communication 800. In this example, a first UE (UE1) is located closer to a gNB than a second UE (UE2). Time-aligned downlink transmissions and uplink transmissions are illustrated relative to a time t1 802 that represents a subframe boundary at the gNB.

As represented by a downlink subframe 804 (designated as downlink subframe #n in this example), transmission of a downlink subframe at the gNB starts at the time t1 802. A downlink subframe 806 represents the delayed reception of the downlink subframe 804 at the first UE (UE1). As indicated, the subframe 806 is received at the first UE (UE1) after a propagation delay $\delta 1$ 808.

For half-duplex operation, it is desired that uplink transmissions be received at the gNB time aligned with the gNB's subframe boundary. To this end, based on a timing advance command received from the gNB, the first UE (UE1) will transmit an uplink subframe 810 at a time that precedes the gNB's subframe boundary by the propagation delay $\delta 1$. An uplink subframe 812 represents the delayed reception of the uplink subframe 810 at the gNB. As indicated, this uplink subframe is received time aligned with the gNB's subframe boundary. For convenience, the transmission of the uplink subframe is depicted relative to the time t1 802. It should be appreciated, however, that in a half-duplex system the relative subframe boundary for the uplink transmission may be later in time than the time t1 802.

FIG. 8 further illustrates that the propagation delay $\delta 2$ from the gNB to the second UE (UE2) is smaller than the propagation delay $\delta 1$ due to the second UE (UE2) being closer to the gNB than the first UE (UE1). A downlink subframe 814 represents the delayed reception of the downlink subframe 804 at the second UE (UE2). As indicated, the subframe 814 is received at the second UE (UE2) after a propagation delay $\delta 2$ 816.

Based on a timing advance command received from the gNB, the second UE (UE2) will transmit an uplink subframe 818 at a time that precedes the gNB's subframe boundary by the propagation delay $\delta 2$. An uplink subframe 820 represents the delayed reception of the uplink subframe 818 at the gNB. As indicated, this uplink subframe is received time aligned with the gNB's subframe boundary. For convenience, the transmission of the uplink subframe is again depicted relative to the time t1 802. It should be appreciated, however, that in a half-duplex system the relative subframe boundary for the uplink transmission would be later in time than the time t1 802.

Communication between a base station and a UE may involve transmission and reception of orthogonal frequency-division multiplexing (OFDM) symbols. A transmitted OFDM symbol may be subject to reflection and other channel-related influences resulting in some of the energy of the transmitted symbol taking different paths to a receiver (e.g., a receiver at the UE or the base station). These multipath components of the symbol result in interference at the receiver. This interference may be referred to as inter-symbol interference (ISI) since the energy of one OFDM symbol may interfere reception of another OFDM symbol. The time differences between the arrival times of these multipath components at the receiver depends on the delay spread of the channel.

To mitigate such ISI, each OFDM symbol transmitted by a transmitter may be preceded by a cyclic prefix (CP). In some examples, a CP for a given OFDM symbol contains a repetition of information from the end of that OFDM symbol. If the cyclic prefix is at least as long as the delay spread, the multipath effects may be canceled out during the cyclic prefix. In this case, the receiver may be able effectively decode the OFDM symbol.

As mentioned above, during full-duplex communication between a UE and a base station, an uplink transmission by the UE may interfere with the UE's reception of a downlink transmission from the base station. For example, the UE may transmit on a first antenna panel and receive on a second antenna panel. In some cases, some of the energy from an uplink transmission on the first antenna panel may be received at the second antenna panel. Thus, the UE's uplink transmission (e.g., a transmitted uplink OFDM symbol) may interfere with the UE's reception of a downlink transmission from the base station (e.g., a received downlink OFDM symbol). Similar self-interference may be experienced at the base station.

Figure 9:
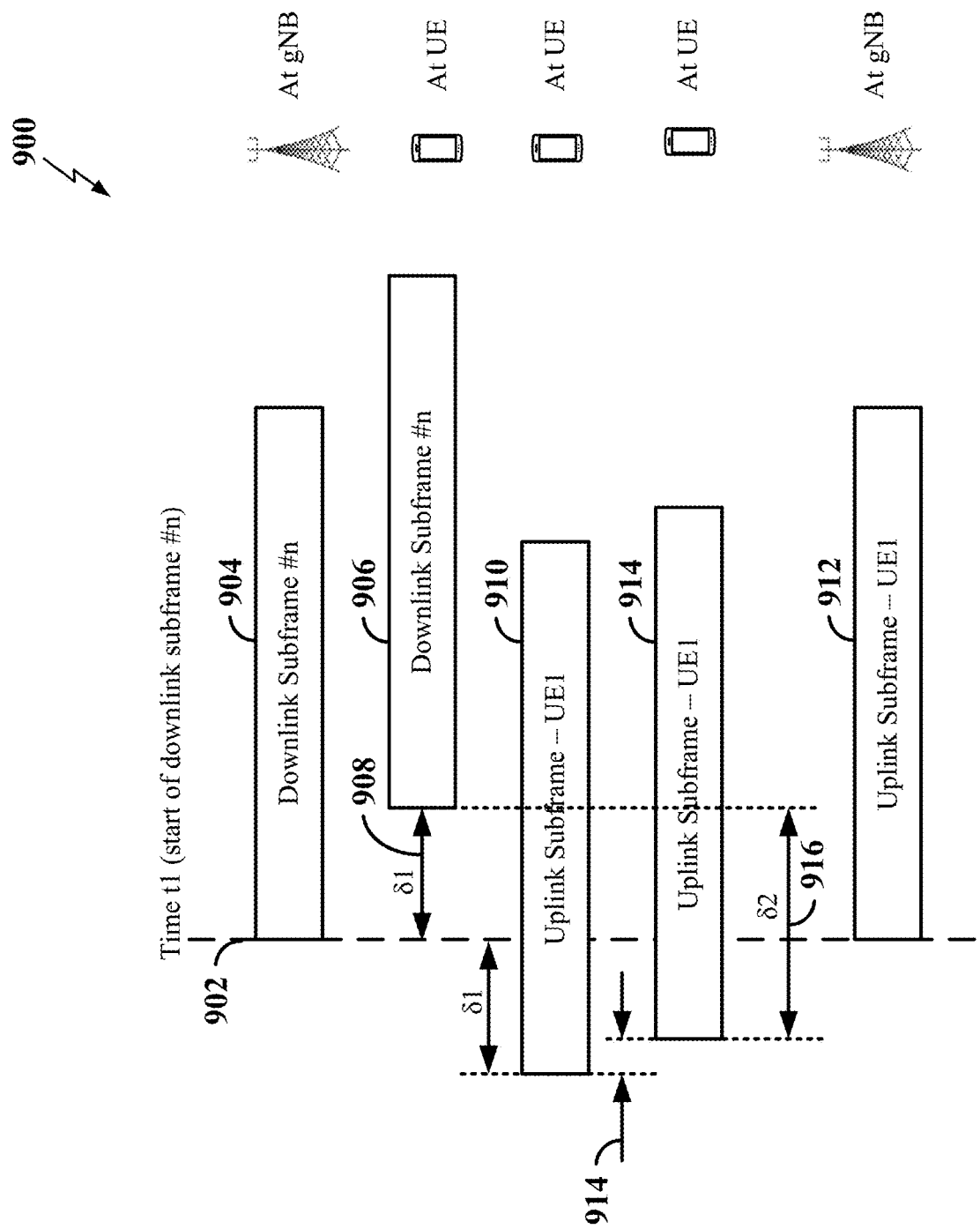
FIG. 9 is a conceptual illustration of uplink and downlink timing for full-duplex communication according to some aspects.

FIG. 9 illustrates an example of downlink and uplink timing for full-duplex communication 900 that shows an uplink transmission by a UE that may interfere with downlink reception at the UE. As represented by a downlink subframe 904 (designated as downlink subframe #n in this example), transmission of a downlink subframe at the gNB starts at the time t1 902. A downlink subframe 906 represents the delayed reception of the downlink subframe 904 at the UE. As indicated, the subframe 906 is received at the UE after a propagation delay δ1 908.

For full-duplex operation, it may be desired in some cases that uplink transmissions be received at the gNB time aligned with the gNB's subframe boundary. To this end, the UE may transmit an uplink subframe 910 at a time that precedes the gNB's subframe boundary by the propagation delay δ1. An uplink subframe 912 represents the delayed reception of the uplink subframe 910 at the gNB. As indicated, this uplink subframe is received time aligned with the gNB's subframe boundary.

FIG. 9 also illustrates that for a full-duplex scenario, the UE may receive energy from the uplink subframe 910 as represented by the uplink subframe 914. For example, the UE may receive the uplink subframe 914 at the same panel that the UE uses to receive the downlink subframe 906.

As discussed herein, receipt of the uplink subframe at the UE (e.g., receipt of energy from the UE's uplink transmission) may result in ISI at the UE's receiver. For example, the ISI may degrade the UE's reception of the downlink subframe 906 if the period of time δ2 916 between the UE's receipt of the downlink subframe 906 and the UE's receipt of the uplink subframe 914 is greater than a defined period of time (e.g., the length of the cyclic prefix, also referred to as the cyclic prefix period). The period of time δ2 916 may be referred to as a received timing difference herein.

A UE may be subject to forms of interference other than self-interference. For example, a UE may receive energy from a downlink transmission by one TRP when the UE is attempting to receive a downlink transmission by another TRP. The interference mitigation techniques described herein may be applicable to these scenarios as well. Moreover, the interference mitigation techniques described herein also may be applicable to interference mitigation at a base station.

The disclosure relates in some aspects to mitigating interference in scenarios where the received timing difference is greater than the cyclic prefix period. For example, one or more of a cyclic prefix length, a subcarrier spacing, a beam pair, or a frequency domain separation may be changed to mitigate the effects of ISI at a UE or a base station.

Also, although FIG. 9 illustrates a scenario where downlink subframes and uplink subframes are time aligned at the gNB, downlink subframes and uplink subframes might not be time aligned at the gNB in other scenarios. For example, a UE may transmit an uplink subframe closer in time to the subframe boundary to reduce the received timing difference between the reception of a downlink subframe at the UE and the reception of an interfering uplink subframe at the UE. For example, to reduce ISI, the timing of the uplink transmission may be configured (e.g., the duration of δ1 may be reduced) so that δ2 is less than the cyclic prefix period.

In some examples, a UE may determine a received timing difference (e.g., δ2) by conducting signal-to-interference-plus-noise ratio (SINR) measurements or other types of signal measurements. For example, a UE may measure downlink reference signals transmitted by a base station as well as uplink reference signals transmitted from an uplink beam to a receive beam of the UE. In some examples, the measured downlink reference signals are channel state information-reference signals (CSI-RS). In some examples, the measured uplink reference signals are sounding reference signals (SRS). Other types of signal measurements may be used in other examples.

A UE may use one panel (e.g., antenna array) to transmit uplink reference signals and another panel to measure the DL reference signals and the uplink reference signals. The timing difference between the time the UE receives a downlink signal and the time the UE receives its own uplink signals may then be measured. Based on this measurement, the UE and/or the base station may adjust at least one communication configuration to ensure that the timing difference does not exceed a specified value. For example, the UE and/or the base station may try to ensure that the received timing difference not exceed the duration of a cyclic prefix used for transmissions by the UE and/or the base station. In this way, the impact of ISI from the UE's uplink transmission may be reduced when the UE is receiving a downlink transmission from the base station.

In 5G NR, the duration of a cyclic prefix for a symbol depends on the subcarrier spacing (SCS) used to transit the symbol. FIG. 10 illustrates an example of respective cyclic prefix durations for subcarrier spacings of 15 kHz, 30 kHz, 60 kHz, 120 kHz, and 240 kHz. For example, for a subcarrier spacing of 15 kHz, the duration of the cyclic prefix is 4.69 microseconds (μs). As another example, for a subcarrier spacing of 120 kHz, the duration of the cyclic prefix is 0.57 μs. The respective cyclic prefix durations for subcarrier spacings may be (e.g., pre-)configured at a UE by a BS or a higher layer. Although not shown, the UE may also be configured with other normal cyclic prefix values and extended cyclic prefix values corresponding to higher frequencies, such as 480 kHz, 960 kHz, etc., and/or any other suitable subcarrier spacing frequency.

The subcarrier spacing used affects the distance at which a UE can reliably communicate with a base station. As discussed above, as the distance between the UE and the base station increases, the corresponding propagation delay increases. This, in turn, will cause the base station to send a larger timing advance (TA) value to the UE so that the UE will transmit its uplink transmission sooner in time. For example, for a subcarrier spacing of 15 kHz, Ts=1/(2048×15000) sec=$\frac{1}{30720000}$ seconds. Here, the parameter 2048 correspond to a normal fast Fourier transform (FFT) size, and the parameter 15000 corresponds to the subcarrier spacing. The granularity 16 Ts is given by 0.52 μs (corresponding to a 78 meters). For a 100 meter distance between a UE and a base station, the TA may be approximately 0.66 μs. For a 200 meter distance between a UE and a base station, the TA may be approximately 1.33 μs.

In some examples, is desirable for the TA value (or the measured received timing difference) to be less than the duration of the cyclic prefix. From FIG. 14, it may be seen that a subcarrier spacing of 15 kHz, 30 kHz, or 60 kHz may be acceptable for a UE to base station distance of 100 meters. However, an SCS of 120 kHz, 240 kHz, or more, may not be acceptable in this case for a timing difference of the TA value at the UE.

The disclosure relates in some aspects to specifying a longer cyclic prefix for certain subcarrier spacings. For example, as illustrated in FIG. 11, a normal cyclic prefix may be specified for subcarrier spacings of 15 kHz, 30 kHz, 60 kHz, 120 kHz, and 240 kHz as indicted in FIG. 10. In addition, optional extended cyclic prefixes may be defined for subcarrier spacings of 120 kHz, 240 kHz, 480 kHz, 960 kHz, and any other suitable subcarrier spacings (e.g., in addition to a previously defined extended cyclic prefix for a subcarrier spacing of 60 kHz).

By specifying an optional extended cyclic prefix for the subcarrier spacings with shorter cyclic prefix durations, timing at the UE may be aligned and ISI may be reduced. For example, a base station and/or a UE may elect to use an extended cyclic prefix when the measured received timing difference is greater than the duration of the normal cyclic prefix.

The disclosure thus relates in some aspects to using an extended cyclic prefix instead of a normal cyclic prefix under certain circumstances. For example, a base station and/or a UE may elect to use an extended cyclic prefix instead of a normal cyclic prefix if the received timing difference changes (e.g., due to mobility and/or environment changes). For example, a switch to an extended cyclic prefix may be made if the received timing difference is greater than the duration of the normal cyclic prefix.

In some examples, a base station may decide to switch to the extended cyclic prefix. For example, this decision may be made based on a measurement of the received timing difference made by the UE. In this case, the UE may report the measured received timing difference to the base station. In addition, the base station may indicate to the UE that the extended cyclic prefix will be used.

In some examples, a UE may decide to switch to the extended cyclic prefix. For example, this decision may be made based on a measurement of the received timing difference made by the UE. In this case, the UE may send a request to the base station to use an extended cyclic prefix (e.g., instead of a normal cyclic prefix). In addition, the base station may indicate to the UE that the request to use the extended cyclic prefix has been accepted.

In some examples, the extended cyclic prefix may be configurable based on a UE request or a base station indication. For example, the UE or base station may indicate the duration to be used for the cyclic prefix and the subcarrier spacing (or subcarrier spacings) to which this cyclic prefix applies.

In some examples, this configurable extended cyclic prefix may be dynamically signaled and/or semi-statically signaled. For example, a base station may send a MAC-CE, a DCI, or an RRC message to a UE to inform the UE of the configurable extended cyclic prefix to be used (e.g., in response to an autonomous decision by the base station or in response to a request from the UE). As another example, a UE may send a request for a configurable extended cyclic prefix to the base station via a MAC-CE, a UCI, or an RRC message.

Figure 12:
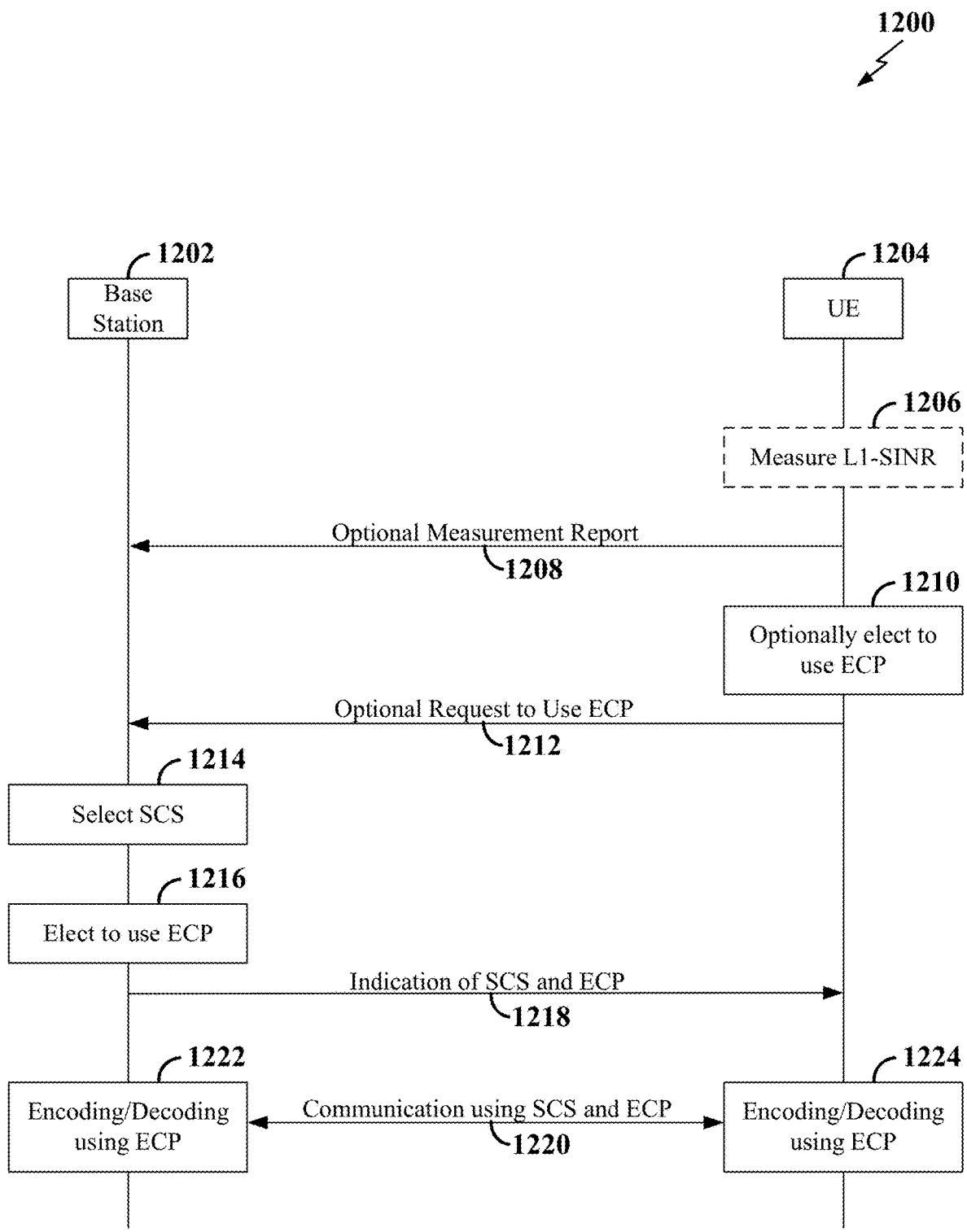
FIG. 12 is a signaling diagram illustrating signaling related to the use of an extended cyclic prefix according to some aspects.

FIG. 12 is a signaling diagram 1200 illustrating an example of extended cyclic prefix-related signaling in a wireless communication system including a base station (BS) 1202 and a UE 1204. In some examples, the BS 1202 may correspond to any of the base stations or scheduling entities shown in any of FIGS. 1, 2, 5-9, 13-15, 17, 22, 26, and 30. In some examples, the UE 1204 may correspond to any of the UEs or scheduled entities shown in any of FIGS. 1, 2, 5-9, 13-15, 17, 18, 26, and 28.

At optional step 1206 of FIG. 12, the UE 1204 may conduct protocol Layer 1 (L1) signal measurements during a full duplex operation. In some examples, the UE 1204 may measure SINR at the panel (e.g., panel 1) that the UE 1204 uses to receive a downlink transmission from the BS 1202. For example, as discussed herein, the UE 1204 may measure a CSI-RS transmitted by the BS 1202 during a downlink transmission as well as SRS transmitted by the UE 1204 during an uplink transmission (e.g., transmitted using panel 2). In some examples, the UE 1204 may thereby determine a measured received timing difference of downlink and uplink transmissions as discussed herein. For example, the UE 1204 may determine the difference between the time at which the UE 1204 received an SRS and the time at which the UE 1204 received a CSI-RS.

At optional step 1208, the UE 1204 may transmit a measurement report to the BS 1202 that includes measurement information from step 1206. In some examples, the measurement report may include raw measurement information (e.g., RSRP for CSI-RS and SRS, etc.). In some examples, the measurement report may include an indication of the measured received timing difference.

At optional step 1210, the UE 1204 may elect to use an extended cyclic prefix (ECP). For example, as discussed above, if the measurement information from step 1206 indicates that the measured received timing difference is greater than the duration of the normal cyclic prefix (NCP) currently designated for a communication with the BS 1202, the UE 1204 may elect to use an ECP instead of the NCP.

At optional step 1212, the UE 1204 may thus transmit a request to the BS 1202 that requests use of an ECP in some examples. For example, the UE 1204 may transmit a MAC-CE, a UCI, an RRC message, or some other type of message that includes a request to use an ECP. In some examples, this request may be for a configurable ECP. For example, the request may specify a particular ECP and/or a duration of the ECP.

In some examples, a decision by the UE 1204 to transmit the request (or to make the election of step 1210) may be based on a threshold. For example, the UE 1204 may elect to send the request or elect to use ECP if the measured received timing difference is beyond the threshold and/or the number of times the measured received timing difference is beyond the threshold during a period of time is above another threshold. In some examples, the BS 1202 may configure the UE 1204 with the threshold (e.g., by sending an indication to the UE 1204 using any of the signaling discussed herein).

At step 1214, at some point in time (e.g., when the BS 1202 schedules a communication with the UE 1204), the BS 1202 selects an SCS to use for a communication (e.g., a downlink transmission and/or an uplink transmission). The selection of the SCS may depend on, for example, the data rate and/or latency requirements of traffic to be sent between the BS 1202 and the UE 1204 and, optionally, other factors (e.g., channel conditions, congestion, coverage issues, etc.).

At step 1216, the BS 1202 elects to use an extended cyclic prefix (ECP) in some examples. For example, if measurement information received at step 1208 indicates that the measured received timing difference is greater than the duration of the NCP for the SCS selected at step 1214, the BS 1202 may elect to use an ECP instead of the NCP. As another example, if the BS 1202 receives a request from the UE 1204 to use an ECP instead of the NCP at step 1212, the BS 1202 may elect to use an ECP instead of the NCP.

At step 1218, the BS 1202 transmits an indication of the selected SCS and the ECP to the UE 1204. For example, the base station 1202 may transmit a MAC-CE, a DCI, an RRC message, or some other type of message that indicates the SCS and the ECP. In some examples, this indication may be for a configurable ECP. For example, the indication may specify a particular ECP and/or a duration of the ECP.

At step 1220, the BS 1202 and the UE 1204 communicate using the selected SCS and the ECP. To this end, at step 1222, the BS 1202 may encode a downlink transmission using the ECP (e.g., transmit OFDM symbols with ECPs) and/or decode an uplink transmission using the ECP (e.g., receive OFDM symbols with ECPs). Similarly, at step 1224, the UE 1204 may encode an uplink transmission using the ECP (e.g., transmit OFDM symbols with ECPs) and/or decode a downlink transmission using the ECP (e.g., receive OFDM symbols with ECPs).

The disclosure relates in some aspects to switching to a smaller subcarrier spacing under certain circumstances. For example, a base station and/or a UE may elect to use a smaller subcarrier spacing if the received timing difference changes (e.g., due to mobility and/or environment changes). Here, a switch to a smaller subcarrier spacing may be made if the received timing difference is greater than the duration of the cyclic prefix currently in use. As discussed above, a smaller subcarrier spacing may have a longer cyclic prefix. Thus, ISI may be reduced by switching to a smaller subcarrier spacing.

In some examples, a base station may decide to switch to a smaller subcarrier spacing. For example, this decision may be made based on a measurement of the received timing difference made by the UE. In this case, the UE may report the measured received timing difference to the base station. In addition, the base station may indicate to the UE that the smaller subcarrier spacing will be used.

In some examples, a UE may decide to switch to a smaller subcarrier spacing. For example, this decision may be made based on a measurement of the received timing difference made by the UE. In this case, the UE may send a request to the base station to use a smaller subcarrier spacing. In addition, the base station may indicate to the UE that the request to use the smaller subcarrier spacing has been accepted.

In some examples, a specific subcarrier spacing may be specified in a UE request or a base station indication. For example, the UE or base station may indicate the specific subcarrier spacing to be used. In some examples, the UE or base station may calculate the subcarrier spacing needed based on the received timing difference (e.g., a subcarrier spacing having a cyclic prefix duration that is less than the measured received timing difference may be selected).

In some examples, a change in subcarrier spacing may be dynamically signaled and/or semi-statically signaled. For example, a base station may send a MAC-CE, a DCI, or an RRC message to a UE to inform the UE that a lower subcarrier spacing is to be used (e.g., in response to an autonomous decision by the base station or in response to a request from the UE). As another example, a UE may send a request for a lower subcarrier spacing (or a specific subcarrier spacing) to the base station via a MAC-CE, a UCI, or an RRC message.

Figure 13:
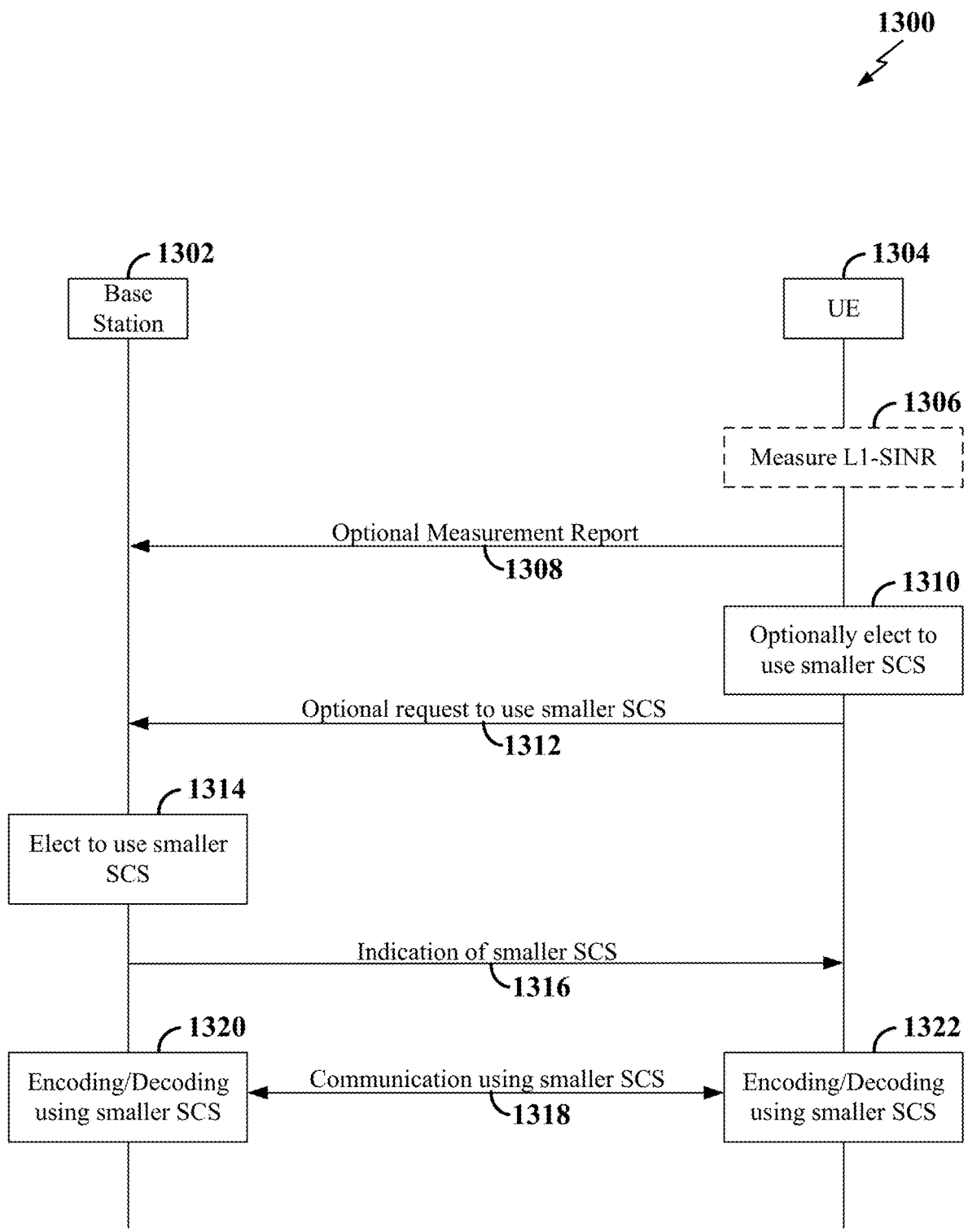
FIG. 13 is a signaling diagram illustrating signaling related to switching to a smaller subcarrier spacing according to some aspects.

FIG. 13 is a signaling diagram 1300 illustrating an example of SCS-related signaling in a wireless communication system including a base station (BS) 1302 and a UE 1304. In some examples, the BS 1302 may correspond to any of the base stations or scheduling entities shown in any of FIGS. 1, 2, 5-9, 12, 14-15, 17, and 22. In some examples, the UE 1304 may correspond to any of the UEs or scheduled entities shown in any of FIGS. 1, 2, 5-9, 12, 14-15, 17, and 18.

At step 1306 of FIG. 13, the UE 1304 may conduct protocol Layer 1 (L1) signal measurements during a full duplex operation. For example, the UE 1304 may perform operations similar to those discussed above in conjunction with step 1206 of FIG. 12.

At optional step 1308, the UE 1304 may transmit a measurement report to the BS 1302 that includes measurement information from step 1306. For example, the UE 1304 may perform operations similar to those discussed above in conjunction with step 1208 of FIG. 12.

At optional step 1310, the UE 1304 may elect to use a smaller SCS in some examples. For example, as discussed above, if the measurement information from step 1306 indicates that the measured received timing difference is greater than the duration of the normal cyclic prefix (NCP) currently designated for a communication with the BS 1302, the UE 1304 may elect to use a smaller SCS that has a longer NCP. In some examples, the UE 1304 may identify a particular SCS that has an NCP that is longer than the measured received timing difference.

At optional step 1312, the UE 1304 may thus transmit a request to the BS 1302 that requests use of a smaller SCS in some examples. For example, the UE 1304 may transmit a MAC-CE, a UCI, an RRC message, or some other type of message that includes a request to use a smaller SCS. In some examples, this request may specify a specific SCS that the UE 1304 has identified as being acceptable or preferred.

In some examples, a decision by the UE 1304 to transmit the request (or to make the election of step 1310) may be based on a threshold. For example, the UE 1304 may elect to send the request or elect to use a smaller SCS if the measured received timing difference is beyond the threshold and/or the number of times the measured received timing difference is beyond the threshold during a period of time is above another threshold. In some examples, the BS 1302 may configure the UE 1304 with the threshold (e.g., by sending an indication to the UE 1304 using any of the signaling discussed herein).

At step 1314, at some point in time (e.g., when the BS 1302 schedules a communication with the UE 1304), the BS 1302 elects to use a smaller SCS for a communication with the UE 1304 in some examples. For example, if measurement information received at step 1308 indicates that the measured received timing difference is greater than the duration of the NCP for the SCS selected at step 1314, the BS 1302 may elect to use a smaller SCS than the SCS currently designated for the communication with the UE 1304. Here, the BS 1302 may identify a particular SCS that has an NCP that is longer than the measured received timing difference. As another example, if the BS 1302 receives a request from the UE 1304 to use a smaller SCS at step 1312, the BS 1302 may elect to use a smaller SCS. Here, the BS 1302 may identify particular SCS that has an NCP that is longer than the measured received timing difference or the BS 1302 may elect to use an SCS specified by the request.

At step 1316, the BS 1302 transmits an indication of the smaller SCS to the UE 1304. For example, the base station 1302 may transmit a MAC-CE, a DCI, an RRC message, or some other type of message that indicates the SCS.

At step 1318, the BS 1302 and the UE 1304 communicate using the smaller SCS. To this end, at step 1320, the BS 1302 may encode a downlink transmission that uses the smaller SCS (e.g., transmit OFDM symbols according to the SCS) and/or decode an uplink transmission that uses the smaller SCS (e.g., receive OFDM symbols according to the SCS). Similarly, at step 1322, the UE 1304 may encode an uplink transmission that uses the smaller SCS (e.g., transmit OFDM symbols according to the SCS) and/or decode a downlink transmission that uses the smaller SCS (e.g., receive OFDM symbols according to the SCS).

The disclosure relates in some aspects to switching from a first beam pair to a second beam pair under certain circumstances. In some cases, one beam pair may have lower interference (leakage) than another beam pair. In some cases, one beam pair may have better timing characteristics (e.g., a shorter measured received timing difference) than another beam pair. Thus, ISI may be reduced by switching to a different beam pair.

A base station and/or a UE may elect to switch to a different beam pair if the received timing difference changes (e.g., due to changing clutter). Here, a switch to a different beam pair may be made if the received timing difference is greater than the duration of the cyclic prefix currently in use.

Figure 14:
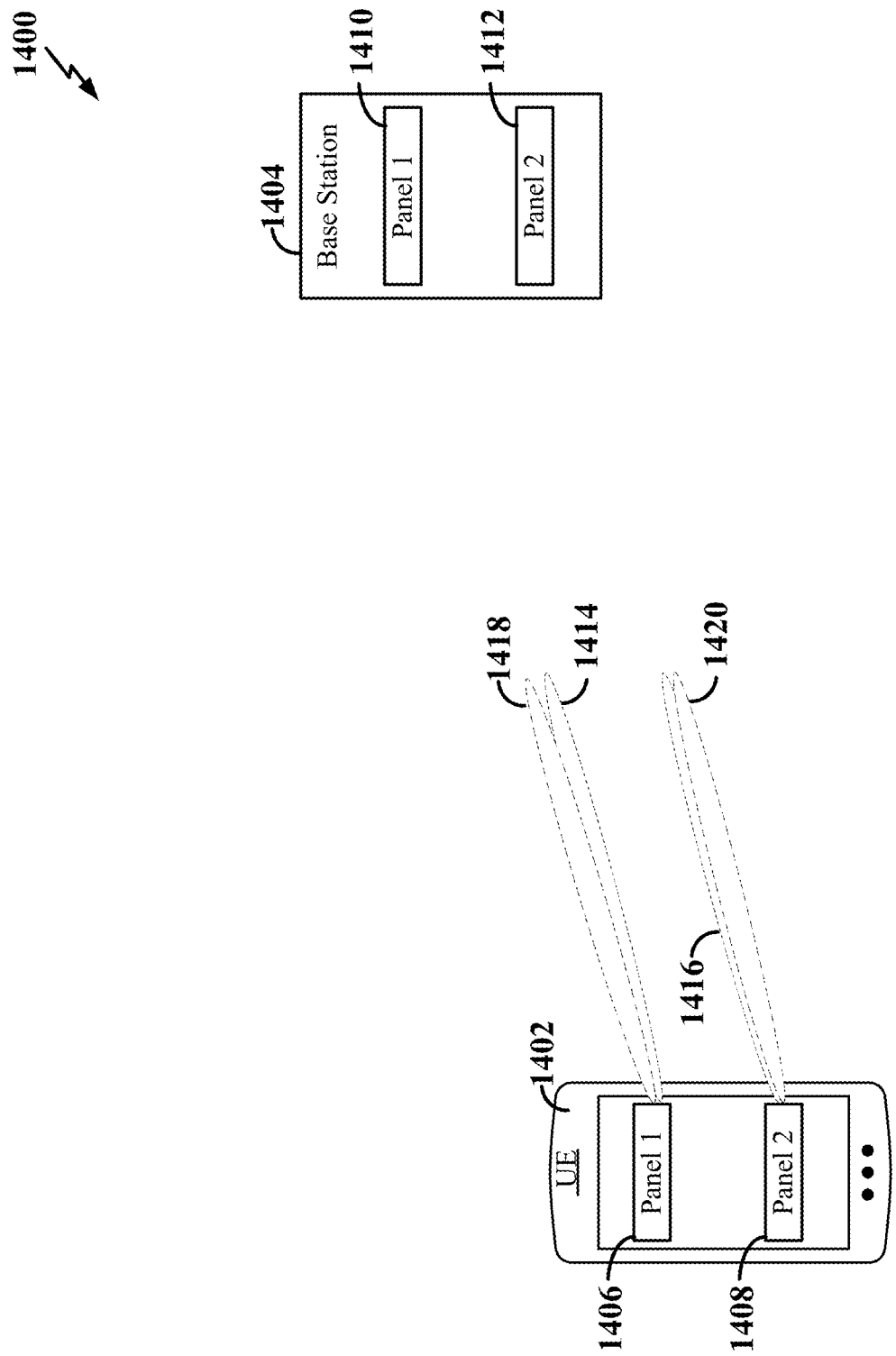
FIG. 14 is a diagram illustrating an example of beam switching according to some aspects.

FIG. 14 is a conceptual illustration of a beam pair switch in a wireless communication system 1400 including a UE 1402 and a base station (BS) 1404. In some examples, the UE 1402 may correspond to any of the UEs or scheduled entities shown in any of FIGS. 1, 2, 5-9, 12-13, 15, 17, and 18. In some examples, the BS 1404 may correspond to any of the base stations or scheduling entities shown in any of FIGS. 1, 2, 5-9, 12-13, 15, 17, and 22.

The UE 1402 includes a first panel 1406 and a second panel 1408. Similarly, the BS 1404 includes at least a first panel 1410 and a second panel 1412.

Initially, the UE 1402 transmits to the BS 1404 via a first transmit beam 1414 transmitted by the first panel 1406. In addition, the UE 1402 receives from the BS 1404 via a first receive beam 1416 received by the second panel 1408. Thus, the first transmit beam 1414 and the first receive beam 1416 constitute a first beam pair.

After a decision is made to switch to a different beam pair, the UE 1402 may transmit to the BS 1404 via a second transmit beam 1418 transmitted by the first panel 1406. In addition, the UE 1402 may receive from the BS 1404 via a second receive beam 1420 received by the second panel 1408. The second transmit beam 1418 and the second receive beam 1420 constitute a second beam pair. In some examples, the second beam pair may provide better spatial separation (between a transmit beam and a receive beam) than the first beam pair. In some examples, the second beam pair may provide a smaller measured received timing difference than the first beam pair. In some examples, the second beam pair may provide lower self-interference and/or a higher SINR than the first beam pair.

In some examples, a base station may decide to switch to a different beam pair. For example, this decision may be made based on a measurement of the received timing difference made by the UE or interference measurements. In this case, the UE may report the measured received timing difference to the base station. In addition, the base station may indicate to the UE that the different beam pair will be used.

In some examples, a UE may decide to switch to different beam pair. For example, this decision may be made based on a measurement of the received timing difference made by the UE or interference measurements. In this case, the UE may send a request to the base station to use different beam pair. In addition, the base station may indicate to the UE that the request to use the different beam pair has been accepted.

In some examples, a specific beam pair may be specified in a UE request or a base station indication. For example, the UE or base station may indicate the specific beam pair to be used. In some examples, the UE or base station may identify a specific beam pair based on the received timing difference (e.g., a beam pair known to have a lower measured received timing difference may be selected).

In some examples, a change to a different beam pair may be dynamically signaled and/or semi-statically signaled. For example, a base station may send a MAC-CE, a DCI, or an RRC message to a UE to inform the UE that a different beam pair is to be used (e.g., in response to an autonomous decision by the base station or in response to a request from the UE). As another example, a UE may send a request for a different beam pair (or a specific beam pair) to the base station via a MAC-CE, a UCI, or an RRC message.

Figure 15:
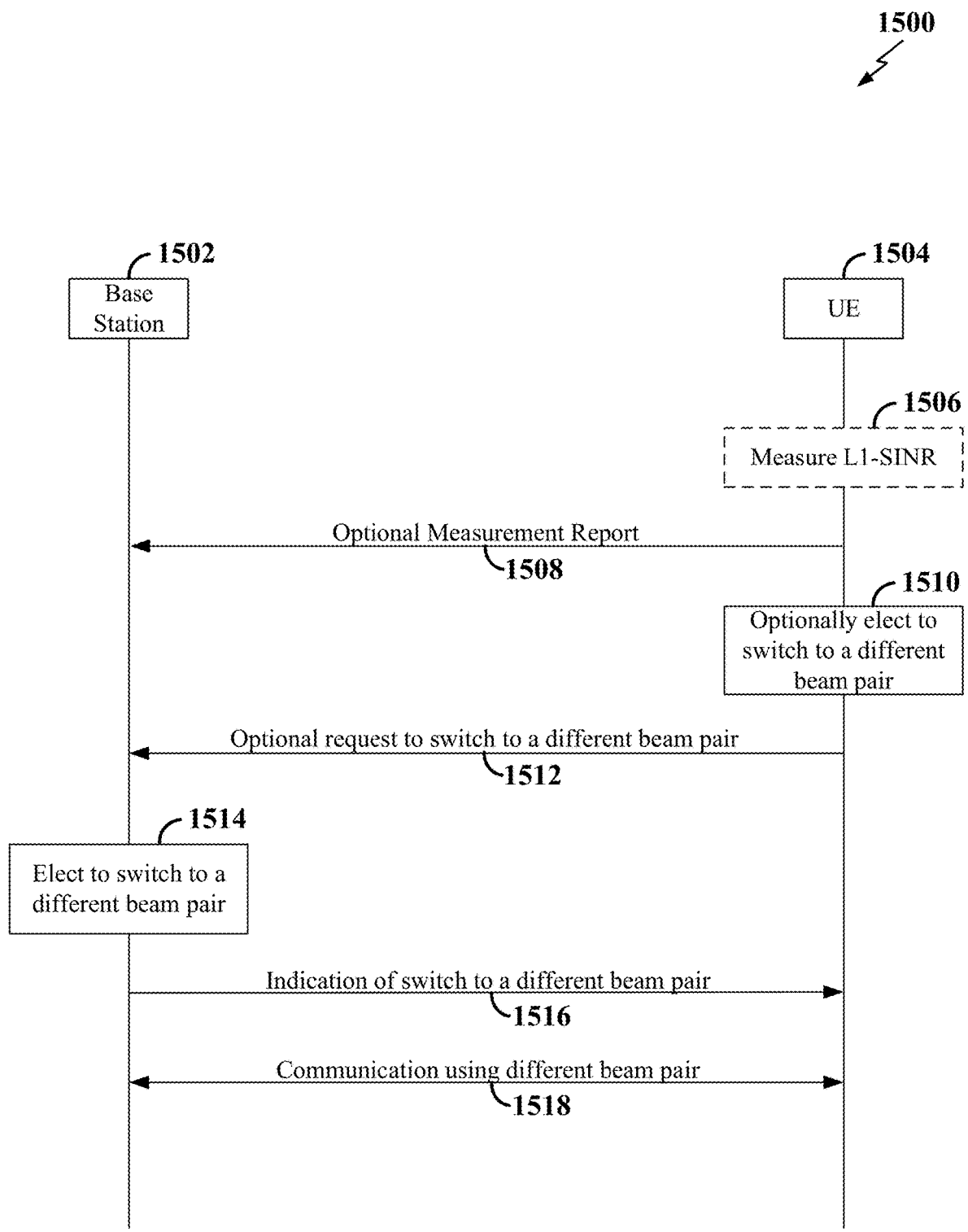
FIG. 15 is a signaling diagram illustrating signaling related to beam switching according to some aspects.

FIG. 15 is a signaling diagram 1500 illustrating an example of beam pair switch-related signaling in a wireless communication system including a base station (BS) 1502 and a UE 1504. In some examples, the BS 1502 may correspond to any of the base stations or scheduling entities shown in any of FIGS. 1, 2, 5-9, 12-14, 17, and 22. In some examples, the UE 1504 may correspond to any of the UEs or scheduled entities shown in any of FIGS. 1, 2, 5-9, 12-14, 17, and 18.

At step 1506 of FIG. 15, the UE 1504 may conduct protocol Layer 1 (L1) signal measurements during a full duplex operation. For example, the UE 1504 may perform operations similar to those discussed above in conjunction with step 1206 of FIG. 12.

At optional step 1508, the UE 1504 may transmit a measurement report to the BS 1502 that includes measurement information from step 1506. For example, the UE 1504 may perform operations similar to those discussed above in conjunction with step 1208 of FIG. 12.

At optional step 1510, the UE 1504 may elect to use a different beam pair in some examples. For example, as discussed above, if the measurement information from step 1506 indicates that the measured received timing difference is greater than the duration of the normal cyclic prefix (NCP) currently designated for a communication with the BS 1502, the UE 1504 may elect to switch from a first beam pair to a second beam pair. In some examples, the UE 1504 may identify a second beam pair that has a shorter measured received timing difference and/or lower interference than the first beam pair.

At optional step 1512, the UE 1504 may thus transmit a request to the BS 1502 that requests use of a different beam pair in some examples. For example, the UE 1504 may transmit a MAC-CE, a UCI, an RRC message, or some other type of message that includes a request to use a different beam pair. In some examples, this request may specify a particular beam pair that the UE 1504 has identified as being acceptable or preferred.

In some examples, a decision by the UE 1504 to transmit the request (or to make the election of step 1510) may be based on a threshold. For example, the UE 1504 may elect to send the request or elect to switch to a different beam pair if the measured received timing difference is beyond the threshold and/or the number of times the measured received timing difference is beyond the threshold during a period of time is above another threshold. In some examples, the BS 1502 may configure the UE 1504 with the threshold (e.g., by sending an indication to the UE 1504 using any of the signaling discussed herein).

At step 1514, at some point in time (e.g., when the BS 1502 schedules a communication with the UE 1504), the BS 1502 elects to use a different beam pair for a communication with the UE 1504 in some examples. For example, if measurement information received at step 1508 indicates that the measured received timing difference is greater than the duration of the NCP for a currently scheduled communication, the BS 1502 may elect to specify a different beam pair for the UE 1504 than the beam pair currently designated for the communication with the UE 1504. Here, the BS 1502 may identify a second beam pair that has a shorter measured received timing difference and/or lower interference than the first beam pair. As another example, if the BS 1502 receives a request from the UE 1504 to use a different beam pair at step 1512, the BS 1502 may elect to configure the UE 1504 to switch from a first beam pair to a second beam pair. Here, the BS 1502 may identify a second beam pair that has a shorter measured received timing difference and/or lower interference than the first beam pair or the BS 1502 may elect to use a beam pair specified by the request.

At step 1516, the BS 1502 transmits an indication of the different beam pair to the UE 1504. For example, the base station 1502 may transmit a MAC-CE, a DCI, an RRC message, or some other type of message that indicates that the UE 1504 is to use the second beam pair. At step 1518, the UE 1504 communicates with the BS 1502 using the second beam pair.

The disclosure relates in some aspects to increasing the frequency domain separation between beams of a beam pair under certain circumstances. In some cases, increasing the frequency domain separation between the resources allocated for different beam of the beam pair may reduce the interference (leakage).

Figures 16A, 16B:
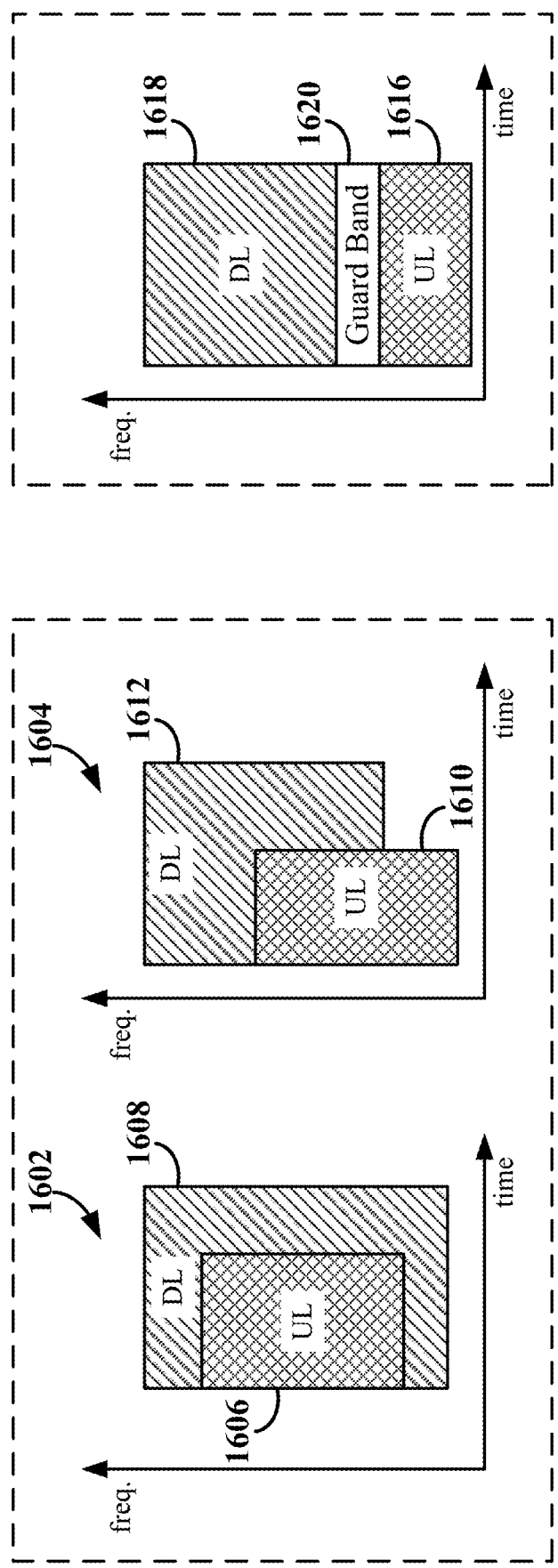
FIGS. 16A and 16B are diagrams illustrating frequency domain separation according to some aspects.

Several examples of changes in frequency domain separation will be described with reference to FIGS. 16A and 16B. FIG. 16A is a diagram illustrating two examples of overlapping frequency spectrum for the UL and the DL.

FIG. 16B is a diagram illustrating an example of non-overlapping frequency spectrum for the UL and the DL (e.g., sub-band FDD, also known as flexible duplex).

In the examples shown in FIG. 16A, time is illustrated along the horizontal axis while frequency is illustrated along the vertical axis. A first example 1602 of overlapping frequency spectrum is depicted on the left while a second example 1604 is depicted on the right. In the first example 1602, the UL time-frequency resources 1606 completely overlap with a portion of the DL time-frequency resources 1608. In the second example 1604, the UL time-frequency resources 1610 partially overlap with a portion of the DL time-frequency resources 1612. Accordingly, a device, for example a base station and/or a scheduled entity, employing overlapping frequency spectrum may transmit and receive on the same time and frequency resources. That is, the device may transmit and receive at the same time(s) at the same frequency (or frequencies). The UL and DL share the same time and frequency resources. The overlap in time-frequency resources may be complete, as in the first example 1602, or partial, as in the second example 1604.

In either case, an increase in the frequency domain separation for the UL and the DL may be achieved by shifting the frequency resources used for the UL and/or the DL. In the first example 1602, the UL time-frequency resources 1606 may be shifted up or down in frequency, the DL time-frequency resources 1608 may be shifted up or down in frequency, or the UL time-frequency resources 1606 and the DL time-frequency resources 1608 may be shifted in opposite directions. Similarly, in the second examples 1612, the UL time-frequency resources 1610 may be shifted down in frequency and/or the DL time-frequency resources 1612 may be shifted up in frequency.

In the example shown in FIG. 16B, time is illustrated along the horizontal axis while frequency is illustrated along the vertical axis. Here, a device may transmit and receive at the same time but on different frequency resources in unpaired spectrum (e.g., within the same carrier bandwidth). The UL time-frequency resources 1616 are separated from the DL time-frequency resources 1618 by a guard band 1620.

In the example of FIG. 16B, an increase in the frequency domain separation for the UL and the DL may be achieved by increasing the size of the guard band 1620. For example, additional frequency tones may be allocated to the guard band which will result in the UL time-frequency resources 1616 being shifted down in frequency and/or the DL time-frequency resources 1618 being shifted up in frequency.

In some examples, if a UE cannot identify a beam pair where the DL/UL received timing difference is less than the current cyclic prefix duration, the UE may request more frequency domain separation to help mitigate the ISI impact (e.g., to mitigate ISI due to asynchronous timing between the beams). In some examples, this request may simply request additional frequency domain separation (e.g., leaving the choice of the amount of separation to be added to the base station). In some examples, this request may request a specific frequency domain separation or a specific increase in the frequency domain separation (e.g., by specifying the exact number of RBs to be added to the current frequency domain separation).

In examples where the frequency resources for the bands are overlapping (e.g., the example of FIG. 16A), the request may request that the overlap be reduced. For example, the request may request that M fewer RBs overlap. This request could optionally include an indication of the specific location of the frequency resources.

In examples where the frequency resources for the bands are separated by a guard band (e.g., the example of FIG. 16B), the request may request that the guard band be increased. For example, the request may request that the guard band between DL and UL frequency bands be increased in size by N RBs. This request could optionally include an indication of the specific location of the frequency resources.

A base station and/or a UE may elect to increase the frequency domain separation if the received timing difference changes. Here, an increase in the frequency domain separation may be made if the received timing difference is greater than the duration of the cyclic prefix currently in use.

In some examples, a base station may decide to increase the frequency domain separation. For example, this decision may be made based on a measurement of the received timing difference made by the UE or interference measurements. In this case, the UE may report the measured received timing difference to the base station. In addition, the base station may indicate to the UE that the frequency domain separation has been increased.

In some examples, a UE may decide to increase the frequency domain separation. For example, this decision may be made based on a measurement of the received timing difference made by the UE or interference measurements. In this case, the UE may send a request to the base station to increase the frequency domain separation. In addition, the base station may indicate to the UE that the request to increase the frequency domain separation has been accepted.

In some examples, an increase the frequency domain separation may be dynamically signaled and/or semi-statically signaled. For example, a base station may send a MAC-CE, a DCI, or an RRC message to a UE to inform the UE that the frequency domain separation has been increased (e.g., in response to an autonomous decision by the base station or in response to a request from the UE). As another example, a UE may send a request for additional frequency domain separation to the base station via a MAC-CE, a UCI, or an RRC message.

Figure 17:
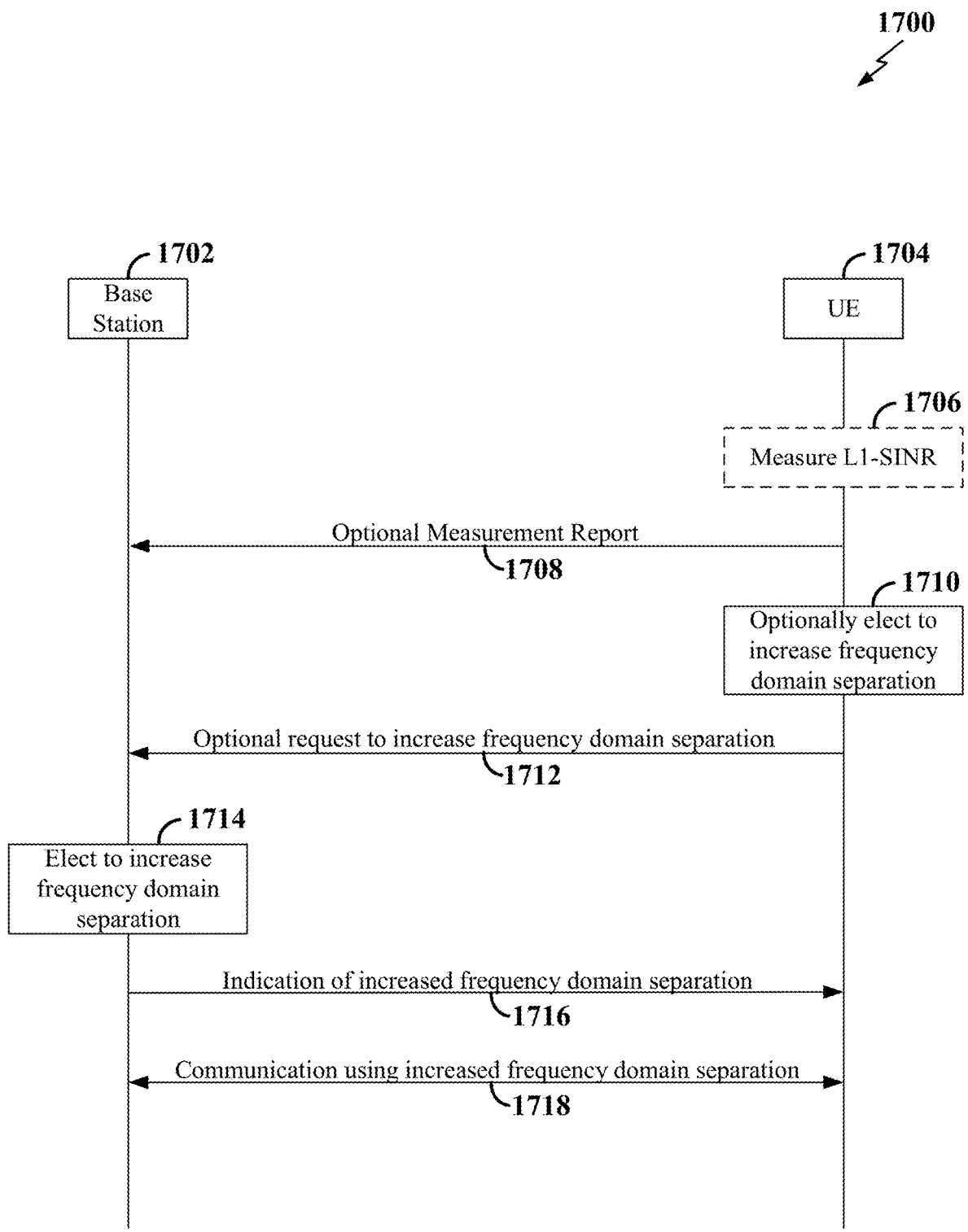
FIG. 17 is a signaling diagram illustrating signaling related to adding frequency domain separation according to some aspects.

FIG. 17 is a signaling diagram 1700 illustrating an example of frequency domain separation-related signaling in a wireless communication system including a base station (BS) 1702 and a UE 1704. In some examples, the BS 1702 may correspond to any of the base stations or scheduling entities shown in any of FIGS. 1, 2, 5-9, 12-15, 22, 26, and 30. In some examples, the UE 1704 may correspond to any of the UEs or scheduled entities shown in any of FIGS. 1, 2, 5-9, 12-15, 18, 26, and 28.

At step 1706 of FIG. 17, the UE 1704 may conduct protocol Layer 1 (L1) signal measurements during a full duplex operation. For example, the UE 1704 may perform operations similar to those discussed above in conjunction with step 1206 of FIG. 12.

At optional step 1708, the UE 1704 may transmit a measurement report to the BS 1702 that includes measurement information from step 1706. For example, the UE 1704 may perform operations similar to those discussed above in conjunction with step 1208 of FIG. 12.

At optional step 1710, the UE 1704 may elect to increase the frequency domain separation between UL transmissions and DL transmissions in some examples. For example, as discussed above, if the measurement information from step 1706 indicates that the measured received timing difference is greater than the duration of the normal cyclic prefix (NCP) currently designated for a communication with the BS 1702, the UE 1704 may elect to increase the frequency domain separation. In some examples, the UE 1704 may identify a specific amount of additional frequency domain separation (e.g., based on a magnitude of measured leakage from the UL to the DL or vice versa).

At optional step 1712, the UE 1704 may thus transmit a request to the BS 1702 that requests additional frequency domain separation in some examples. For example, the UE 1704 may transmit a MAC-CE, a UCI, an RRC message, or some other type of message that includes a request to increase the frequency domain separation. In some examples, this request may specify an amount of increase in the frequency domain separation that the UE 1704 has identified as being acceptable or preferred.

In some examples, a decision by the UE 1704 to transmit the request (or to make the election of step 1710) may be based on a threshold. For example, the UE 1704 may elect to send the request or elect to increase the frequency domain separation if the measured received timing difference is beyond the threshold and/or the number of times the measured received timing difference is beyond the threshold during a period of time is above another threshold. In some examples, the BS 1702 may configure the UE 1704 with the threshold (e.g., by sending an indication to the UE 1704 using any of the signaling discussed herein).

At step 1714, at some point in time (e.g., when the BS 1702 schedules a communication with the UE 1704), the BS 1702 elects to increase the frequency domain separation for a communication with the UE 1704 in some examples. For example, if measurement information received at step 1708 indicates that the measured received timing difference is greater than the duration of the NCP for a currently scheduled communication, the BS 1702 may elect to use more frequency domain separation than the frequency domain separation currently designated for the communication with the UE 1704. Here, the BS 1702 may identify a specific increase in the frequency domain separation (e.g., based on cross-beam leakage information obtained from the measurement report). As another example, if the BS 1702 receives a request from the UE 1704 for additional frequency domain separation at step 1712, the BS 1702 may elect to allocate additional frequency domain separation for the communication with the UE 1704. Here, the BS 1702 may identify a specific increase in the frequency domain separation (e.g., based on cross-beam leakage information obtained from the measurement report) or the BS 1702 may elect to use a specific increase in the frequency domain separation specified by the request.

At step 1716, the BS 1702 transmits an indication of the increase in the frequency domain separation to the UE 1704. For example, the base station 1702 may transmit a MAC-CE, a DCI, an RRC message, or some other type of message that indicates the increased frequency domain separation. At step 1718, the UE 1704 communicates with the BS 1702 using the newly allocated frequency resources.

Figure 18:
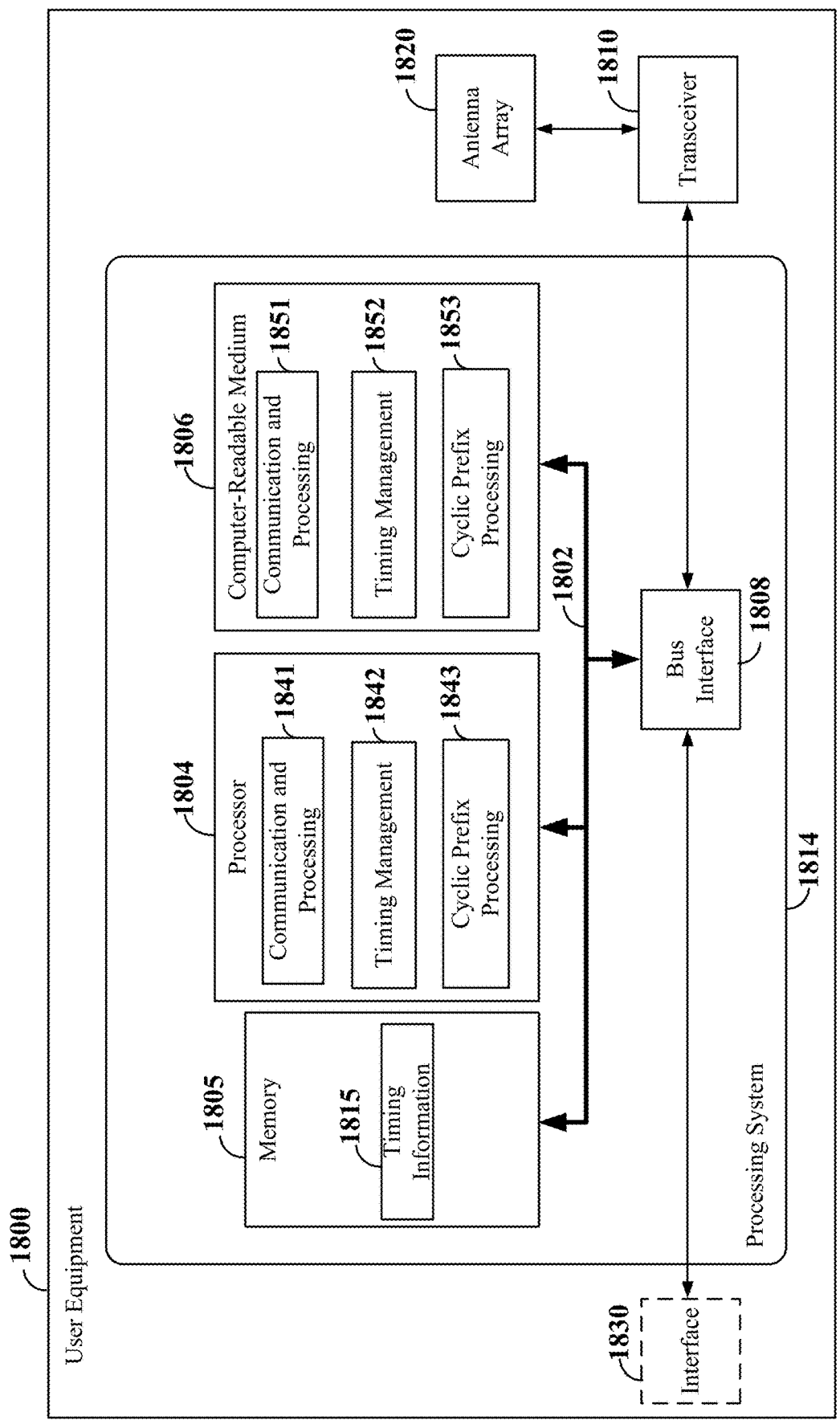
FIG. 18 is a block diagram illustrating an example of a hardware implementation for a user equipment employing a processing system according to some aspects.

FIG. 18 is a block diagram illustrating an example of a hardware implementation for a UE 1800 employing a processing system 1814. For example, the UE 1800 may be a device configured to wirelessly communicate with a base station, as discussed in any one or more of FIGS. 1-17. In some implementations, the UE 1304 may correspond to any of the UEs or scheduled entities shown in any of FIGS. 1, 2, 5-9, 12-15, 17, 26, and 28.

In accordance with various aspects of the disclosure, an element, or any portion of an element, or any combination of elements may be implemented with the processing system 1814. The processing system 1814 may include one or more processors 1804. Examples of processors 1804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1800 may be configured to perform any one or more of the functions described herein. That is, the processor 1804, as utilized in a UE 1800, may be used to implement any one or more of the processes and procedures described herein.

The processor 1804 may in some instances be implemented via a baseband or modem chip and in other implementations, the processor 1804 may itself comprise a number of devices distinct and different from a baseband or modem chip (e.g., in such scenarios as may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1814 may be implemented with a bus architecture, represented generally by the bus 1802. The bus 1802 may include any number of interconnecting buses and bridges depending on the specific application of the processing system 1814 and the overall design constraints. The bus 1802 communicatively couples together various circuits including one or more processors (represented generally by the processor 1804), a memory 1805, and computer-readable media (represented generally by the computer-readable medium 1806). The bus 1802 may also link various other circuits such as timing sources, peripherals, voltage regulators, and power management circuits, which are well known in the art, and therefore, will not be described any further. A bus interface 1808 provides an interface between the bus 1802 and a transceiver 1810 and between the bus 1802 and an interface 1830. The transceiver 1810 provides a communication interface or means for communicating with various other apparatus over a wireless transmission medium. In some examples, the UE may include two or more transceivers 1810, each configured to communicate with a respective network type (e.g., terrestrial or non-terrestrial). The interface 1830 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 1830 may include a user interface (e.g., keypad, display, speaker, microphone, joystick). Of course, such a user interface is optional, and may be omitted in some examples, such as an IoT device.

The processor 1804 is responsible for managing the bus 1802 and general processing, including the execution of software stored on the computer-readable medium 1806. The software, when executed by the processor 1804, causes the processing system 1814 to perform the various functions described below for any particular apparatus. The computer-readable medium 1806 and the memory 1805 may also be used for storing data that is manipulated by the processor 1804 when executing software.

One or more processors 1804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1806.

The computer-readable medium 1806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1806 may reside in the processing system 1814, external to the processing system 1814, or distributed across multiple entities including the processing system 1814. The computer-readable medium 1806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1800 may be configured to perform any one or more of the operations described herein (e.g., as described above in conjunction with FIGS. 1-17 and as described below in conjunction with FIGS. 19-21). In some aspects of the disclosure, the processor 1804, as utilized in the UE 1800, may include circuitry configured for various functions.

The processor 1804 may include communication and processing circuitry 1841. The communication and processing circuitry 1841 may be configured to communicate with a base station, such as a gNB. The communication and processing circuitry 1841 may include one or more hardware components that provide the physical structure that performs various processes related to wireless communication (e.g., signal reception and/or signal transmission) as described herein. The communication and processing circuitry 1841 may further include one or more hardware components that provide the physical structure that performs various processes related to signal processing (e.g., processing a received signal and/or processing a signal for transmission) as described herein. In some examples, the communication and processing circuitry 1841 may include two or more transmit/receive chains, each configured to process signals in a different RAT (or RAN) type. The communication and processing circuitry 1841 may further be configured to execute communication and processing software 1851 included on the computer-readable medium 1806 to implement one or more functions described herein.

In some examples, the communication and processing circuitry 1841 may be configured to receive and process downlink beamformed signals at a mmWave frequency or a sub-6 GHz frequency via the transceiver 1810 and an antenna array 1820. For example, the communication and processing circuitry 1841 may be configured to receive a respective reference signal (e.g., SSB or CSI-RS) on each of a plurality of downlink beams from the base station during a downlink beam sweep via at least one first antenna panel of the antenna array 1820. The communication and processing circuitry 1841 may further be configured to transmit a beam measurement report to the base station.

In some examples, the communication and processing circuitry 1841 may further be configured to generate and transmit uplink beamformed signals at a mmWave frequency or a sub-6 GHz frequency via the transceiver 1810 and the antenna array 1820. For example, the communication and processing circuitry 1841 may be configured to transmit a respective reference signal (e.g., SRS or DMRS) on each of a plurality of uplink beams to the base station during an uplink beam sweep via at least one second antenna panel of the antenna array 1820.

The communication and processing circuitry 1841 may further be configured to generate and transmit a request to the base station. For example, the request may be included in a MAC-CE carried in a PUSCH, UCI in a PUCCH or PUSCH, a random access message, or an RRC message. The communication and processing circuitry 1841 may further be configured to generate and transmit a scheduling request (e.g., via UCI in a PUCCH) to the base station to receive an uplink grant for the PUSCH carrying the MAC-CE including the request for uplink beam refinement.

The communication and processing circuitry 1841 may further be configured to generate and transmit an uplink signal on one or more uplink transmit beams applied to the uplink signal. The uplink signal may include, for example, a PUCCH, PUSCH, SRS, DMRS, or physical random access channel (PRACH).

The communication and processing circuitry 1841 may further be configured to control the antenna array 1820 and the transceiver 1810 to search for and identify a plurality of downlink transmit beams during a downlink beam sweep. The communication and processing circuitry 1841 may further be configured to obtain a plurality of beam measurements on each of a plurality of downlink receive beams via the antenna array 1820 for each of the identified downlink transmit beams. The communication and processing circuitry 1841 may further be configured to generate a beam measurement report for transmission to the base station using the communication and processing circuitry 1841.

The communication and processing circuitry 1841 may further be configured to identify one or more selected uplink beam(s) based on the beam measurements obtained from the downlink beam reference signals. In some examples, the communication and processing circuitry 1841 may be configured to compare the respective RSRP (or other beam measurement) measured on each of the downlink receive beams for each of the serving downlink transmit beams to identify the serving downlink receive beams and to further utilize the serving downlink receive beams as the selected uplink transmit beams. Each serving downlink receive beam may have the highest measured RSRP (or other beam measurement) for one of the downlink transmit beams.

The communication and processing circuitry 1841 may be configured to generate one or more uplink transmit beams for transmission in an uplink beam sweep. Each uplink transmit beam may carry an uplink reference signal (e.g., an SRS) for measurement by the base station. The communication and processing circuitry 1841 may further be configured to identify the selected uplink transmit beam(s) selected by the base station based on the uplink beam measurements. For example, the communication and processing circuitry 1841 may be configured to receive an indication of the selected uplink transmit beam(s) from the base station.

In some implementations where the communication involves receiving information, the communication and processing circuitry 1841 may obtain information from a component of the UE 1800 (e.g., from the transceiver 1810 that receives the information via radio frequency signaling or some other type of signaling suitable for the applicable communication medium), process (e.g., decode) the information, and output the processed information. For example, the communication and processing circuitry 1841 may output the information to another component of the processor 1804, to the memory 1805, or to the bus interface 1808. In some examples, the communication and processing circuitry 1841 may receive one or more of signals, messages, other information, or any combination thereof. In some examples, the communication and processing circuitry 1841 may receive information via one or more channels. In some examples, the communication and processing circuitry 1841 may include functionality for a means for receiving. In some examples, the communication and processing circuitry 1841 may include functionality for a means for decoding (e.g., as described in FIGS. 12 and 13 at block 1906 of FIG. 19).

In some implementations where the communication involves sending (e.g., transmitting) information, the communication and processing circuitry 1841 may obtain information (e.g., from another component of the processor 1804, the memory 1805, or the bus interface 1808), process (e.g., encode) the information, and output the processed information. For example, the communication and processing circuitry 1841 may output the information to the transceiver 1810 (e.g., that transmits the information via radio frequency signaling or some other type of signaling suitable for the applicable communication medium). In some examples, the communication and processing circuitry 1841 may send one or more of signals, messages, other information, or any combination thereof. In some examples, the communication and processing circuitry 1841 may send information via one or more channels. In some examples, the communication and processing circuitry 1841 may include functionality for a means for sending (e.g., a means for transmitting). In some examples, the communication and processing circuitry 1841 may include functionality for a means for encoding (e.g., as described in FIGS. 12 and 13 at block 1906 of FIG. 19).

The processor 1804 may include timing management circuitry 1842 configured to perform timing management-related operations as discussed herein (e.g., one or more of the operations described in conjunction with FIGS. 11-21). The timing management circuitry 1842 may include functionality for a means for determining an SCS (e.g., as described at step 1210 of FIG. 12, at step 1310 of FIG. 13, and/or at block 1902 of FIG. 19). The timing management circuitry 1842 may include functionality for a means for generating a request (e.g., as described at step 1210 of FIG. 12, at step 1310 of FIG. 13, at step 1510 of FIG. 15, at step 1710 of FIG. 17, and/or at block 2102 of FIG. 21). The timing management circuitry 1842 may include functionality for a means for transmitting a request (e.g., as described at step 1210 of FIG. 12, at step 1310 of FIG. 13, at step 1510 of FIG. 15, at step 1710 of FIG. 17, and/or at block 2104 of FIG. 21). The timing management circuitry 1842 may include functionality for a means for receiving a response (e.g., as described at step 1218 of FIG. 12, at step 1316 of FIG. 13, at step 1516 of FIG. 15, at step 1716 of FIG. 17, and/or at block 2106 of FIG. 21). The timing management circuitry 1842 may further be configured to execute timing management software 1852 included on the computer-readable medium 1806 to implement one or more functions described herein.

The processor 1804 may include cyclic prefix processing circuitry 1843 configured to perform cyclic prefix processing-related operations as discussed herein (e.g., one or more of the operations described in conjunction with FIGS. 11-21). The cyclic prefix processing circuitry 1843 may include functionality for a means for identifying an extended cyclic prefix (e.g., as described at step 1210 of FIG. 12 and/or at block 1904 of FIG. 19). The cyclic prefix processing circuitry 1843 may include functionality for a means for receiving an indication (e.g., as described at step 1218 of FIG. 12 and/or at block 2002 of FIG. 20). The cyclic prefix processing circuitry 1843 may include functionality for a means for determining that an indication specifies an extended cyclic prefix (e.g., as described at step 1218 of FIG. 12 and/or at block 2004 of FIG. 20). The cyclic prefix processing circuitry 1843 may include functionality for a means for communicating using an extended cyclic prefix (e.g., as described at step 1220 of FIG. 12 and/or at block 2006 of FIG. 20). The cyclic prefix processing circuitry 1843 may further be configured to execute cyclic prefix processing software 1853 included on the computer-readable medium 1806 to implement one or more functions described herein.

Figure 19:
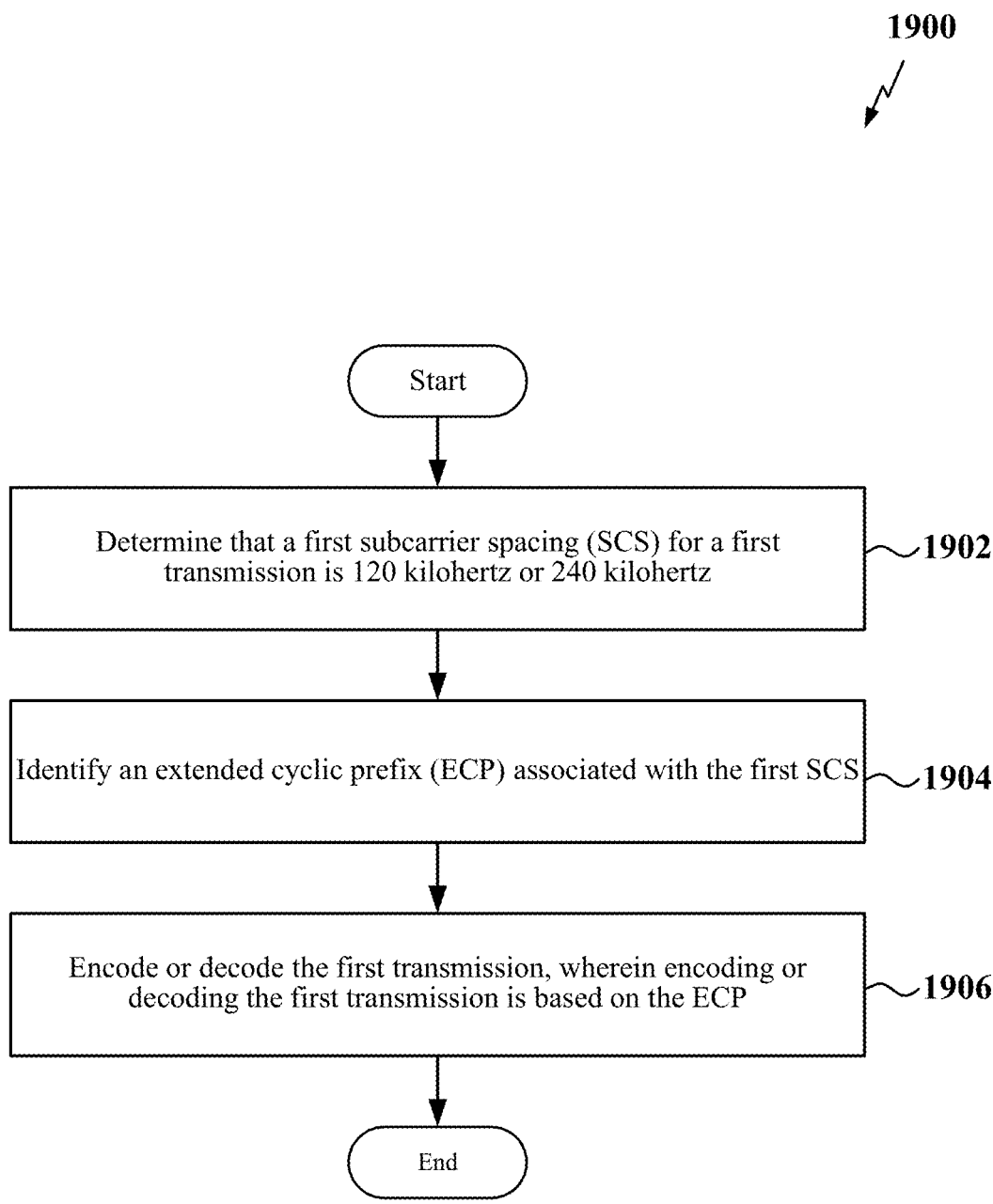
FIG. 19 is a flow chart of an example process for using an extended cyclic prefix according to some aspects.

FIG. 19 is a flow chart illustrating an example process 1900 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 1900 may be carried out by the UE 1800 illustrated in FIG. 18. In some examples, the process 1900 may be carried out by any suitable apparatus or means for carrying out the functions or algorithm described below.

At block 1902, a UE may determine that a first subcarrier spacing (SCS) for a first transmission is greater than 60 kHz (e.g., 120 kHz, 240 kHz, 480 kHz, 960 kHz, etc.). For example, the timing management circuitry 1842 together with the communication and processing circuitry 1841 and the transceiver 1810, shown and described above in connection with FIG. 18, may monitor for downlink signals that carry information indicative of an SCS to be used on a given band. In some examples, the timing management circuitry 1842 together with the communication and processing circuitry 1841 and the transceiver 1810 may monitor a downlink control channel for a DCI and parse the DCI to determine the SCS specified for an uplink transmission and/or a downlink transmission scheduled by the DCI.

In some examples, the first transmission is for a full-duplex communication between the user equipment and a base station.

At block 1904, the UE may identify an extended cyclic prefix (ECP) associated with the first SCS. For example, the cyclic prefix processing circuitry 1843 together with the communication and processing circuitry 1841 and the transceiver 1810, shown and described above in connection with FIG. 18, may determine based on a configuration and/or information received from a serving gNB that a particular NCP or ECP may be used with a particular SCS.

In some examples, the determining (a determination) that the first SCS for the first transmission is 120 kHz or 240 kHz may include receiving (receipt of) a first indication of the first SCS from a base station. In some examples, the identifying the ECP may include receiving a second indication of the ECP from the base station.

At block 1906, the UE may encode or decode the first transmission, wherein the encoding or decoding the first transmission is based on the ECP. For example, the cyclic prefix processing circuitry 1843 together with the communication and processing circuitry 1841 and the transceiver 1810, shown and described above in connection with FIG. 18, may generate an uplink transmission that include symbols that are preceded by the ECP. As another example, the cyclic prefix processing circuitry 1843 together with the communication and processing circuitry 1841 and the transceiver 1810 may process a received downlink transmission and process symbols included therein based on the symbols being preceded by the ECP.

In some examples, the method may further include measuring a timing difference between a first timing for a downlink transmission received at the user equipment and a second timing for an uplink transmission received at the user equipment; and determining that the timing difference is greater than a length of a normal cyclic prefix (CP) for the first SCS. In some examples, the identifying the ECP associated with the first SCS may include selecting the ECP after the determining that the timing difference is greater than the length of the normal CP for the first SCS.

In some examples, the method may further include determining that the first transmission is for a full-duplex communication. In some examples, the identifying the ECP associated with the first SCS may further include selecting the ECP after the determining that the first transmission is for the full-duplex communication.

In some examples, the method may further include measuring a timing difference between a first timing for a downlink transmission received at the user equipment and a second timing for an uplink transmission received at the user equipment; determining that the timing difference is greater than a length of a normal cyclic prefix (CP) for the first SCS; and transmitting a request to a base station after the determining that the timing difference is greater than the length of the normal CP for the first SCS. In some examples, the request may include at least one of: a request for a smaller SCS, a request to use an extended CP instead of a normal CP, a request to switch to a different beam pair, a request for additional frequency domain separation, or a combination thereof.

In some examples, the method may further include measuring a timing difference between a first timing for a downlink transmission received at the user equipment and a second timing for an uplink transmission received at the user equipment; and transmitting an indication of the timing difference to a base station.

Figure 20:
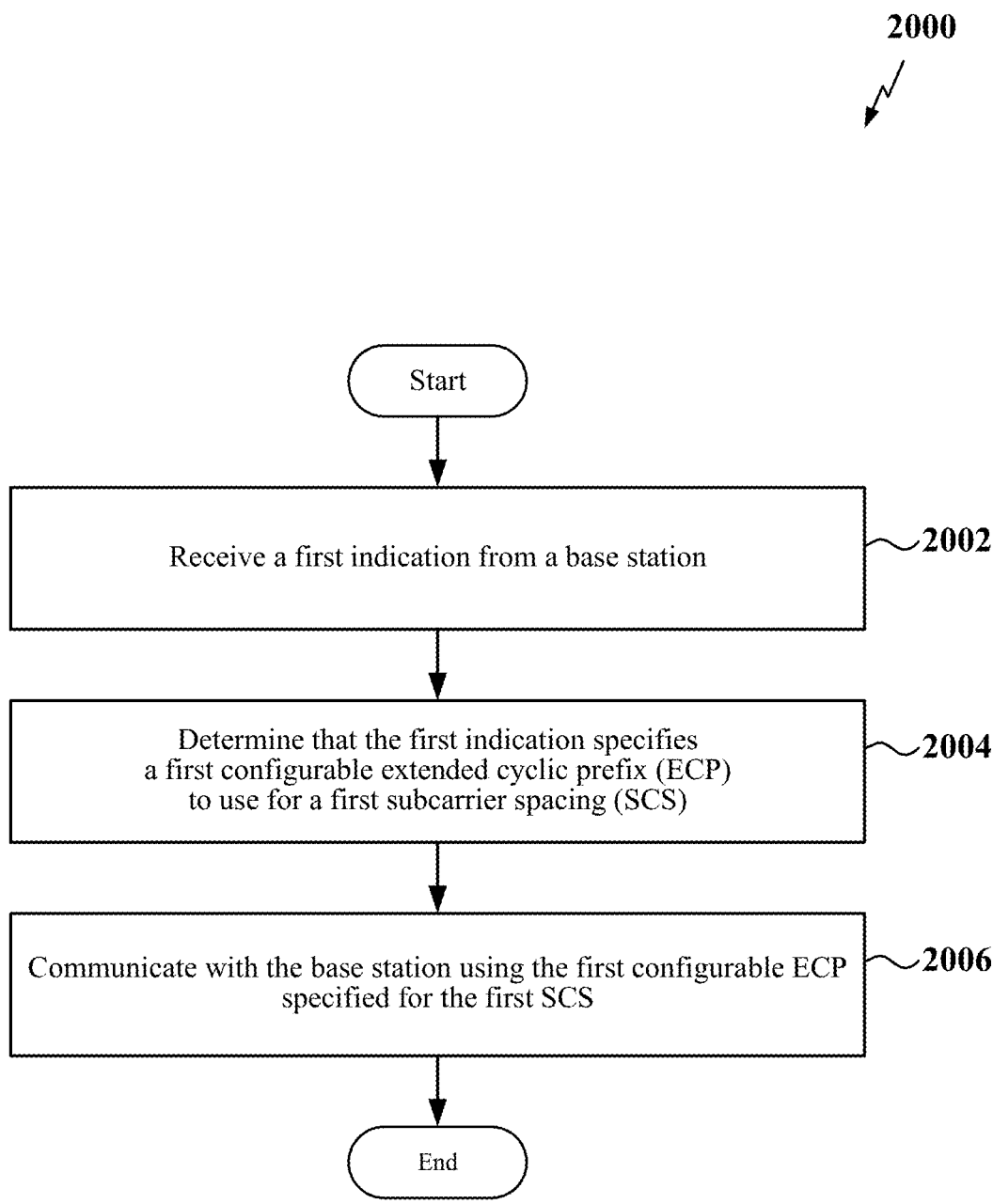
FIG. 20 is a flow chart of an example process for dynamically configuring an extended cyclic prefix according to some aspects.

FIG. 20 is a flow chart illustrating an example process 2000 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 2000 may be carried out by the UE 1800 illustrated in FIG. 18. In some examples, the process 2000 may be carried out by any suitable apparatus or means for carrying out the functions or algorithm described below.

At block 2002, a UE may receive a first indication from a base station. For example, the cyclic prefix processing circuitry 1843 together with the communication and processing circuitry 1841 and the transceiver 1810, shown and described above in connection with FIG. 18, may monitor downlink signals from a gNB (e.g., on a specified channel), and parse the signals to determine whether the signals include a configuration message.

In some examples, the first indication further specifies a length of the first configurable ECP. In some examples, the first indication further specifies that the first SCS is 120 kHz, 240 kHz, 480 kHz, or 960 kHz. In some examples, the receiving the first indication from the base station may include receiving the first indication via a medium access control-control element (MAC-CE), a downlink control information (DCI), or a radio resource control (RRC) message.

At block 2004, the UE may determine that the first indication specifies a first configurable extended cyclic prefix (ECP) to use for a first subcarrier spacing (SCS). For example, the cyclic prefix processing circuitry 1843, shown and described above in connection with FIG. 18, may parse a received configuration message to determine whether the message specifies the CP (e.g., an NCP or an ECP) to the use with a particular SCS.

At block 2006, the UE may communicate with the base station using the first configurable ECP specified for the first SCS. For example, the cyclic prefix processing circuitry 1843 together with the communication and processing circuitry 1841 and the transceiver 1810, shown and described above in connection with FIG. 18, may generate an uplink transmission that include symbols that are preceded by the first configurable ECP. As another example, the cyclic prefix processing circuitry 1843 together with the communication and processing circuitry 1841 and the transceiver 1810 may process a received downlink transmission and process symbols included therein based on the symbols being preceded by the first configurable ECP.

In some examples, the method may further include transmitting a request for the first configurable ECP to the base station prior to the receiving the first indication from the base station. In some examples, the request may include a request to use the first configurable ECP instead of a normal cyclic prefix for the first SCS. In some examples, the request specifies a length of the first configurable ECP. In some examples, the request specifies that the first SCS is 120 kHz or 240 kHz. In some examples, the transmitting the request for the first configurable ECP to the base station may include transmitting the request via a medium access control-control element (MAC-CE), an uplink control information (UCI), or a radio resource control (RRC) message.

In some examples, the method may further include measuring a timing difference between a first timing for a downlink transmission received at the user equipment and a second timing for an uplink transmission received at the user equipment; and determining that the timing difference is greater than a length of a normal cyclic prefix (CP) for the first SCS. In some examples, the transmitting the request for the first configurable ECP may include transmitting the request after the determining that the timing difference is greater than the length of the normal CP for the first SCS.

In some examples, the method may further include determining that the transmitting (transmission) is for a full-duplex communication. In some examples, the transmitting the request for the first configurable ECP further may include transmitting the request after the determining that the transmission is for the full-duplex communication.

In some examples, the method may further include measuring a timing difference between a first timing for a downlink transmission received at the user equipment and a second timing for an uplink transmission received at the user equipment; determining that the timing difference is greater than a length of a normal cyclic prefix (CP) for the first SCS; and transmitting a request to the base station after the determining that the timing difference is greater than the length of the normal CP for the first SCS. In some examples, the request may include at least one of: a request for a smaller SCS, a request to switch to a different beam pair, a request for additional frequency domain separation, or a combination thereof.

In some examples, the method may further include measuring a timing difference between a first timing for a downlink transmission received at the user equipment and a second timing for an uplink transmission received at the user equipment; and transmitting an indication of the timing difference to the base station.

Figure 21:
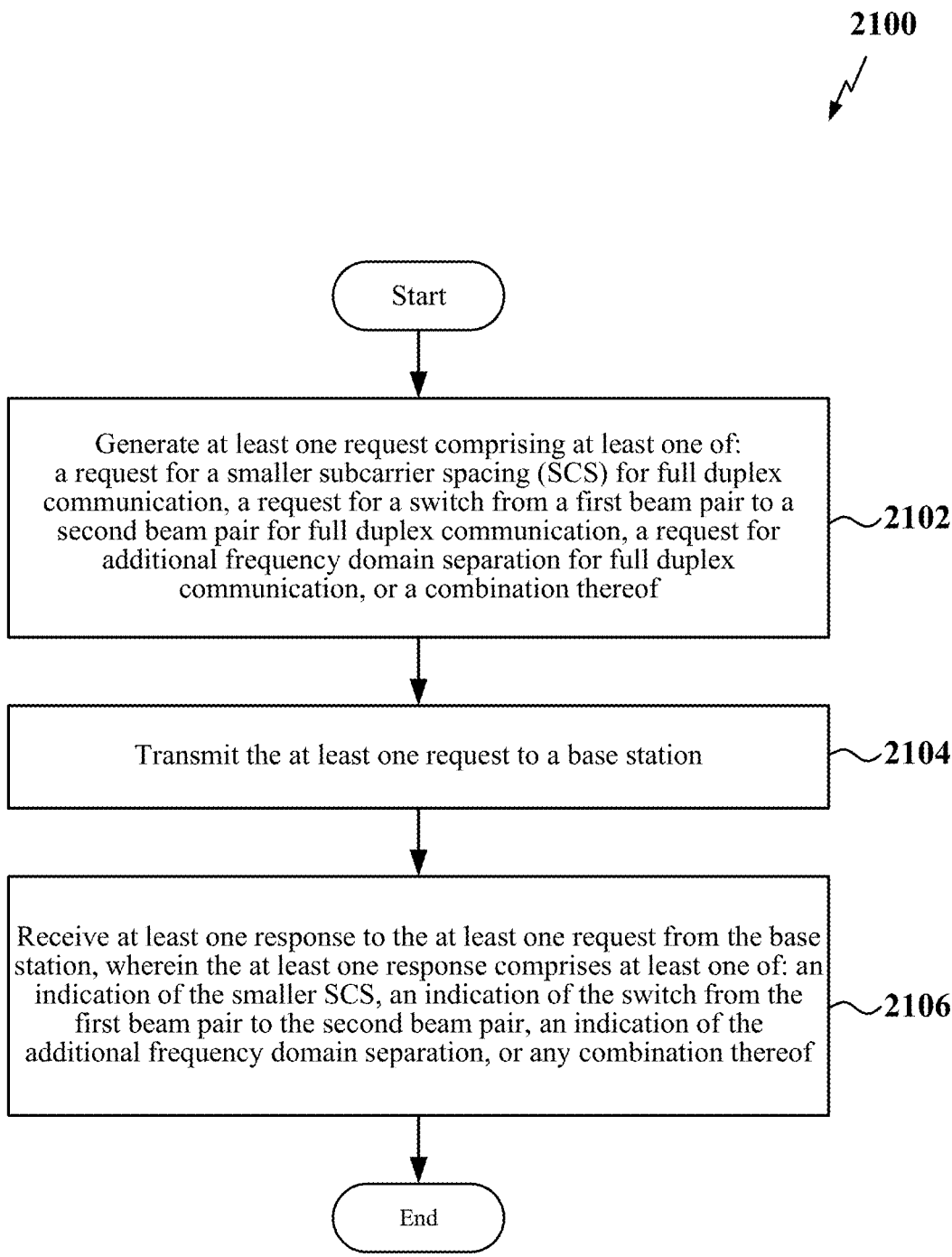
FIG. 21 is a flow chart of an example process for requesting a lower subcarrier spacing, a beam pair switch, additional frequency domain separation, or a combination thereof, according to some aspects.

FIG. 21 is a flow chart illustrating an example process 2100 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 2100 may be carried out by the UE 1800 illustrated in FIG. 18. In some examples, the process 2100 may be carried out by any suitable apparatus or means for carrying out the functions or algorithm described below.

At block 2102, a UE may generate at least one request may include at least one of: a request for a smaller subcarrier spacing (SCS) for full-duplex communication, a request for a switch from a first beam pair to a second beam pair for full-duplex communication, a request for additional frequency domain separation for full-duplex communication, or a combination thereof. For example, the timing management circuitry 1842, shown and described above in connection with FIG. 18, may determine that a smaller SCS is needed (e.g., based on a measured timing difference or interference measurements) and, in response, generate a message requesting the smaller SCS to be transmitted to a gNB. As another example, the timing management circuitry 1842, shown and described above in connection with FIG. 18, may determine that a beam pair switch is needed (e.g., based on a measured timing difference or interference measurements) and, in response, generate a message requesting the beam pair switch to be transmitted to a gNB. As yet another example, the timing management circuitry 1842, shown and described above in connection with FIG. 18, may determine that more frequency domain separation is needed (e.g., based on a measured timing difference or interference measurements) and, in response, generate a message requesting additional frequency domain separation to be transmitted to a gNB.

At block 2104, the UE may transmit the at least one request to a base station. For example, the timing management circuitry 1842 together with the communication and processing circuitry 1841 and the transceiver 1810, shown and described above in connection with FIG. 18, may encode the request for transmission and transmit the request via a scheduled uplink channel.

In some examples, the transmitting the at least one request may include transmitting the at least one request via at least one of: a medium access control-control element (MAC-CE), an uplink control information (UCI), a radio resource control (RRC) message, or a combination thereof.

At block 2106, the UE may receive at least one response to the at least one request from the base station, wherein the at least one response may include at least one of: an indication of the smaller SCS, an indication of the switch from the first beam pair to the second beam pair, an indication of the additional frequency domain separation, or any combination thereof. For example, the timing management circuitry 1842 together with the communication and processing circuitry 1841 and the transceiver 1810, shown and described above in connection with FIG. 18, may monitor a downlink channel from a gNB for signal energy, attempt to decode any received signal energy, and parse any messages that were successfully decoded to determine whether the message includes configuration information for the UE.

In some examples, the receiving the at least one response may include receiving the at least one response via at least one of: a medium access control-control element (MAC-CE), a downlink control information (DCI), a radio resource control (RRC) message, or a combination thereof.

In some examples, the method may further include identifying a particular SCS based on a timing difference measured between a first timing for a downlink transmission received at the user equipment and a second timing for an uplink transmission received at the user equipment. In some examples, the request for the smaller SCS may include an indication of the particular SCS.

In some examples, the method may further include identifying a particular beam pair based on a timing difference measured between a first timing for a downlink transmission received at the user equipment and a second timing for an uplink transmission received at the user equipment. In some examples, the request for the switch from the first beam pair to the second beam pair specifies the particular beam pair as the second beam pair.

In some examples, the method may further include identifying a particular increase of frequency domain separation based on a timing difference measured between a first timing for a downlink transmission received at the user equipment and a second timing for an uplink transmission received at the user equipment. In some examples, the request for the additional frequency domain separation specifies the particular increase of the frequency domain separation. In some examples, the particular increase of the frequency domain separation specifies at least one resource block.

In some examples, the request for the additional frequency domain separation requests: a smaller overlap between a transmit band and a receive band, or a larger guard band between a transmit band and a receive band. In some examples, the request for the additional frequency domain separation specifies at least one of: a frequency domain location for the additional frequency domain separation, a particular overlap between a transmit band and a receive band, a particular guard band between a transmit band and a receive band, or a combination thereof.

In some examples, the method may further include measuring a timing difference between a first timing for a downlink transmission received at the user equipment and a second timing for an uplink transmission received at the user equipment; and determining that the timing difference is greater than a length of a normal CP. In some examples, the transmitting the at least one request may include transmitting the at least one request after the determining that the timing difference is greater than the length of the normal CP.

In some examples, the method may further include measuring a timing difference between a first timing for a downlink transmission received at the user equipment and a second timing for an uplink transmission received at the user equipment; determining that the timing difference is greater than a length of a normal CP; and transmitting a request to the base station after the determining that the timing difference is greater than the length of the normal CP. In some examples, the request may include a request to use an extended CP instead of a normal CP.

In some examples, the method may further include measuring a timing difference between a first timing for a downlink transmission received at the user equipment and a second timing for an uplink transmission received at the user equipment; and transmitting an indication of the timing difference to the base station.

Figure 22:
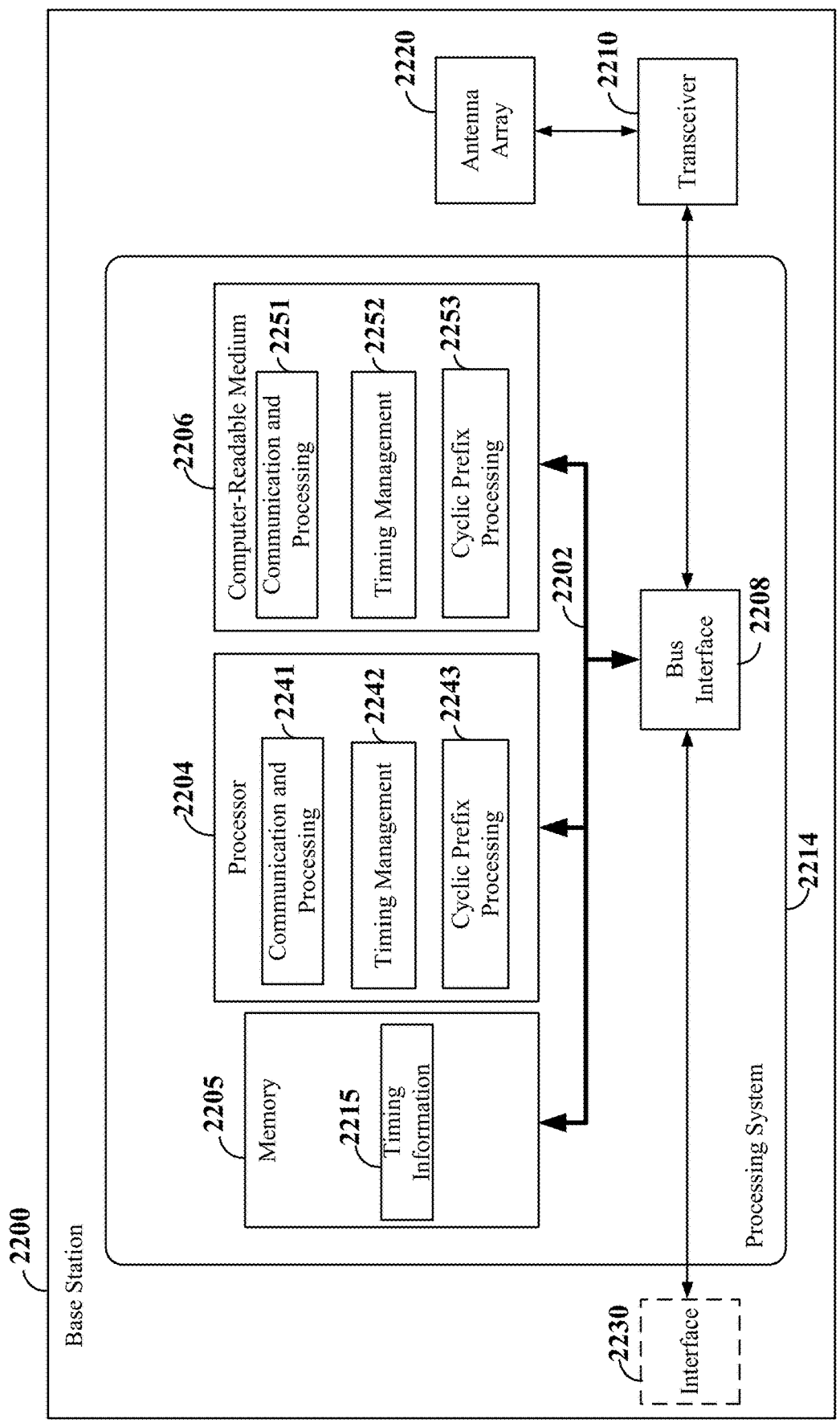
FIG. 22 is a block diagram illustrating an example of a hardware implementation for a base station employing a processing system according to some aspects.

FIG. 22 is a conceptual diagram illustrating an example of a hardware implementation for base station (BS) 2200 employing a processing system 2214. In some implementations, the BS 2200 may correspond to any of the BSs (e.g., gNBs) or scheduling entities shown in any of FIGS. 1, 2, 5-9, 12-15, 17, 26, and 30.

In accordance with various aspects of the disclosure, an element, or any portion of an element, or any combination of elements may be implemented with the processing system 2214. The processing system may include one or more processors 2204. The processing system 2214 may be substantially the same as the processing system 1814 illustrated in FIG. 18, including a bus interface 2208, a bus 2202, memory 2205 (that may contain information 2215 regarding communication parameters), a processor 2204, and a computer-readable medium 2206. Furthermore, the BS 2200 may include an interface 2230 (e.g., a network interface) that provides a means for communicating with at least one other apparatus within a core network and with at least one radio access network.

The B S 2200 may be configured to perform any one or more of the operations described herein (e.g., as described above in conjunction with FIGS. 1-17 and as described below in conjunction with FIGS. 23-25). In some aspects of the disclosure, the processor 2204, as utilized in the BS 2200, may include circuitry configured for various functions.

The processor 2204 may be configured to generate, schedule, and modify a resource assignment or grant of time-frequency resources (e.g., a set of one or more resource elements). For example, the processor 2204 may schedule time-frequency resources within a plurality of time division duplex (TDD) and/or frequency division duplex (FDD) subframes, slots, and/or mini-slots to carry user data traffic and/or control information to and/or from multiple UEs.

The processor 2204 may be configured to schedule resources for the transmission of downlink reference signals (e.g., SSBs or CSI-RSs) on a plurality of downlink beams for a downlink beam sweep in accordance with a selected downlink beam sweep type and selected number of downlink reference signal resources indicated in a request for uplink beam refinement received from a UE. The processor 2204 may further be configured to schedule resources for the uplink transmission of uplink reference signals (e.g., SRSs) on a plurality of uplink beams for an uplink beam sweep in accordance with a selected beam sweep type and selected number of uplink reference signal resources indicated in the request. The processor 2204 may further be configured to schedule resources that may be utilized by the UE to transmit the request. For example, the uplink beam refinement request resources may include resources scheduled for transmission of a PUCCH, PUSCH, PRACH occasion or RRC message. In some examples, the processor 2204 may be configured to schedule PUSCH resources for the uplink beam refinement request in response to receiving a scheduling request from the UE.

The processor 2204 may further be configured to schedule resources for the transmission of an uplink signal. In some examples, the resources may be associated with one or more uplink transmit beams and one or more corresponding receive beams applied to the uplink signal (e.g., based on the uplink BPLs) based on an indication of the uplink signal associated with the one or more uplink transmit beams included in the request. In some examples, the resources may be associated with an uplink transmission scheme indicating a number of uplink transmit beams to be utilized for the uplink signal, a number of repetitions per uplink transmit beam of the uplink signal, and a multiplexing scheme when more than one uplink transmit beam is used to transmit the uplink signal.

In some aspects of the disclosure, the processor 2204 may include communication and processing circuitry 2241. The communication and processing circuitry 2244 may be configured to communicate with a UE. The communication and processing circuitry 2241 may include one or more hardware components that provide the physical structure that performs various processes related to communication (e.g., signal reception and/or signal transmission) as described herein. The communication and processing circuitry 2241 may further include one or more hardware components that provide the physical structure that performs various processes related to signal processing (e.g., processing a received signal and/or processing a signal for transmission) as described herein. The communication and processing circuitry 2241 may further be configured to execute communication and processing software 2251 included on the computer-readable medium 2206 to implement one or more functions described herein.

In some examples, the communication and processing circuitry 2241 may be configured to receive and process uplink beamformed signals at a mmWave frequency or a sub-6 GHz frequency via the transceiver 2210 and an antenna array 2220. For example, the communication and processing circuitry 2241 may be configured to receive a respective reference signal (e.g., SRS or DMRS) on each of a plurality of uplink beams from the UE during an uplink beam sweep.

In some examples, the communication and processing circuitry 2241 may further be configured to generate and transmit downlink beamformed signals at a mmWave frequency or a sub-6 GHz frequency via the transceiver 2210 and the antenna array 2220. For example, the communication and processing circuitry 2241 may be configured to transmit a respective downlink reference signal (e.g., SSB or CSI-RS) on each of a plurality of downlink beams to the UE during a downlink beam sweep via at least one first antenna panel of the antenna array 2220. The communication and processing circuitry 2241 may further be configured to receive a beam measurement report from the UE.

The communication and processing circuitry 2241 may further be configured to receive a request from the UE. For example, the request may be included in a MAC-CE carried in a PUSCH, UCI in a PUCCH or PUSCH, a random access message, or an RRC message. The communication and processing circuitry 2241 may further be configured to receive a scheduling request (e.g., via UCI in a PUCCH) from the UE for an uplink grant for the PUSCH carrying the MAC-CE including the request for uplink beam refinement.

The communication and processing circuitry 2241 may further be configured to receive an uplink signal on one or more uplink receive beams via one or more uplink transmit beams applied to the uplink signal. For example, the communication and processing circuitry 2241 may be configured to receive the uplink signal on one or more uplink receive beams via at least one second antenna panel of the antenna array 2220. The uplink signal may include, for example, a PUCCH, PUSCH, SRS, DMRS, or PRACH.

The communication and processing circuitry 2241 may further be configured to control the antenna array 2220 and transceiver 2210 to generate a plurality of downlink transmit beams during a downlink beam sweep. The communication and processing circuitry 2241 may further be configured to receive a beam measurement report from the UE using the communication and processing circuitry 2244. The communication and processing circuitry 2241 may further be configured to identify one or more selected uplink beam(s) based on the beam measurements. In some examples, the communication and processing circuitry 2241 may be configured to compare the respective RSRP (or other beam measurement) measured on each of the downlink receive beams for each of the serving downlink transmit beams to identify the serving downlink receive beams and to further identify the serving downlink receive beams as the selected uplink transmit beams. Each serving downlink receive beam may have the highest measured RSRP (or other beam measurement) for one of the downlink transmit beams.

The communication and processing circuitry 2241 may be configured to receive one or more uplink transmit beams in an uplink beam sweep. Each uplink transmit beam may carry an uplink reference signal (e.g., an SRS) for measurement by the communication and processing circuitry 2241. The communication and processing circuitry 2241 may further be configured to obtain a plurality of beam measurements on each of a plurality of uplink receive beams of the antenna array 2220 for each of the uplink transmit beams. The communication and processing circuitry 2241 may further be configured to select the selected uplink transmit beam(s) and corresponding uplink receive beams forming respective uplink BPLs based on the uplink beam measurements.

In some implementations where the communication involves receiving information, the communication and processing circuitry 2241 may obtain information from a component of the BS 2200 (e.g., from the transceiver 2210 that receives the information via radio frequency signaling or some other type of signaling suitable for the applicable communication medium), process (e.g., decode) the information, and output the processed information. For example, the communication and processing circuitry 2241 may output the information to another component of the processor 2204, to the memory 2205, or to the bus interface 2208. In some examples, the communication and processing circuitry 2241 may receive one or more of signals, messages, other information, or any combination thereof. In some examples, the communication and processing circuitry 2241 may receive information via one or more channels. In some examples, the communication and processing circuitry 2241 may include functionality for a means for receiving. In some examples, the communication and processing circuitry 2241 may include functionality for a means for decoding (e.g., as described in FIGS. 12 and 13 at block 2306 of FIG. 23).

In some implementations where the communication involves sending (e.g., transmitting) information, the communication and processing circuitry 2241 may obtain information (e.g., from another component of the processor 2204, the memory 2205, or the bus interface 2208), process (e.g., encode) the information, and output the processed information. For example, the communication and processing circuitry 2241 may output the information to the transceiver 2210 (e.g., that transmits the information via radio frequency signaling or some other type of signaling suitable for the applicable communication medium). In some examples, the communication and processing circuitry 2241 may send one or more of signals, messages, other information, or any combination thereof. In some examples, the communication and processing circuitry 2241 may send information via one or more channels. In some examples, the communication and processing circuitry 2241 may include functionality for a means for sending (e.g., a means for transmitting). In some examples, the communication and processing circuitry 2241 may include functionality for a means for encoding (e.g., as described in FIGS. 12 and 13 and at block 2306 of FIG. 23).

The processor 2204 may include timing management circuitry 2242 configured to perform timing management-related operations as discussed herein (e.g., one or more of the operations described in conjunction with FIGS. 1-25). The timing management circuitry 2242 may include functionality for a means for specifying an SCS (e.g., as described at step 1214 of FIG. 12 and/or at block 2302 of FIG. 23). The timing management circuitry 2242 may include functionality for a means for selecting an SCS for full-duplex communication (e.g., as described at step 1214 of FIG. 12, at step 1314 of FIG. 13, and/or at block 2502 of FIG. 25). The timing management circuitry 2242 may include functionality for a means for selecting a switch from a first beam pair to a second beam pair for full-duplex communication (e.g., as described at step 1514 of FIG. 15 and/or at block 2502 of FIG. 25). The timing management circuitry 2242 may include functionality for a means for selecting additional frequency domain separation for full-duplex communication (e.g., as described at step 1714 of FIG. 17 and/or at block 2502 of FIG. 25). The timing management circuitry 2242 may include functionality for a means for transmitting an indication of the selecting (e.g., as described at step 1316 of FIG. 13, at step 1516 of FIG. 15, at step 1716 of FIG. 17, and/or at block 2504 of FIG. 25). The timing management circuitry 2242 may further be configured to execute timing management software 2252 included on the computer-readable medium 2206 to implement one or more functions described herein.

The processor 2204 may include cyclic prefix processing circuitry 2243 configured to perform cyclic prefix processing-related operations as discussed herein (e.g., one or more of the operations described in conjunction with FIGS. 1-25). The cyclic prefix processing circuitry 2243 may include functionality for a means for identifying an extended cyclic prefix (e.g., as described at step 1216 of FIG. 12 and/or at block 2304 of FIG. 23). The cyclic prefix processing circuitry 2243 may include functionality for a means for generating an indication that specifies an extended cyclic prefix (e.g., as described at step 1216 of FIG. 12 and/or at block 2402 of FIG. 24). The cyclic prefix processing circuitry 2243 may include functionality for a means for transmitting an indication that specifies an extended cyclic prefix (e.g., as described at step 1218 of FIG. 12 and/or at block 2404 of FIG. 24). The cyclic prefix processing circuitry 2243 may include functionality for a means for communicating using an extended cyclic prefix (e.g., as described at step 1220 of FIG. 12 and/or at block 2406 of FIG. 24). The cyclic prefix processing circuitry 2243 may further be configured to execute cyclic prefix processing software 2253 included on the computer-readable medium 2206 to implement one or more functions described herein.

Figure 23:
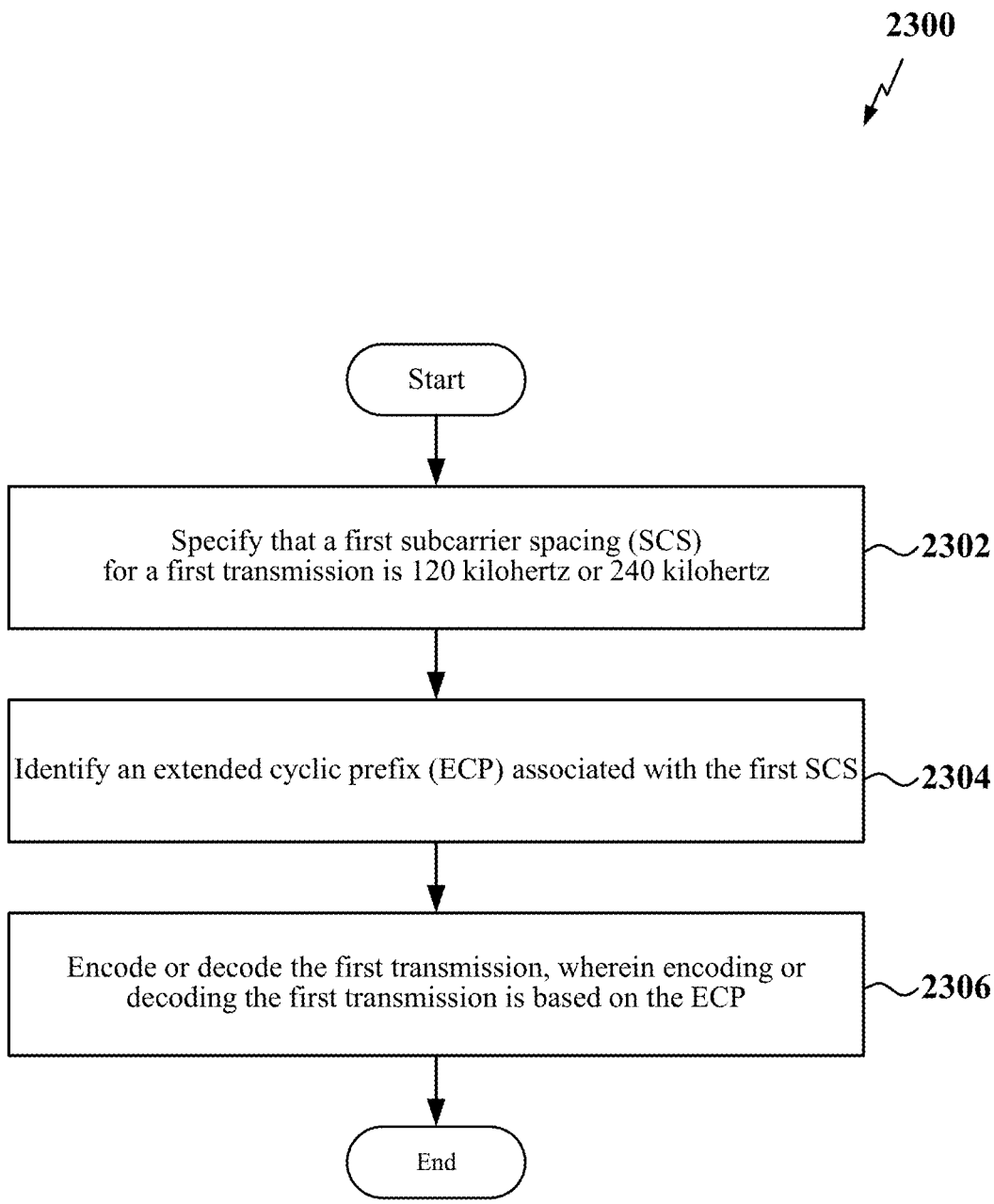
FIG. 23 is a flow chart of an example process for using an extended cyclic prefix according to some aspects.

FIG. 23 is a flow chart illustrating an example process 2300 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 2300 may be carried out by the BS 2200 illustrated in FIG. 22. In some examples, the process 2300 may be carried out by any suitable apparatus or means for carrying out the functions or algorithm described below.

At block 2302, a BS may specify that a first subcarrier spacing (SCS) for a first transmission is 120 kHz or 240 kHz. For example, the timing management circuitry 2242, shown and described above in connection with FIG. 22, may determine based on traffic requirements (e.g., data rates, latency requirements, etc.) and/or other factors that a particular SCS should be used for a communication with a UE. As another example, the timing management circuitry 2242 may receive a request from a UE to use a smaller SCS or a particular SCS.

In some examples, the first transmission is for a full-duplex communication between the base station and a user equipment.

At block 2304, the BS may identify an extended cyclic prefix (ECP) associated with the first SCS. For example, the cyclic prefix processing circuitry 2243, shown and described above in connection with FIG. 22, may determine based on a measured received timing difference, interference, and/or other factors that an ECP should be used for a particular SCS for a communication with a UE. As another example, the cyclic prefix processing circuitry 2243 may receive a request from a UE to use an ECP.

At block 2306, the BS may encode or decoding the first transmission, wherein the encoding or decoding the first transmission is based on the ECP. For example, the cyclic prefix processing circuitry 2243 together with the communication and processing circuitry 2241 and the transceiver 2210, shown and described above in connection with FIG. 22, may generate a downlink transmission that include symbols that are preceded by the ECP. As another example, the cyclic prefix processing circuitry 2243 together with the communication and processing circuitry 2241 and the transceiver 2210 may process a received uplink transmission and process symbols included therein based on the symbols being preceded by the ECP.

In some examples, the method may further include receiving an indication of a timing difference measured between a first timing for a downlink transmission received at a user equipment and a second timing for an uplink transmission received at the user equipment; and determining that the timing difference is greater than a length of a normal cyclic prefix (CP) for the first SCS. In some examples, the identifying the ECP associated with the first SCS may include selecting the ECP after the determining that the timing difference is greater than the length of the normal CP for the first SCS.

In some examples, the method may further include determining that the first transmission is for a full-duplex communication. In some examples, the identifying the ECP associated with the first SCS may include selecting the ECP after the determining that the first transmission is for the full-duplex communication.

In some examples, the method may further include transmitting a first indication of the first SCS to a user equipment; and transmitting a second indication of the ECP to the user equipment.

In some examples, the method may further include receiving a request from a user equipment. In some examples, the request may include at least one of: a request for a smaller SCS for full-duplex communication, a request to use an extended cyclic prefix (CP) instead of a normal CP for full-duplex communication, a request to switch to a different beam pair for full-duplex communication, a request for additional frequency domain separation for full-duplex communication, or a combination thereof.

In some examples, the method may further include receiving an indication of a timing difference measured between a first timing for a downlink transmission received at a user equipment and a second timing for an uplink transmission received at the user equipment; determining that the timing difference is greater than a length of a normal cyclic prefix (CP) for the first SCS; and after the determining that the timing difference is greater than the length of the normal CP for the first SCS, performing at least one of: selecting a smaller SCS for full-duplex communication with the user equipment, selecting an extended CP instead of a normal CP for full-duplex communication with the user equipment, switching to a different beam pair for full-duplex communication with the user equipment, increasing a frequency domain separation for full-duplex communication with the user equipment, or a combination thereof.

Figure 24:
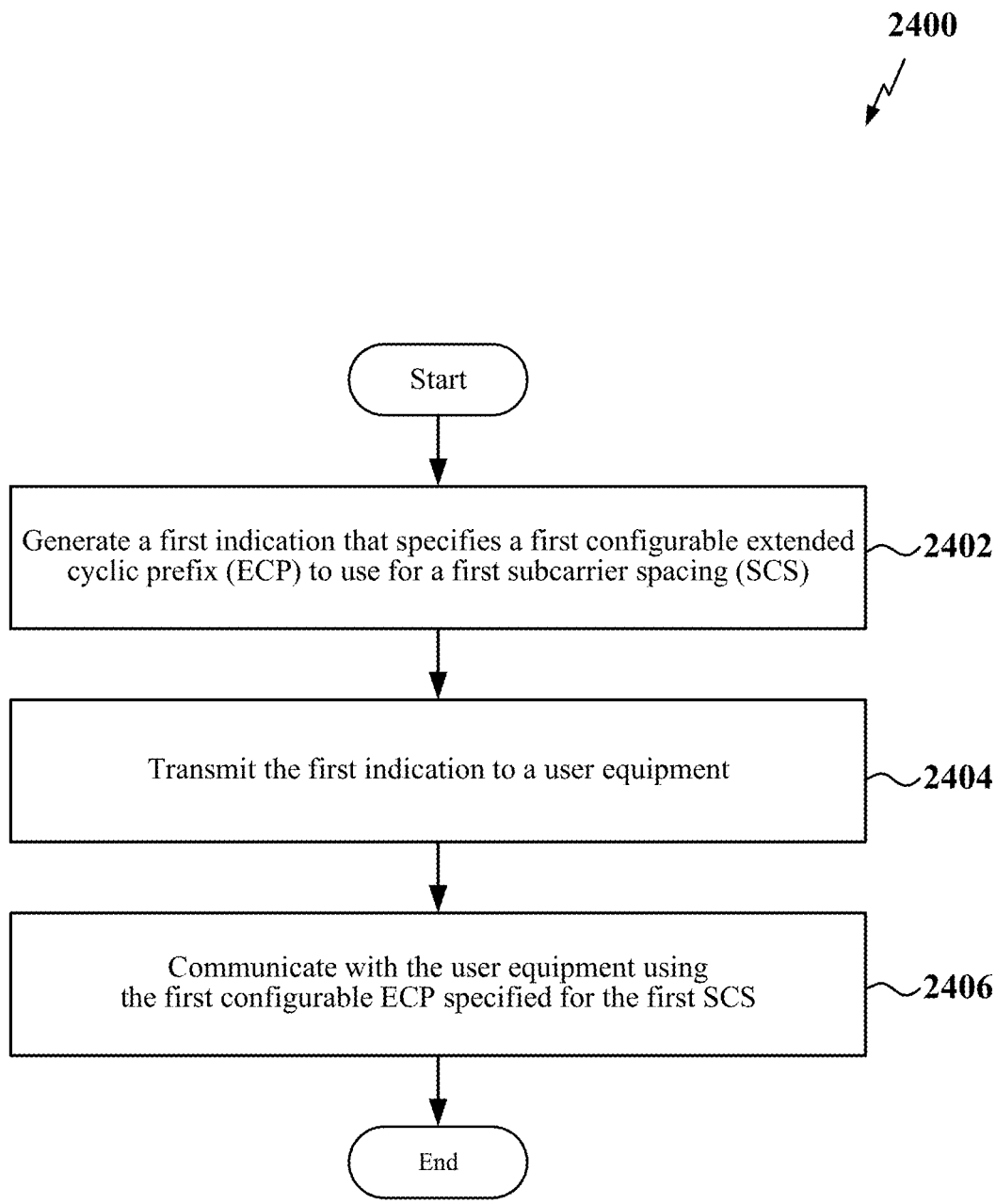
FIG. 24 is a flow chart of an example process for dynamically configuring an extended cyclic prefix according to some aspects.

FIG. 24 is a flow chart illustrating an example process 2400 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 2400 may be carried out by the BS 2200 illustrated in FIG. 22. In some examples, the process 2400 may be carried out by any suitable apparatus or means for carrying out the functions or algorithm described below.

At block 2402, a BS may generate a first indication that specifies a first configurable extended cyclic prefix (ECP) to use for a first subcarrier spacing (SCS). For example, the cyclic prefix processing circuitry 2243, shown and described above in connection with FIG. 22, may determine based on a measured received timing difference, interference, and/or other factors that a particular ECP (e.g., of a particular length) should be used for an SCS for a communication with a UE. As another example, the cyclic prefix processing circuitry 2243 may receive a request from a UE to use a particular ECP.

In some examples, the first indication further specifies a length of the first configurable ECP. In some examples, the first indication further specifies that the first SCS is 120 kHz or 240 kHz.

At block 2404, the BS may transmit the first indication to a user equipment. For example, the cyclic prefix processing circuitry 2243 together with the communication and processing circuitry 2241 and the transceiver 2210, shown and described above in connection with FIG. 22, may encode the indication in a message for transmission and transmit the message via a designated downlink channel.

In some examples, the transmitting the first indication to the user equipment may include transmitting the first indication via a medium access control-control element (MAC-CE), a downlink control information (DCI), or a radio resource control (RRC) message.

At block 2406, the BS may communicate with the user equipment using the first configurable ECP specified for the first SCS. For example, the cyclic prefix processing circuitry 2243 together with the communication and processing circuitry 2241 and the transceiver 2210, shown and described above in connection with FIG. 22, may generate a downlink transmission that include symbols that are preceded by the first configurable ECP. As another example, the cyclic prefix processing circuitry 2243 together with the communication and processing circuitry 2241 and the transceiver 2210 may process a received uplink transmission and process symbols included therein based on the symbols being preceded by the first configurable ECP.

In some examples, the method may further include receiving a request for the first configurable ECP from the user equipment prior to the transmitting the first indication to the user equipment. In some examples, the request may include a request to use the first configurable ECP instead of a normal cyclic prefix for the first SCS. In some examples, the request specifies a length of the first configurable ECP. In some examples, the request specifies that the first SCS is 120 kHz or 240 kHz. In some examples, the receiving the request for the first configurable ECP from the user equipment may include receiving the request via a medium access control-control element (MAC-CE), an uplink control information (UCI), or a radio resource control (RRC) message.

In some examples, the method may further include receiving an indication of a timing difference measured between a first timing for a downlink transmission received at the user equipment and a second timing for an uplink transmission received at the user equipment; determining that the timing difference is greater than a length of a normal cyclic prefix (CP) for the first SCS; selecting the first configurable ECP for the first SCS after the determining that the timing difference is greater than the length of the normal CP for the first SCS.

In some examples, the method may further include specifying the first SCS for a full-duplex communication; and selecting the first configurable ECP for the first SCS after the specifying the first SCS for the full-duplex communication.

In some examples, the method may further include receiving a request from the user equipment. In some examples, the request may include at least one of: a request for a smaller SCS for full-duplex communication, a request to switch to a different beam pair for full-duplex communication, a request for additional frequency domain separation for full-duplex communication, or a combination thereof.

In some examples, the method may further include receiving an indication of a timing difference measured between a first timing for a downlink transmission received at the user equipment and a second timing for an uplink transmission received at the user equipment; determining that the timing difference is greater than a length of a normal cyclic prefix (CP) for the first SCS; and after the determining that the timing difference is greater than the length of the normal CP for the first SCS, performing at least one of: selecting a smaller SCS for full-duplex communication with the user equipment, switching to a different beam pair for full-duplex communication with the user equipment, increasing a frequency domain separation for full-duplex communication with the user equipment, or a combination thereof.

Figure 25:
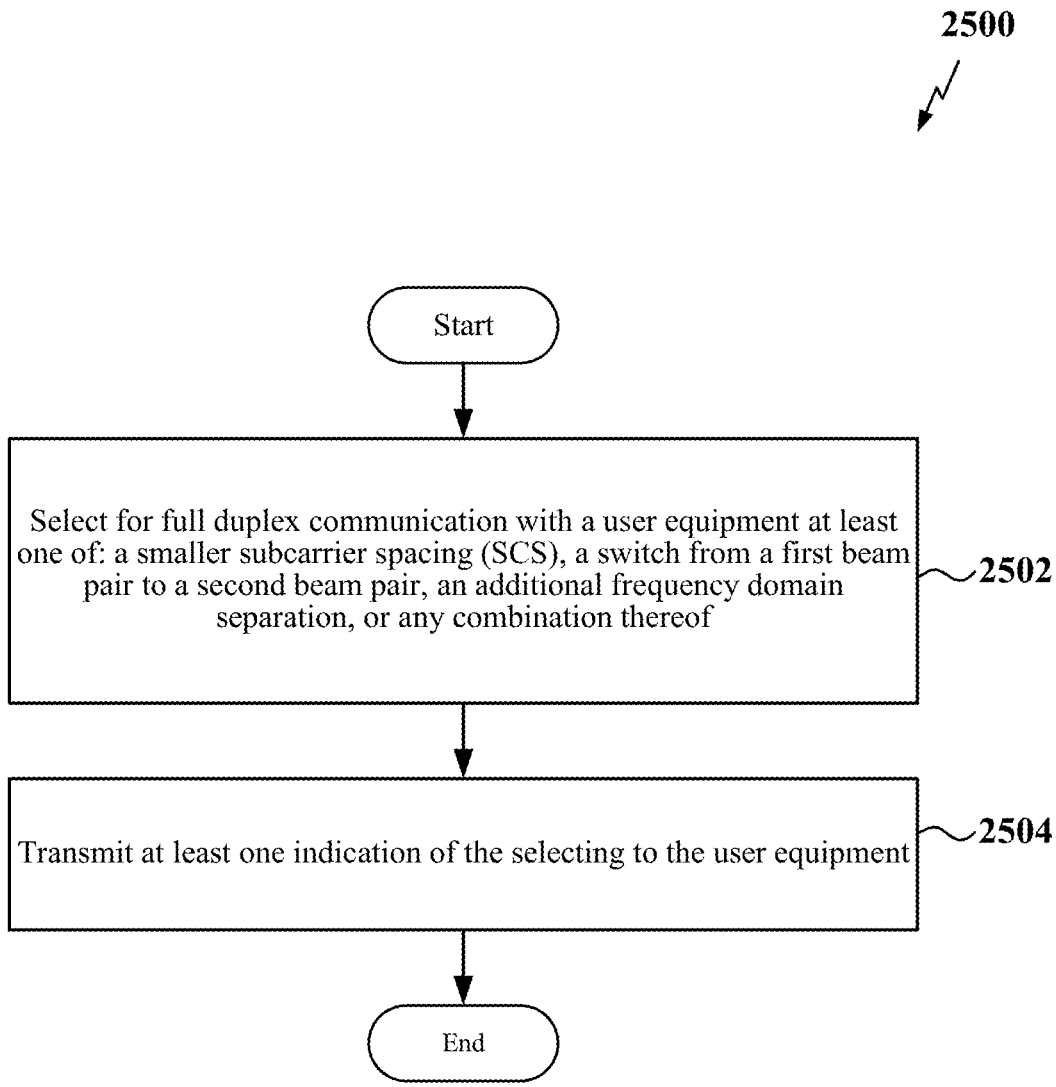
FIG. 25 is a flow chart of an example process for selecting a lower subcarrier spacing, a beam pair switch, additional frequency domain separation, or a combination thereof, according to some aspects.

FIG. 25 is a flow chart illustrating an example process 2500 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 2500 may be carried out by the BS 2200 illustrated in FIG. 22. In some examples, the process 2500 may be carried out by any suitable apparatus or means for carrying out the functions or algorithm described below.

At block 2502, a BS may select for full-duplex communication with a user equipment at least one of: a smaller subcarrier spacing (SCS), a switch from a first beam pair to a second beam pair, an additional frequency domain separation, or any combination thereof. For example, the timing management circuitry 2242 may determine that a smaller SCS is needed (e.g., based on a measured timing difference or interference measurements) and, in response, generate a message indicating the smaller SCS to be transmitted to a UE. In some examples, the timing management circuitry 2242 together with the communication and processing circuitry 2241 and the transceiver 2210 may receive a request for a smaller SCS from a UE. As another example, the timing management circuitry 2242 may determine that a beam pair switch is needed (e.g., based on a measured timing difference or interference measurements) and, in response, generate a message indicating the beam pair switch to be transmitted to a UE.

In some examples, the timing management circuitry 2242 together with the communication and processing circuitry 2241 and the transceiver 2210 may receive a request for a beam switch from a UE. As yet another example, the timing management circuitry 2242 may determine that more frequency domain separation is needed (e.g., based on a measured timing difference or interference measurements) and, in response, generate a message indicating additional frequency domain separation to be transmitted to a UE. In some examples, the timing management circuitry 2242 together with the communication and processing circuitry 2241 and the transceiver 2210 may receive a request for additional frequency domain separation from a UE.

At block 2504, the BS may transmit at least one indication of the selecting to the user equipment. For example, the timing management circuitry 2242 together with the communication and processing circuitry 2241 and the transceiver 2210, shown and described above in connection with FIG. 22, may encode the indication in a message for transmission and transmit the message via a designated downlink channel.

In some examples, the transmitting the at least one indication may include transmitting the at least one indication via a medium access control-control element (MAC-CE), a downlink control information (DCI), or a radio resource control (RRC) message.

In some examples, the method may further include receiving at least one request from the user equipment. In some examples, the at least one request may include at least one of: a request for the smaller SCS, a request for the switch from the first beam pair to the second beam pair, a request for the additional frequency domain separation, or a combination thereof. In some examples, the receiving the at least one request from the user equipment may include receiving the at least one request via a medium access control-control element (MAC-CE), an uplink control information (UCI), or a radio resource control (RRC) message.

In some examples, the method may further include receiving a request to use a particular SCS from the user equipment. In some examples, the selecting may include electing (an election) to use the particular SCS after receiving the request. In some examples, the at least one indication specifies that the particular SCS will be used for the full-duplex communication.

In some examples, the method may further include receiving a request to use a particular beam pair from the user equipment. In some examples, the selecting may include electing to use the particular beam pair after receiving the request. In some examples, the at least one indication specifies that the particular beam pair will be used for the full-duplex communication.

In some examples, the method may further include receiving a request to use a particular increase of frequency domain separation from the user equipment. In some examples, the selecting may include electing to use the particular increase of the frequency domain separation after receiving the request. In some examples, the at least one indication specifies that the particular increase of the frequency domain separation will be used for the full-duplex communication. In some examples, the particular increase of the frequency domain separation specifies at least one resource block.

In some examples, the method may further include receiving a request from the user equipment. In some examples, the request may include a request for a smaller overlap between a transmit band and a receive band, or a request for a larger guard band between a transmit band and a receive band. In some examples, the selecting may include electing to use the smaller overlap or the larger guard band after receiving the request. In some examples, the at least one indication specifies that the smaller overlap or the larger guard band will be used for the full-duplex communication.

In some examples, the method may further include receiving a request from the user equipment, wherein the request specifies at least one of: a frequency domain location for the additional frequency domain separation, a particular overlap between a transmit band and a receive band, a particular guard band between a transmit band and a receive band, or a combination thereof. In some examples, the selecting may include electing to use at least one of the frequency domain location, the particular overlap, the particular guard band, or a combination thereof, after receiving the request. In some examples, the at least one indication specifies that at least one of the frequency domain location, the particular overlap, the particular guard band, or a combination thereof, will be used for the full-duplex communication.

In some examples, the method may further include receiving an indication of a timing difference measured between a first timing for a downlink transmission received at the user equipment and a second timing for an uplink transmission received at the user equipment; determining that the timing difference is greater than a length of a normal CP; and triggering the selecting based on the determining that the timing difference is greater than the length of the normal CP.

In some examples, the method may further include receiving a request from the user equipment. In some examples, the request may include a request to use an extended CP instead of a normal CP; electing to use the extended CP instead of the normal CP after receiving the request; and transmitting an indication to the user equipment after the electing to use the extended CP, wherein the indication specifies that the extended CP will be used instead of the normal CP.

In some examples, the method may further include receiving an indication of a timing difference measured between a first timing for a downlink transmission received at the user equipment and a second timing for an uplink transmission received at the user equipment; determining that the timing difference is greater than a length of a normal CP; and electing to use an extended CP instead of a normal CP after the determining that the timing difference is greater than the length of the normal CP.

Figure 26:
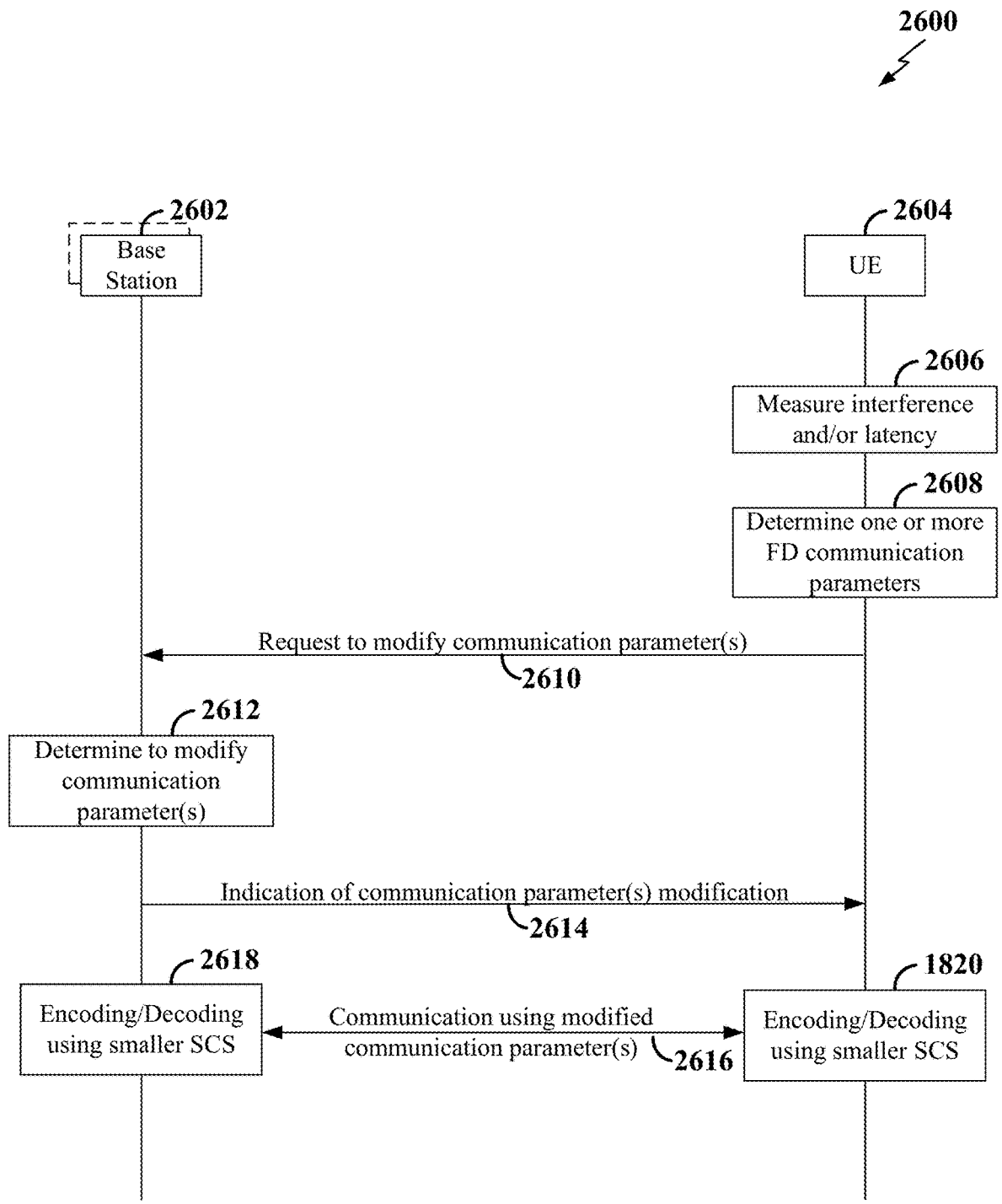
FIG. 26 is a signaling diagram illustrating signaling related to modification of communication parameters according to some aspects.

FIG. 26 is a signaling diagram 2600 illustrating an example of full duplex communication operations in a wireless communication system including a base station (BS) 2602 among one or more BSs and a UE 2604. In some examples, the BS 2602 among one or more BSs may correspond to any of the base stations or scheduling entities shown in any of FIGS. 1, 2, 5-9, 13-15, 17, 22, and 30. In some examples, the UE 2604 may correspond to any of the UEs or scheduled entities shown in any of FIGS. 1, 2, 5-9, 13-15, 17, 18, and 28. It should be noted that the example operations illustrated in FIG. 26 are not limited to those illustrated and described below, but may include other operations, such as those illustrated in FIGS. 12, 13, 15, and 17, one or more of which may be included in the communication operations of FIG. 26.

At a first step 2606 of FIG. 26, the UE 2604 may perform measurements during full duplex communications with the BS 2602 to determine one or more of an amount of interference at the UE 2604 or a timing offset between transmissions as observed by the UE 2604. As discussed above, interference at the UE 2604 may be an indication of too large of a timing offset between uplink and downlink transmissions corresponding to a same scheduled time resource, as observed by the UE 2604. In some examples, the UE 2604 may measure interference (e.g., SINR) and/or a strength (e.g., RSRP, RSRQ) of an interfering uplink transmission at one or more panels (e.g., panel 1) that the UE 2604 uses to receive a downlink transmission from the BS 2602. For example, as discussed herein, the UE 2604 may measure a CSI-RS transmitted by the BS 2602 during a downlink transmission as well as SRS transmitted by the UE 2604 during an uplink transmission (e.g., transmitted using panel 2).

The UE 2604 may determine a timing offset between uplink and downlink transmissions corresponding to a same scheduled time resource. In some examples, the determination of the timing offset may be in response to an amount that interference exceeds a threshold value. To determine the timing offset, the UE 2604 may determine a difference in time between: (i) a start of reception (e.g., at panel 1) at the UE 2604 of an uplink transmission transmitted by the UE 2604, and (ii) a start of reception at the UE of a downlink transmission from at least one of the one or more BSs, where the uplink transmission and the downlink transmission correspond to a same scheduled time resource. For example, the UE 2604 may determine the difference between the time at which the UE 2604 received an SRS of the uplink transmission, and the time at which the UE 2604 received a CSI-RS of the downlink transmission, or the difference between the time that a beginning of a CP of a downlink transmission symbol is received and the time of a beginning of a CP of an uplink transmission symbol is received. It should be noted that in some cases, reflection and/or leakage of the uplink transmission may cause the UE 2604 to receive the uplink transmission at a time that is different from a time that the uplink transmission is actually transmitted.

At a second step 2608, the UE 2604 may determine one or more communication parameters for full duplex communication between the UE 2604 and at least one of the one or more BSs based on one or more of the measurements of the first step 2606. The communication parameters may include an SCS, a duration of a CP, a downlink and uplink beam pair for full duplex communication, and a frequency domain separation between the uplink transmission and the downlink transmission.

The UE 2604 may determine the one or more communication parameters based on which of the one or more communication parameters can resolve the difference in time measured at the first step 2606 being greater than a threshold amount of time. For example, the threshold amount of time may be the duration of a CP length corresponding to the SCS used by the UE and BS for the uplink transmission and the downlink transmission. Thus, if the start of reception at the UE 2604 of an uplink transmission transmitted by the UE 2604, and the start of reception at the UE 2604 of a downlink transmission from at least one of the one or more BSs are separated by an amount of time less than or equal to the threshold, then the UE 2604 may determine to change the one of more of the communication parameters to reduce the measured difference in time to less than the threshold. The UE 2604 may determine the one or more communication parameters according to one or more of the steps described above and illustrated in illustrated in FIGS. 12, 13, 15, and 17.

For example, the UE 2604 may determine to reduce the current SCS to achieve a longer duration CP. For example, the UE 2604 may determine to reduce the SCS from 120 kHz (0.57 us CP duration) to 60 kHz (1.17 us CP duration) or lower.

In another example, the UE 2604 may determine to change the duration of the CP. In one example, a CP duration may be modified by changing the SCS, as discussed above. In another example, the UE 2604 may determine to maintain the current SCS and switch from a normal CP to an extended CP (ECP) associated with the current SCS. For instance, if the current SCS is 120 kHz, the corresponding ECP may be a longer duration (>0.57 us) than the normal CP (0.57 us). That is, the UE 2604 can determine to maintain the current SCS, but use an ECP corresponding to the current SCS. As discussed above, the duration of the ECP may be (pre) configured at the UE 2604, and its duration may depend on the SCS being used.

In another example, if the UE 2604 determines that the amount of time is less than or equal to the threshold, the UE 2604 may determine to change a downlink and uplink beam pair currently used for full duplex communication.

In another example, if the UE 2604 determines that the amount of time is less than or equal to the threshold, the UE 2604 may determine to increase a frequency domain separation between the uplink transmission and the downlink transmission for full duplex communication. In this example, the UE 2604 may include an amount of separation (e.g., in kHz) between future uplink and downlink transmissions.

At a first communication 2610, the UE 2604 may transmit, to the BS 2602, a request to modify the one or more communication parameters determined at the second step 2608 for communication between the UE 2604 and one or more BSs including BS 2602. For example, the UE 2604 may transmit a MAC-CE, a UCI, an RRC message, or any other suitable type of message.

At a third step 2612, the BS 2602 may receive the request to modify, and in response to the request, determine to proceed with the requested modification, deny the modification, or use a different modification of the one or more communication parameters. In some examples, the BS 2602 may transmit, in response to the request, one or more modified parameters to another BS of the one or more BSs, the one or more modified parameters indicating a parameter for FD communication between the UE and the other BS. Here, the BS 2602 may be a primary BS, and the other BS may be a secondary BS. In some examples, the BS 2602 may imply acceptance by proceeding to communicate with the UE 2604 using the one or more modified parameters.

If the BS 2602 determines to proceed with the requested modification, the BS 2602 may notify the UE 2604 in a second communication 2614 to proceed to communicate according to the requested modification. Alternatively, if the BS 2602 determines to proceed with the requested modification, the BS 2602 may proceed to communicate with the UE 2604 according to the requested modification without notification. If the BS 2602 determines to deny the requested modification and/or use a different modified one or more communication parameters, the BS 2602 may notify the UE 2604, in the second communication 2614, of the denial and/or the different modified one or more communication parameters. For example, the second communication may be a MAC-CE, a DCI, an RRC message, or any other suitable type of message. In some examples, this indication may be for a configurable ECP. For example, the indication may specify a particular ECP and/or a duration of the ECP.

At a third communication 2616, the BS 2602 and the UE 2604 may communicate using the modified communication parameters. To this end, at step 2618, the BS 2602 may encode a downlink transmission using the ECP (e.g., transmit OFDM symbols with ECPs) and/or decode an uplink transmission using the ECP (e.g., receive OFDM symbols with ECPs). Similarly, at step 2620, the UE 2604 may encode an uplink transmission using the ECP (e.g., transmit OFDM symbols with ECPs) and/or decode a downlink transmission using the ECP (e.g., receive OFDM symbols with ECPs).

Figure 27:
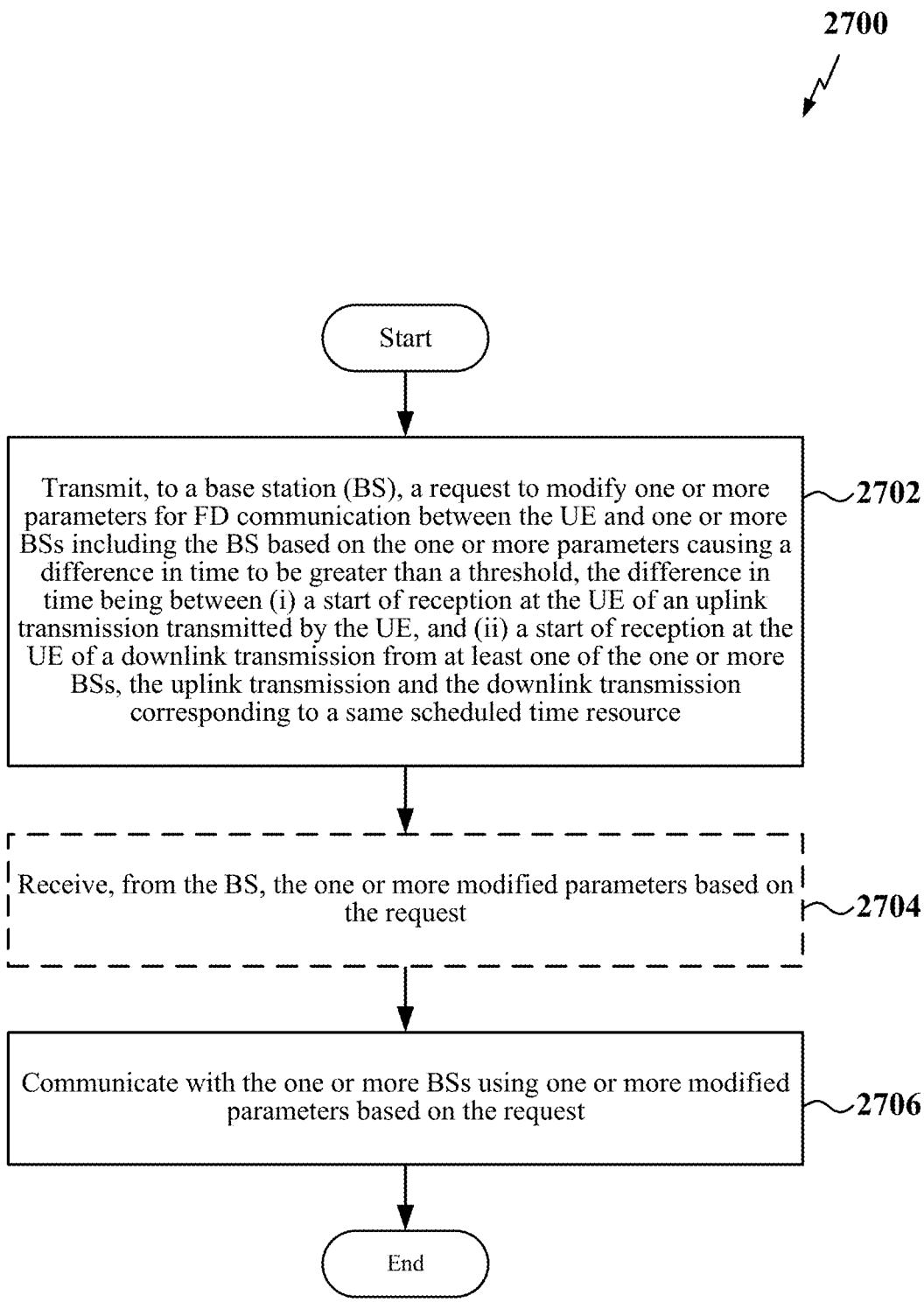
FIG. 27 is a flow chart of an example process for modifying communication parameters according to some aspects.

FIG. 27 is a flow diagram illustrating example operations 2700 for full-duplex wireless communication, in accordance with certain aspects of the present disclosure. The operations 2700 may be performed, for example, by a UE (e.g., any of the UEs or scheduled entities shown in any of FIGS. 1, 2, 5-9, 13-15, 17, 26, and 28). The operations 2700 may be implemented as software components that are executed and run on one or more processors. Further, the transmission and reception of signals by the UE in operations 2700 may be enabled, for example, by one or more antennas. In certain aspects, the transmission and/or reception of signals by the UE may be implemented via a bus interface of one or more processors obtaining and/or outputting signals.

The operations 2700 may begin, at a first block 2702, by transmitting, to a BS, a request to modify one or more parameters for FD communication between the UE and one or more BSs including the BS based on the one or more parameters causing a difference in time to be greater than a threshold, the difference in time being between (i) a start of reception at the UE of an uplink transmission transmitted by the UE, and (ii) a start of reception at the UE of a downlink transmission from at least one of the one or more BSs, the uplink transmission and the downlink transmission corresponding to a same scheduled time resource.

Optionally, the operations 2700 may include, at a second block 2704, receiving, from the BS, the one or more modified parameters based on the request.

The operations 2700 may include, at a third block 2706, communicating with the one or more BSs using one or more modified parameters based on the request.

In certain aspects, the threshold comprises a cyclic prefix (CP) length as defined by the one or more parameters.

In certain aspects, the reception at the UE of the uplink transmission transmitted by the UE comprises reception at one or more antenna panels of the UE of the uplink transmission transmitted by the UE, and wherein the reception at the UE of the downlink transmission from the at least one of the one or more BSs comprises reception at the one or more antenna panels of the UE of the downlink transmission from the at least one of the one or more BSs.

In certain aspects, the one or more parameters comprise one or more of: a sub-carrier spacing (SCS), a duration of a cyclic prefix (CP), a downlink and uplink beam pair for FD communication, or a frequency domain separation between the uplink transmission and the downlink transmission for FD communication.

In certain aspects, the request to modify the one or more parameters comprises a request to reduce a sub-carrier spacing (SCS) used for FD communication.

In certain aspects, the request to modify the one or more parameters comprises a request to increase a duration of a cyclic prefix (CP).

In certain aspects, a sub-carrier spacing (SCS) defined in the one or more parameters is greater than 60 kHz.

In certain aspects, the request to increase the duration of the CP comprises a request to use an extended CP (ECP).

In certain aspects, the request to modify the one or more parameters comprises a request to change a downlink and uplink beam pair used for FD communication.

In certain aspects, the request to modify the one or more parameters comprises a request to increase frequency domain separation between the uplink transmission and the downlink transmission for FD communication.

In certain aspects, the request comprises an amount to increase the frequency domain separation as a guard band.

In certain aspects, the request to modify the one or more parameters is transmitted via one or more of a medium access control-control element (MAC-CE), an uplink control information (UCI), or a radio resource control (RRC) message.

Figure 28:
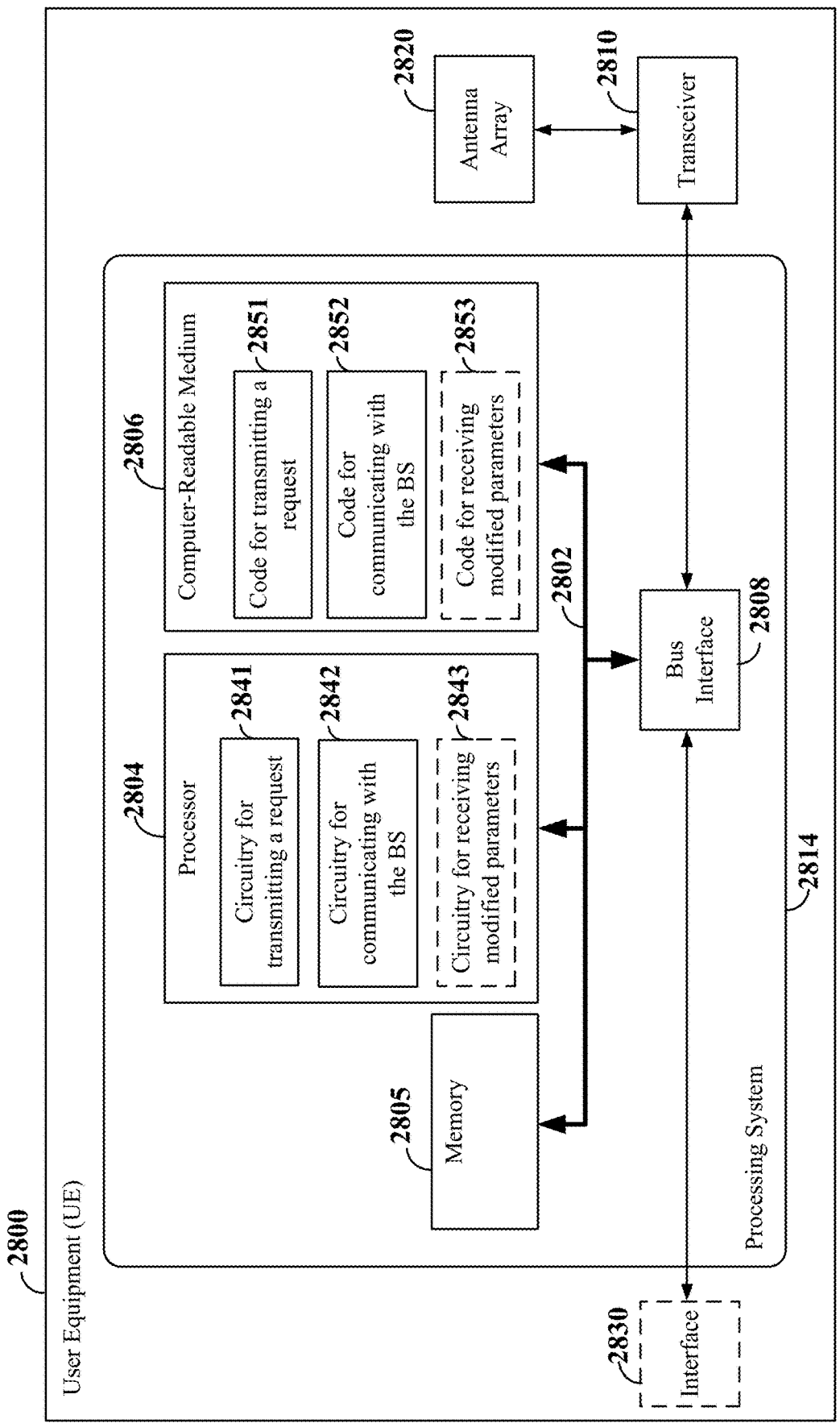
FIG. 28 is a block diagram illustrating an example of a hardware implementation for a user equipment employing a processing system according to some aspects.

FIG. 28 is a block diagram illustrating an example of a hardware implementation for a UE 2800 employing a processing system 2814. For example, the UE 2800 may be a device configured to wirelessly communicate with a base station, as discussed in any one or more of FIGS. 1-26. In some implementations, the UE 2800 may correspond to any of the Ues or scheduled entities shown in any of FIGS. 1, 2, 5-9, 12-15, 17, and 26.

In accordance with various aspects of the disclosure, an element, or any portion of an element, or any combination of elements may be implemented with the processing system 2814. The processing system 2814 may include one or more processors 2804. Examples of processors 2804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 2800 may be configured to perform any one or more of the functions described herein. That is, the processor 2804, as utilized in a UE 2800, may be used to implement any one or more of the processes and procedures described herein.

The processor 2804 may in some instances be implemented via a baseband or modem chip and in other implementations, the processor 2804 may itself comprise a number of devices distinct and different from a baseband or modem chip (e.g., in such scenarios as may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 2814 may be implemented with a bus architecture, represented generally by the bus 2802. The bus 2802 may include any number of interconnecting buses and bridges depending on the specific application of the processing system 2814 and the overall design constraints. The bus 2802 communicatively couples together various circuits including one or more processors (represented generally by the processor 2804), a memory 2805, and computer-readable media (represented generally by the computer-readable medium 2806). The bus 2802 may also link various other circuits such as timing sources, peripherals, voltage regulators, and power management circuits, which are well known in the art, and therefore, will not be described any further. A bus interface 2808 provides an interface between the bus 2802 and a transceiver 2810 and between the bus 2802 and an interface 2830. The transceiver 2810 provides a communication interface or means for communicating with various other apparatus over a wireless transmission medium. In some examples, the UE may include two or more transceivers 2810, each configured to communicate with a respective network type (e.g., terrestrial or non-terrestrial). The interface 2830 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 2830 may include a user interface (e.g., keypad, display, speaker, microphone, joystick). Of course, such a user interface is optional, and may be omitted in some examples, such as an IoT device.

The processor 2804 is responsible for managing the bus 2802 and general processing, including the execution of software stored on the computer-readable medium 2806. The software, when executed by the processor 2804, causes the processing system 2814 to perform the various functions described below for any particular apparatus. The computer-readable medium 2806 and the memory 2805 may also be used for storing data that is manipulated by the processor 2804 when executing software.

One or more processors 2804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 2806.

The computer-readable medium 2806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 2806 may reside in the processing system 2814, external to the processing system 2814, or distributed across multiple entities including the processing system 2814. The computer-readable medium 2806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In certain aspects, computer-readable medium 2806 is configured to store instructions (e.g., computer-executable code) that when executed by the one or more processors 2804, cause the one or more processors 2804 to perform the operations illustrated in FIGS. 19, 20, 21, and 27, or other operations for performing the various techniques discussed herein.

In the depicted example, computer-readable medium 2806 stores code 2851 for transmitting, to a base station (BS), a request to modify one or more parameters for FD communication between the UE and one or more BSs including the BS based on the one or more parameters causing a difference in time to be greater than a threshold, the difference in time being between (i) a start of reception at the UE of an uplink transmission transmitted by the UE, and (ii) a start of reception at the UE of a downlink transmission from at least one of the one or more BSs, the uplink transmission and the downlink transmission corresponding to a same scheduled time resource. The computer-readable medium 2806 also stores code 2852 for communicating with the one or more BSs using one or more modified parameters based on the request. The computer-readable medium 2806 also stores code 2853 for receiving, from the BS, the one or more modified parameters based on the request.

In the depicted example, the one or more processors 2804 include circuitry configured to implement the code stored in the computer-readable medium/memory 2806, including circuitry 2841 for transmitting, to a base station (BS), a request to modify one or more parameters for FD communication between the UE and one or more BSs including the BS based on the one or more parameters causing a difference in time to be greater than a threshold, the difference in time being between (i) a start of reception at the UE of an uplink transmission transmitted by the UE, and (ii) a start of reception at the UE of a downlink transmission from at least one of the one or more BSs, the uplink transmission and the downlink transmission corresponding to a same scheduled time resource. The one or more processors 2804 also include circuitry 2842 for communicating with the one or more BSs using one or more modified parameters based on the request. The one or more processors 2804 also include circuitry 2843 for receiving, from the BS, the one or more modified parameters based on the request.

Various components of communications device 2800 may provide means for performing the methods described herein, including with respect to FIGS. 19, 20, 21, and 27.

In some examples, means for communicating (e.g., transmitting and/or receiving) may include the transceiver 2810 and/or antenna array 2820 of the UE 2800. In some examples, means for determining may include various processing system components, such as: the one or more processors 2804.

Notably, FIG. 28 is an example, and many other examples and configurations of communication device 2800 are possible.

Figure 29:
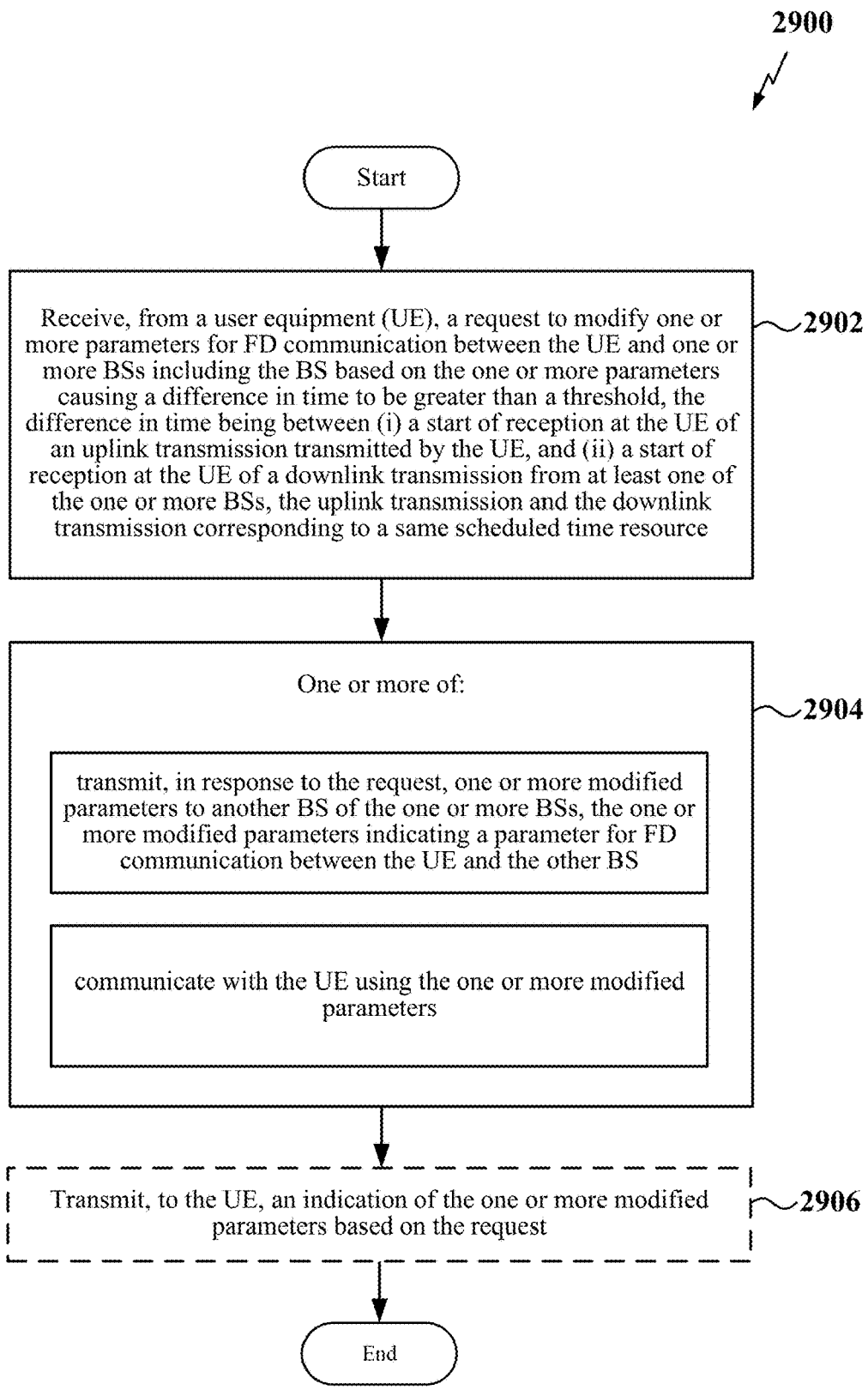
FIG. 29 is a flow chart of an example process for modifying communication parameters according to some aspects.

FIG. 29 is a flow diagram illustrating example operations 2900 for full-duplex wireless communication, in accordance with certain aspects of the present disclosure. The operations 2900 may be performed, for example, by a BS (e.g., any of the BSs or scheduling entities shown in any of FIGS. 1, 2, 5-9, 13-15, 17, 22, and 26). The operations 2900 may be implemented as software components that are executed and run on one or more processors. Further, the transmission and reception of signals by the UE in operations 2900 may be enabled, for example, by one or more antennas. In certain aspects, the transmission and/or reception of signals by the UE may be implemented via a bus interface of one or more processors obtaining and/or outputting signals.

The operations 2900 may begin, at a first block 2902, by receiving, from a UE, a request to modify one or more parameters for FD communication between the UE and one or more BSs including the BS based on the one or more parameters causing a difference in time to be greater than a threshold, the difference in time being between (i) a start of reception at the UE of an uplink transmission transmitted by the UE, and (ii) a start of reception at the UE of a downlink transmission from at least one of the one or more BSs, the uplink transmission and the downlink transmission corresponding to a same scheduled time resource.

The operations 2900 may include, at a second block 2904, perform one or more of: transmitting, in response to the request, one or more modified parameters to another BS of the one or more BSs, the one or more modified parameters indicating a parameter for FD communication between the UE and the other BS; or communicating with the UE using the one or more modified parameters.

Optionally, the operations 2900 may include, at a third block 2906, receiving, from the UE, the one or more modified parameters based on the request.

In certain aspects, the threshold comprises a cyclic prefix (CP) length as defined by the one or more parameters.

In certain aspects, the reception at the UE of the uplink transmission transmitted by the UE comprises reception at one or more antenna panels of the UE of the uplink transmission transmitted by the UE, and wherein the reception at the UE of the downlink transmission from the at least one of the one or more BSs comprises reception at the one or more antenna panels of the UE of the downlink transmission from the at least one of the one or more BSs.

In certain aspects, the one or more parameters comprise one or more of: a sub-carrier spacing (SCS), a duration of a cyclic prefix (CP), a downlink and uplink beam pair for FD communication, or a frequency domain separation between the uplink transmission and the downlink transmission for FD communication.

In certain aspects, the request to modify the one or more parameters comprises a request to reduce a sub-carrier spacing (SCS) used for FD communication.

In certain aspects, the request to modify the one or more parameters comprises a request to increase a duration of a cyclic prefix (CP).

In certain aspects, a sub-carrier spacing (SCS) defined in the one or more parameters is greater than 60 kHz.

In certain aspects, the request to increase the duration of the CP comprises a request to use an extended CP (ECP).

In certain aspects, the request to modify the one or more parameters comprises a request to change a downlink and uplink beam pair used for FD communication.

In certain aspects, the request to modify the one or more parameters comprises a request to increase frequency domain separation between the uplink transmission and the downlink transmission for FD communication.

In certain aspects, the request comprises an amount to increase the frequency domain separation as a guard band.

In certain aspects, the request to modify the one or more parameters is received via one or more of a medium access control-control element (MAC-CE), an uplink control information (UCI), or a radio resource control (RRC) message.

Figure 30:
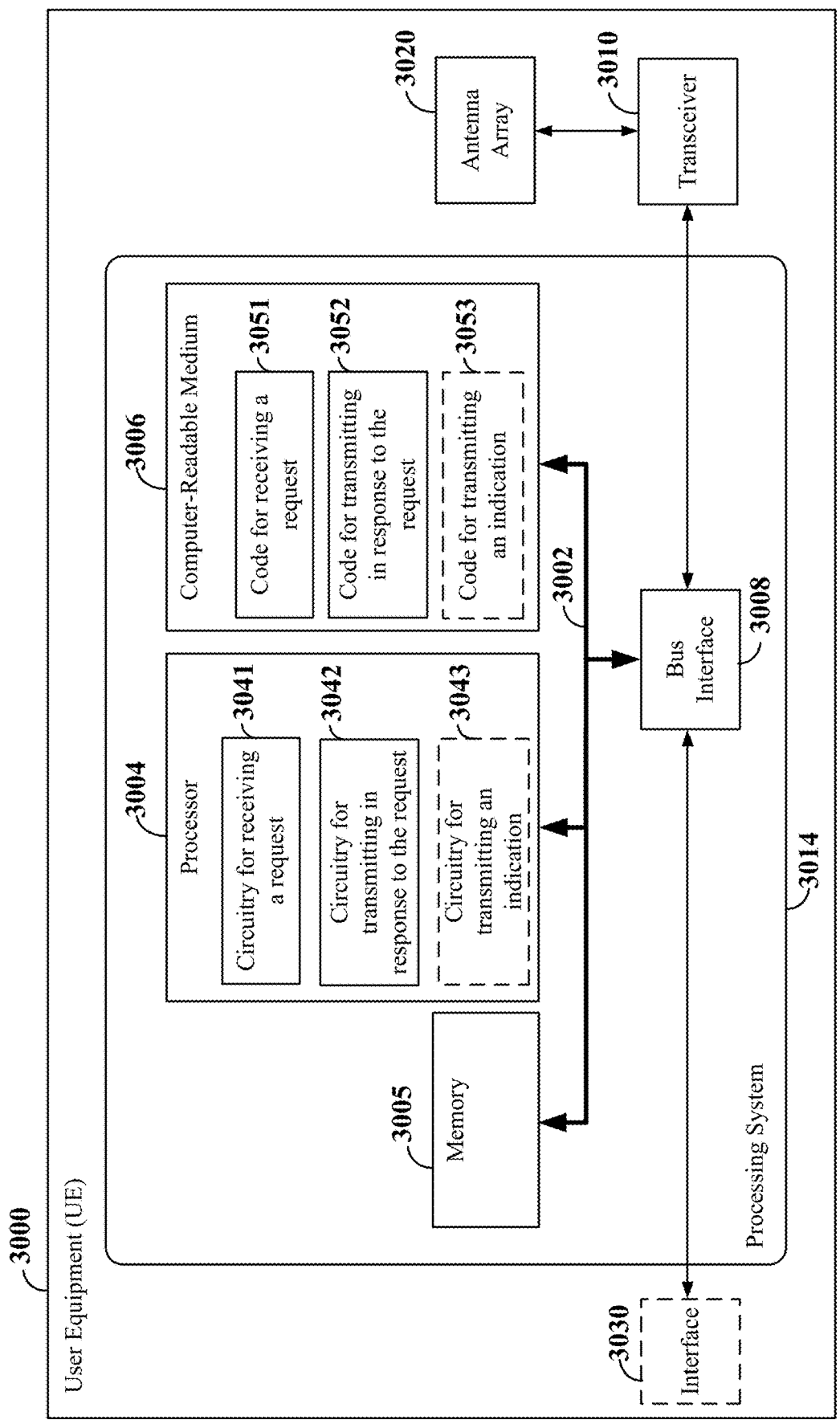
FIG. 30 is a block diagram illustrating an example of a hardware implementation for a base station employing a processing system according to some aspects.

FIG. 30 is a block diagram illustrating an example of a hardware implementation for a BS 3000 employing a processing system 3014. For example, the BS 3000 may be a device configured to wirelessly communicate with a UE, as discussed in any one or more of FIGS. 1-26. In some implementations, the BS 3000 may correspond to any of the UEs or scheduled entities shown in any of FIGS. 1, 2, 5-9, 12-15, 17, and 26.

In accordance with various aspects of the disclosure, an element, or any portion of an element, or any combination of elements may be implemented with the processing system 3014. The processing system 3014 may include one or more processors 3004. Examples of processors 3004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the BS 3000 may be configured to perform any one or more of the functions described herein. That is, the processor 3004, as utilized in a BS 3000, may be used to implement any one or more of the processes and procedures described herein.

The processor 3004 may in some instances be implemented via a baseband or modem chip and in other implementations, the processor 3004 may itself comprise a number of devices distinct and different from a baseband or modem chip (e.g., in such scenarios as may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 3014 may be implemented with a bus architecture, represented generally by the bus 3002. The bus 3002 may include any number of interconnecting buses and bridges depending on the specific application of the processing system 3014 and the overall design constraints. The bus 3002 communicatively couples together various circuits including one or more processors (represented generally by the processor 3004), a memory 3005, and computer-readable media (represented generally by the computer-readable medium 3006). The bus 3002 may also link various other circuits such as timing sources, peripherals, voltage regulators, and power management circuits, which are well known in the art, and therefore, will not be described any further. A bus interface 3008 provides an interface between the bus 3002 and a transceiver 3010 and between the bus 3002 and an interface 3030. The transceiver 3010 provides a communication interface or means for communicating with various other apparatus over a wireless transmission medium. In some examples, the BS may include two or more transceivers 3010, each configured to communicate with a respective network type (e.g., terrestrial or non-terrestrial). The interface 3030 provides a communication interface or means of communicating with various other apparatuses and devices (e.g., other devices housed within the same apparatus as the BS or other external apparatuses) over an internal bus or external transmission medium, such as an Ethernet cable. Depending upon the nature of the apparatus, the interface 3030 may include a user interface (e.g., keypad, display, speaker, microphone, joystick). Of course, such a user interface is optional, and may be omitted in some examples, such as an IoT device.

The processor 3004 is responsible for managing the bus 3002 and general processing, including the execution of software stored on the computer-readable medium 3006. The software, when executed by the processor 3004, causes the processing system 3014 to perform the various functions described below for any particular apparatus. The computer-readable medium 3006 and the memory 3005 may also be used for storing data that is manipulated by the processor 3004 when executing software.

One or more processors 3004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 3006.

The computer-readable medium 3006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 3006 may reside in the processing system 3014, external to the processing system 3014, or distributed across multiple entities including the processing system 3014. The computer-readable medium 3006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In certain aspects, computer-readable medium 3006 is configured to store instructions (e.g., computer-executable code) that when executed by the one or more processors 3004, cause the one or more processors 3004 to perform the operations illustrated in FIGS. 23, 24, 25, and 29, or other operations for performing the various techniques discussed herein.

In the depicted example, computer-readable medium 3006 stores code 3051 for receiving, from a user equipment (UE), a request to modify one or more parameters for FD communication between the UE and one or more BSs including the BS based on the one or more parameters causing a difference in time to be greater than a threshold, the difference in time being between (i) a start of reception at the UE of an uplink transmission transmitted by the UE, and (ii) a start of reception at the UE of a downlink transmission from at least one of the one or more BSs, the uplink transmission and the downlink transmission corresponding to a same scheduled time resource. The computer-readable medium 3006 also stores code 3052 for one or more of: transmitting, in response to the request, one or more modified parameters to another BS of the one or more BSs, the one or more modified parameters indicating a parameter for FD communication between the UE and the other BS; or communicating with the UE using the one or more modified parameters. The computer-readable medium 3006 optionally stores code 3053 for transmitting, to the UE, an indication of the one or more modified parameters based on the request.

In the depicted example, the one or more processors 3004 include circuitry configured to implement the code stored in the computer-readable medium/memory 3006, including circuitry 3041 for receiving, from a user equipment (UE), a request to modify one or more parameters for FD communication between the UE and one or more BSs including the BS based on the one or more parameters causing a difference in time to be greater than a threshold, the difference in time being between (i) a start of reception at the UE of an uplink transmission transmitted by the UE, and (ii) a start of reception at the UE of a downlink transmission from at least one of the one or more BSs, the uplink transmission and the downlink transmission corresponding to a same scheduled time resource. The one or more processors 3004 also include circuitry 3042 for one or more of: transmitting, in response to the request, one or more modified parameters to another BS of the one or more BSs, the one or more modified parameters indicating a parameter for FD communication between the UE and the other BS; or communicate with the UE using the one or more modified parameters. Optionally, the one or more processors 3004 may include circuitry 3043 for transmitting, to the UE, an indication of the one or more modified parameters based on the request.

Various components of communications device 3000 may provide means for performing the methods described herein, including with respect to FIGS. 23, 24, 25, and 29.

In some examples, means for communicating (e.g., transmitting and/or receiving) may include the transceiver 3010 and/or antenna array 3020 of the BS 3000. In some examples, means for determining may include various processing system components, such as: the one or more processors 3004.

Notably, FIG. 30 is an example, and many other examples and configurations of communication device 3000 are possible.

Example Clauses

Implementation examples are described in the following numbered clauses:

Clause 1: A user equipment (UE) configured for full-duplex (FD) wireless communication, the UE comprising: a memory; and a processor coupled to the memory, the memory and the processor configured to: transmit, to a base station (BS), a request to modify one or more parameters for FD communication between the UE and one or more BSs including the BS based on the one or more parameters causing a difference in time to be greater than a threshold, the difference in time being between (i) a start of reception at the UE of an uplink transmission transmitted by the UE, and (ii) a start of reception at the UE of a downlink transmission from at least one of the one or more BSs, the uplink transmission and the downlink transmission corresponding to a same scheduled time resource; and communicate with the one or more BSs using one or more modified parameters based on the request.

Clause 2: The UE of clause 1, wherein the threshold comprises a cyclic prefix (CP) length as defined by the one or more parameters.

Clause 3: The UE of any of clauses 1 and 2, wherein the reception at the UE of the uplink transmission transmitted by the UE comprises reception at one or more antenna panels of the UE of the uplink transmission transmitted by the UE, and wherein the reception at the UE of the downlink transmission from the at least one of the one or more BSs comprises reception at the one or more antenna panels of the UE of the downlink transmission from the at least one of the one or more BSs.

Clause 4: The UE of any of clauses 1-3, wherein the one or more parameters comprise one or more of: a sub-carrier spacing (SCS), a duration of a cyclic prefix (CP), a downlink and uplink beam pair for FD communication, or a frequency domain separation between the uplink transmission and the downlink transmission for FD communication.

Clause 5: The UE of any of clauses 1-4, wherein the request to modify the one or more parameters comprises a request to reduce a sub-carrier spacing (SCS) used for FD communication.

Clause 6: The UE of any of clauses 1-5, wherein the request to modify the one or more parameters comprises a request to increase a duration of a cyclic prefix (CP).

Clause 7: The UE of clause 6, wherein a sub-carrier spacing (SCS) defined in the one or more parameters is greater than 60 kHz.

Clause 8: The UE of any of clauses 1-7, wherein the request to increase the duration of the CP comprises a request to use an extended CP (ECP).

Clause 9: The UE of any of clauses 1-8, wherein the request to modify the one or more parameters comprises a request to change a downlink and uplink beam pair used for FD communication.

Clause 10: The UE of any of clauses 1-9, wherein the request to modify the one or more parameters comprises a request to increase frequency domain separation between the uplink transmission and the downlink transmission for FD communication.

Clause 11: The UE of any of clauses 1-10, wherein the request comprises an amount to increase the frequency domain separation as a guard band.

Clause 12: The UE of any of clauses 1-11, wherein the request to modify the one or more parameters is transmitted via one or more of a medium access control-control element (MAC-CE), an uplink control information (UCI), or a radio resource control (RRC) message.

Clause 13: The UE of any of clauses 1-12, the memory and the processor configured to receive, from the BS, the one or more modified parameters based on the request.

Clause 14: A base station (BS) configured for full-duplex (FD) wireless communication, the BS comprising: a memory; and a processor coupled to the memory, the memory and the processor configured to: receive, from a user equipment (UE), a request to modify one or more parameters for FD communication between the UE and one or more BSs including the BS based on the one or more parameters causing a difference in time to be greater than a threshold, the difference in time being between (i) a start of reception at the UE of an uplink transmission transmitted by the UE, and (ii) a start of reception at the UE of a downlink transmission from at least one of the one or more BSs, the uplink transmission and the downlink transmission corresponding to a same scheduled time resource; and one or more of: transmit, in response to the request, one or more modified parameters to another BS of the one or more BSs, the one or more modified parameters indicating a parameter for FD communication between the UE and the other BS; or communicate with the UE using the one or more modified parameters.

Clause 15: The BS of clause 14, wherein the threshold comprises a cyclic prefix (CP) length as defined by the one or more parameters.

Clause 16: The BS of any of clauses 14 and 15, wherein the reception at the UE of the uplink transmission transmitted by the UE comprises reception at one or more antenna panels of the UE of the uplink transmission transmitted by the UE, and wherein the reception at the UE of the downlink transmission from the at least one of the one or more BSs comprises reception at the one or more antenna panels of the UE of the downlink transmission from the at least one of the one or more BSs.

Clause 17: The BS of any of clauses 14-16, wherein the one or more parameters comprise one or more of: a sub-carrier spacing (SCS), a duration of a cyclic prefix (CP), a downlink and uplink beam pair for FD communication, or a frequency domain separation between the uplink transmission and the downlink transmission for FD communication.

Clause 18: The BS of any of clauses 14-17, wherein the request to modify the one or more parameters comprises a request to reduce a sub-carrier spacing (SCS) used for FD communication.

Clause 19: The BS of any of clauses 14-18, wherein the request to modify the one or more parameters comprises a request to increase a duration of a cyclic prefix (CP).

Clause 20: The BS of clause 19, wherein a sub-carrier spacing (SCS) defined in the one or more parameters is greater than 60 kHz.

Clause 21: The BS of any of clauses 14-20, wherein the request to increase the duration of the CP comprises a request to use an extended CP (ECP).

Clause 22: The BS of any of clauses 14-21, wherein the request to modify the one or more parameters comprises a request to change a downlink and uplink beam pair used for FD communication.

Clause 23: The BS of any of clauses 14-22, wherein the request to modify the one or more parameters comprises a request to increase frequency domain separation between the uplink transmission and the downlink transmission for FD communication.

Clause 24: The BS of any of clauses 14-23, wherein the request comprises an amount to increase the frequency domain separation as a guard band.

Clause 25: The BS of any of clauses 14-24, wherein the request to modify the one or more parameters is received via one or more of a medium access control-control element (MAC-CE), an uplink control information (UCI), or a radio resource control (RRC) message.

Clause 26: The BS of any of clauses 14-25, the memory and the processor configured to transmit, to the UE, an indication of the one or more modified parameters based on the request.

Clause 27: A method of full-duplex (FD) wireless communication by a user equipment (UE), the method comprising: transmitting, to a base station (BS), a request to modify one or more parameters for FD communication between the UE and one or more BSs including the BS based on the one or more parameters causing a difference in time to be greater than a threshold, the difference in time being between (i) a start of reception at the UE of an uplink transmission transmitted by the UE, and (ii) a start of reception at the UE of a downlink transmission from at least one of the one or more BSs, the uplink transmission and the downlink transmission corresponding to a same scheduled time resource; and communicating with the one or more BSs using one or more modified parameters based on the request.

Clause 28: The UE of clause 27, wherein the threshold comprises a cyclic prefix (CP) length as defined by the one or more parameters.

Clause 29: The UE of any of clauses 27 and 28, wherein the reception at the UE of the uplink transmission transmitted by the UE comprises reception at one or more antenna panels of the UE of the uplink transmission transmitted by the UE, and wherein the reception at the UE of the downlink transmission from the at least one of the one or more BSs comprises reception at the one or more antenna panels of the UE of the downlink transmission from the at least one of the one or more BSs.

Clause 30: The UE of any of clauses 27-29, wherein the one or more parameters comprise one or more of: a sub-carrier spacing (SCS), a duration of a cyclic prefix (CP), a downlink and uplink beam pair for FD communication, or a frequency domain separation between the uplink transmission and the downlink transmission for FD communication.

Clause 31: The UE of any of clauses 27-30, wherein the request to modify the one or more parameters comprises a request to reduce a sub-carrier spacing (SCS) used for FD communication.

Clause 32: The UE of any of clauses 27-31, wherein the request to modify the one or more parameters comprises a request to increase a duration of a cyclic prefix (CP).

Clause 33: The UE of any of clauses 27-32 wherein a sub-carrier spacing (SCS) defined in the one or more parameters is greater than 60 kHz.

Clause 34: The UE of any of clauses 27-33, wherein the request to increase the duration of the CP comprises a request to use an extended CP (ECP).

Clause 35: The UE of any of clauses 27-34, wherein the request to modify the one or more parameters comprises a request to change a downlink and uplink beam pair used for FD communication.

Clause 36: The UE of any of clauses 27-35 wherein the request to modify the one or more parameters comprises a request to increase frequency domain separation between the uplink transmission and the downlink transmission for FD communication.

Clause 37: The UE of any of clauses 27-36 wherein the request comprises an amount to increase the frequency domain separation as a guard band.

Clause 38: The UE of any of clauses 27-37, wherein the request to modify the one or more parameters is transmitted via one or more of a medium access control-control element (MAC-CE), an uplink control information (UCI), or a radio resource control (RRC) message.

Clause 39: The UE of any of clauses 27-38, the memory and the processor configured to receive, from the BS, the one or more modified parameters based on the request.

Clause 40: A method of full-duplex (FD) wireless communication by a base station (BS), the method comprising: receiving, from a user equipment (UE), a request to modify one or more parameters for FD communication between the UE and one or more BSs including the BS based on the one or more parameters causing a difference in time to be greater than a threshold, the difference in time being between (i) a start of reception at the UE of an uplink transmission transmitted by the UE, and (ii) a start of reception at the UE of a downlink transmission from at least one of the one or more BSs, the uplink transmission and the downlink transmission corresponding to a same scheduled time resource; and one or more of: transmitting, in response to the request, one or more modified parameters to another BS of the one or more BSs, the one or more modified parameters indicating a parameter for FD communication between the UE and the other BS; or communicating with the UE using the one or more modified parameters.

Clause 41: The BS of clause 40, wherein the threshold comprises a cyclic prefix (CP) length as defined by the one or more parameters.

Clause 42: The BS of any of clauses 40 and 41, wherein the reception at the UE of the uplink transmission transmitted by the UE comprises reception at one or more antenna panels of the UE of the uplink transmission transmitted by the UE, and wherein the reception at the UE of the downlink transmission from the at least one of the one or more BSs comprises reception at the one or more antenna panels of the UE of the downlink transmission from the at least one of the one or more BSs.

Clause 43: The BS of any of clauses 40-42, wherein the one or more parameters comprise one or more of: a sub-carrier spacing (SCS), a duration of a cyclic prefix (CP), a downlink and uplink beam pair for FD communication, or a frequency domain separation between the uplink transmission and the downlink transmission for FD communication.

Clause 44: The BS of any of clauses 40-43, wherein the request to modify the one or more parameters comprises a request to reduce a sub-carrier spacing (SCS) used for FD communication.

Clause 45: The BS of any of clauses 40-44, wherein the request to modify the one or more parameters comprises a request to increase a duration of a cyclic prefix (CP).

Clause 46: The BS of any of clauses 40-45, wherein a sub-carrier spacing (SCS) defined in the one or more parameters is greater than 60 kHz.

Clause 47: The BS of any of clauses 40-46, wherein the request to increase the duration of the CP comprises a request to use an extended CP (ECP).

Clause 48: The BS of any of clauses 40-47, wherein the request to modify the one or more parameters comprises a request to change a downlink and uplink beam pair used for FD communication.

Clause 49: The BS of any of clauses 40-48, wherein the request to modify the one or more parameters comprises a request to increase frequency domain separation between the uplink transmission and the downlink transmission for FD communication.

Clause 50: The BS of any of clauses 40-49, wherein the request comprises an amount to increase the frequency domain separation as a guard band.

Clause 51: The BS of any of clauses 40-50, wherein the request to modify the one or more parameters is received via one or more of a medium access control-control element (MAC-CE), an uplink control information (UCI), or a radio resource control (RRC) message.

Clause 52: The BS of any of clauses 40-51, wherein the memory and the processor are further configured to transmit, to the UE, an indication of the one or more modified parameters based on the request.

Clause 53: A UE, comprising means for performing a method in accordance with any one of Clauses 27-39.

Clause 54: A non-transitory computer-readable medium comprising executable instructions that, when executed by one or more processors of a UE, cause the UE to perform a method in accordance with any one of Clauses 27-39.

Clause 55: A computer program product embodied on a computer-readable storage medium comprising code for performing a method in accordance with any one of Clauses 27-39.

Clause 56: A BS, comprising means for performing a method in accordance with any one of Clauses 40-52.

Clause 57: A non-transitory computer-readable medium comprising executable instructions that, when executed by one or more processors of a B S, cause the BS to perform a method in accordance with any one of Clauses 40-52.

Clause 58: A computer program product embodied on a computer-readable storage medium comprising code for performing a method in accordance with any one of Clauses 40-52.

Clause 59: A method of wireless communication at a user equipment, the method comprising: determining that a first subcarrier spacing (SCS) for a first transmission is 120 kilohertz or 240 kilohertz; identifying an extended cyclic prefix (ECP) associated with the first SCS; and encoding or decoding the first transmission, wherein the encoding or decoding the first transmission is based on the ECP.

Clause 60: The method of clause 60, wherein the first transmission is for a full-duplex communication between the user equipment and a base station.

Clause 58: The method of clause 60, further comprising: measuring a timing difference between a first timing for a downlink transmission received at the user equipment and a second timing for an uplink transmission received at the user equipment; and determining that the timing difference is greater than a length of a normal cyclic prefix (CP) for the first SCS; wherein the identifying the ECP associated with the first SCS comprises selecting the ECP after the determining that the timing difference is greater than the length of the normal CP for the first SCS.

Clause 61: The method of clause 60, further comprising: determining that the first transmission is for a full-duplex communication; wherein the identifying the ECP associated with the first SCS further comprises selecting the ECP after the determining that the first transmission is for the full-duplex communication.

Clause 62: The method of clause 60, wherein: the determining that the first SCS for the first transmission is 120 kilohertz or 240 kilohertz comprises receiving a first indication of the first SCS from a base station; and the identifying the ECP comprises receiving a second indication of the ECP from the base station.

Clause 63: The method of clause 60, further comprising: measuring a timing difference between a first timing for a downlink transmission received at the user equipment and a second timing for an uplink transmission received at the user equipment; determining that the timing difference is greater than a length of a normal cyclic prefix (CP) for the first SCS; and transmitting a request to a base station after the determining that the timing difference is greater than the length of the normal CP for the first SCS, wherein the request comprises at least one of: a request for a smaller SCS, a request to use an extended CP instead of a normal CP, a request to switch to a different beam pair, a request for additional frequency domain separation, or a combination thereof.

Clause 64: The method of clause 60, further comprising: measuring a timing difference between a first timing for a downlink transmission received at the user equipment and a second timing for an uplink transmission received at the user equipment; and transmitting an indication of the timing difference to a base station.

Clause 65: A user equipment, comprising: a transceiver; a memory; and a processor communicatively coupled to the transceiver and the memory, wherein the processor and the memory are configured to: determine that a first subcarrier spacing (SCS) for a first transmission transmitted or received via the transceiver is 120 kilohertz or 240 kilohertz; identify an extended cyclic prefix (ECP) associated with the first SCS; and encode or decoding the first transmission, wherein encoding or decoding the first transmission is based on the ECP.

Clause 66: The user equipment of clause 65, wherein the first transmission is for a full-duplex communication between the user equipment and a base station.

Clause 67: The user equipment of clause 65, wherein the processor and the memory are further configured to: measure a timing difference between a first timing for a downlink transmission received at the user equipment and a second timing for an uplink transmission received at the user equipment; and determine that the timing difference is greater than a length of a normal cyclic prefix (CP) for the first SCS; wherein identification of the ECP associated with the first SCS comprises selection of the ECP after a determination that the timing difference is greater than the length of the normal CP for the first SCS.

Clause 68: The user equipment of clause 65, wherein the processor and the memory are further configured to: determine that the first transmission is for a full-duplex communication; wherein identification of the ECP associated with the first SCS comprises selection of the ECP after a determination that the first transmission is for the full-duplex communication.

Clause 69: The user equipment of clause 65, wherein: a determination that the first SCS for the first transmission is 120 kilohertz or 240 kilohertz comprises receipt of a first indication of the first SCS from a base station; and an identification of the ECP comprises receipt of a second indication of the ECP from the base station.

Clause 70: The user equipment of clause 65, wherein the processor and the memory are further configured to: measure a timing difference between a first timing for a downlink transmission received at the user equipment and a second timing for an uplink transmission received at the user equipment; determine that the timing difference is greater than a length of a normal cyclic prefix (CP) for the first SCS; and transmit a request to a base station after a determination that the timing difference is greater than the length of the normal CP for the first SCS, wherein the request comprises at least one of: a request for a smaller SCS, a request to use an extended CP instead of a normal CP, a request to switch to a different beam pair, a request for additional frequency domain separation, or a combination thereof.

Clause 71: The user equipment of clause 65, wherein the processor and the memory are further configured to: measure a timing difference between a first timing for a downlink transmission received at the user equipment and a second timing for an uplink transmission received at the user equipment; and transmit an indication of the timing difference to a base station.

Clause 72: A user equipment, comprising: means for determining that a first subcarrier spacing (SCS) for a first transmission is 120 kilohertz or 240 kilohertz; means for identifying an extended cyclic prefix (ECP) associated with the first SCS; and means for encoding or decoding the first transmission, wherein the encoding or decoding the first transmission is based on the ECP.

Clause 73: An article of manufacture for use by a user equipment in a wireless communication network, the article comprising: a computer-readable medium having stored therein instructions executable by one or more processors of the user equipment to: determine that a first subcarrier spacing (SCS) for a first transmission is 120 kilohertz or 240 kilohertz; identify an extended cyclic prefix (ECP) associated with the first SCS; and encode or decoding the first transmission, wherein the encoding or decoding the first transmission is based on the ECP.

Clause 74: A method of wireless communication at a base station, the method comprising: specifying that a first subcarrier spacing (SCS) for a first transmission is 120 kilohertz or 240 kilohertz; identifying an extended cyclic prefix (ECP) associated with the first SCS; and encoding or decoding the first transmission, wherein the encoding or decoding the first transmission is based on the ECP.

Clause 75: The method of clause 74, wherein the first transmission is for a full-duplex communication between the base station and a user equipment.

Clause 76: The method of clause 74, further comprising: receiving an indication of a timing difference measured between a first timing for a downlink transmission received at a user equipment and a second timing for an uplink transmission received at the user equipment; and determining that the timing difference is greater than a length of a normal cyclic prefix (CP) for the first SCS; wherein the identifying the ECP associated with the first SCS comprises selecting the ECP after the determining that the timing difference is greater than the length of the normal CP for the first SCS.

Clause 77: The method of clause 74, further comprising: determining that the first transmission is for a full-duplex communication; wherein the identifying the ECP associated with the first SCS comprises selecting the ECP after the determining that the first transmission is for the full-duplex communication.

Clause 78: The method of clause 74, further comprising: transmitting a first indication of the first SCS to a user equipment; and transmitting a second indication of the ECP to the user equipment.

Clause 79: The method of clause 74, further comprising: receiving a request from a user equipment, wherein the request comprises at least one of: a request for a smaller SCS for full-duplex communication, a request to use an extended cyclic prefix (CP) instead of a normal CP for full-duplex communication, a request to switch to a different beam pair for full-duplex communication, a request for additional frequency domain separation for full-duplex communication, or a combination thereof.

Clause 80: The method of clause 74, further comprising: receiving an indication of a timing difference measured between a first timing for a downlink transmission received at a user equipment and a second timing for an uplink transmission received at the user equipment; determining that the timing difference is greater than a length of a normal cyclic prefix (CP) for the first SCS; and after the determining that the timing difference is greater than the length of the normal CP for the first SCS, performing at least one of: selecting a smaller SCS for full-duplex communication with the user equipment, selecting an extended CP instead of a normal CP for full-duplex communication with the user equipment, switching to a different beam pair for full-duplex communication with the user equipment, increasing a frequency domain separation for full-duplex communication with the user equipment, or a combination thereof.

Clause 81: A base station, comprising: a transceiver; a memory; and a processor communicatively coupled to the transceiver and the memory, wherein the processor and the memory are configured to: specify that a first subcarrier spacing (SCS) for a first transmission transmitted or received via the transceiver is 120 kilohertz or 240 kilohertz; identify an extended cyclic prefix (ECP) associated with the first SCS; and encode or decode the first transmission, wherein the encoding or decoding the first transmission is based on the ECP.

Clause 82: The base station of clause 81, wherein the first transmission is for a full-duplex communication between the base station and a user equipment.

Clause 83: The base station of clause 81, wherein the processor and the memory are further configured to: receive an indication of a timing difference measured between a first timing for a downlink transmission received at a user equipment and a second timing for an uplink transmission received at the user equipment; and determine that the timing difference is greater than a length of a normal cyclic prefix (CP) for the first SCS; wherein identification of the ECP associated with the first SCS comprises selection of the ECP after a determination that the timing difference is greater than the length of the normal CP for the first SCS.

Clause 84: The base station of clause 81, wherein the processor and the memory are further configured to: determine that the first transmission is for a full-duplex communication; wherein identification of the ECP associated with the first SCS comprises selection of the ECP after a determination that the first transmission is for the full-duplex communication.

Clause 85: The base station of clause 81, wherein the processor and the memory are further configured to: transmit a first indication of the first SCS to a user equipment; and transmit a second indication of the ECP to the user equipment.

Clause 86: The base station of clause 81, wherein the processor and the memory are further configured to: receive a request from a user equipment, wherein the request comprises at least one of: a request for a smaller SCS for full-duplex communication, a request to use an extended cyclic prefix (CP) instead of a normal CP for full-duplex communication, a request to switch to a different beam pair for full-duplex communication, a request for additional frequency domain separation for full-duplex communication, or a combination thereof.

Clause 87: The base station of clause 81, wherein the processor and the memory are further configured to: receive an indication of a timing difference measured between a first timing for a downlink transmission received at a user equipment and a second timing for an uplink transmission received at the user equipment; determine that the timing difference is greater than a length of a normal cyclic prefix (CP) for the first SCS; and after a determination that the timing difference is greater than the length of the normal CP for the first SCS, perform at least one of: select a smaller SCS for full-duplex communication with the user equipment, select an extended CP instead of a normal CP for full-duplex communication with the user equipment, switch to a different beam pair for full-duplex communication with the user equipment, increase a frequency domain separation for full-duplex communication with the user equipment, or a combination thereof.

Clause 88: A base station, comprising: means for specifying that a first subcarrier spacing (SCS) for a first transmission is 120 kilohertz or 240 kilohertz; means for identifying an extended cyclic prefix (ECP) associated with the first SCS; and means for encoding or decoding the first transmission, wherein the encoding or decoding the first transmission is based on the ECP.

Clause 89: An article of manufacture for use by a base station in a wireless communication network, the article comprising: a computer-readable medium having stored therein instructions executable by one or more processors of the base station to: specify that a first subcarrier spacing (SCS) for a first transmission is 120 kilohertz or 240 kilohertz; identify an extended cyclic prefix (ECP) associated with the first SCS; and encode or decode the first transmission, wherein the encoding or decoding the first transmission is based on the ECP.

Clause 90: A method of wireless communication at a user equipment, the method comprising: receiving a first indication from a base station; determining that the first indication specifies a first configurable extended cyclic prefix (ECP) to use for a first subcarrier spacing (SCS); and communicating with the base station using the first configurable ECP specified for the first SCS.

Clause 91: The method of clause 90, wherein the first indication further specifies a length of the first configurable ECP.

Clause 92: The method of clause 90, wherein the first indication further specifies that the first SCS is 120 kilohertz or 240 kilohertz.

Clause 93: The method of clause 90, wherein the receiving the first indication from the base station comprises:

receiving the first indication via a medium access control-control element (MAC-CE), a downlink control information (DCI), or a radio resource control (RRC) message.

Clause 94: The method of clause 90, further comprising: transmitting a request for the first configurable ECP to the base station prior to the receiving the first indication from the base station.

Clause 95: The method of clause 90, wherein the request comprises a request to use the first configurable ECP instead of a normal cyclic prefix for the first SCS.

Clause 96: The method of clause 90, wherein the request specifies a length of the first configurable ECP.

Clause 97: The method of clause 90, wherein the request specifies that the first SCS is 120 kilohertz or 240 kilohertz.

Clause 98: The method of clause 90, wherein the transmitting the request for the first configurable ECP to the base station comprises: transmitting the request via a medium access control-control element (MAC-CE), an uplink control information (UCI), or a radio resource control (RRC) message.

Clause 99: The method of clause 90, further comprising: measuring a timing difference between a first timing for a downlink transmission received at the user equipment and a second timing for an uplink transmission received at the user equipment; and determining that the timing difference is greater than a length of a normal cyclic prefix (CP) for the first SCS; wherein the transmitting the request for the first configurable ECP comprises transmitting the request after the determining that the timing difference is greater than the length of the normal CP for the first SCS.

Clause 100: The method of clause 90, further comprising: determining that the transmitting is for a full-duplex communication; wherein the transmitting the request for the first configurable ECP further comprises transmitting the request after the determining that the transmission is for the full-duplex communication.

Clause 101: The method of clause 90, further comprising: measuring a timing difference between a first timing for a downlink transmission received at the user equipment and a second timing for an uplink transmission received at the user equipment; determining that the timing difference is greater than a length of a normal cyclic prefix (CP) for the first SCS; and transmitting a request to the base station after the determining that the timing difference is greater than the length of the normal CP for the first SCS, wherein the request comprises at least one of: a request for a smaller SCS, a request to switch to a different beam pair, a request for additional frequency domain separation, or a combination thereof.

Clause 102: The method of clause 90, further comprising: measuring a timing difference between a first timing for a downlink transmission received at the user equipment and a second timing for an uplink transmission received at the user equipment; and transmitting an indication of the timing difference to the base station.

Clause 103: A user equipment, comprising: a transceiver; a memory; and a processor communicatively coupled to the transceiver and the memory, wherein the processor and the memory are configured to: receive a first indication from a base station via the transceiver; determine that the first indication specifies a first configurable extended cyclic prefix (ECP) to use for a first subcarrier spacing (SCS); and communicate with the base station via the transceiver using the first configurable ECP specified for the first SCS.

Clause 104: The user equipment of clause 103, wherein the first indication further specifies a length of the first configurable ECP.

Clause 105: The user equipment of clause 103, wherein the first indication further specifies that the first SCS is 120 kilohertz or 240 kilohertz.

Clause 106: The user equipment of clause 103, wherein the processor and the memory are further configured to: receive the first indication via a medium access control-control element (MAC-CE), a downlink control information (DCI), or a radio resource control (RRC) message.

Clause 107: The user equipment of clause 103, wherein the processor and the memory are further configured to: transmit a request for the first configurable ECP to the base station prior to the receiving the first indication from the base station.

Clause 108: The user equipment of clause 103, wherein the request comprises a request to use the first configurable ECP instead of a normal cyclic prefix for the first SCS.

Clause 109: The user equipment of clause 103, wherein the request specifies a length of the first configurable ECP.

Clause 110: The user equipment of clause 103, wherein the request specifies that the first SCS is 120 kilohertz or 240 kilohertz.

Clause 111: The user equipment of clause 103, wherein the processor and the memory are further configured to: transmit the request via a medium access control-control element (MAC-CE), an uplink control information (UCI), or a radio resource control (RRC) message.

Clause 112: The user equipment of clause 103, wherein the processor and the memory are further configured to: measure a timing difference between a first timing for a downlink transmission received at the user equipment and a second timing for an uplink transmission received at the user equipment; and determine that the timing difference is greater than a length of a normal cyclic prefix (CP) for the first SCS; wherein transmission of the request for the first configurable ECP comprises transmission of the request after a determination that the timing difference is greater than the length of the normal CP for the first SCS.

Clause 113: The user equipment of clause 103, wherein the processor and the memory are further configured to: determine that the transmission is for a full-duplex communication; wherein transmission of the request for the first configurable ECP comprises transmission of the request after a determination that the transmission is for the full-duplex communication.

Clause 114: The user equipment of clause 103, wherein the processor and the memory are further configured to: measure a timing difference between a first timing for a downlink transmission received at the user equipment and a second timing for an uplink transmission received at the user equipment; determine that the timing difference is greater than a length of a normal cyclic prefix (CP) for the first SCS; and transmit a request to the base station after the determining that the timing difference is greater than the length of the normal CP for the first SCS, wherein the request comprises at least one of: a request for a smaller SCS, a request to switch to a different beam pair, a request for additional frequency domain separation, or a combination thereof.

Clause 115: The user equipment of clause 103, wherein the processor and the memory are further configured to: measure a timing difference between a first timing for a downlink transmission received at the user equipment and a second timing for an uplink transmission received at the user equipment; and transmit an indication of the timing difference to the base station.

Clause 116: A user equipment, comprising: means for receiving a first indication from a base station; means for determining that the first indication specifies a first configurable extended cyclic prefix (ECP) to use for a first subcarrier spacing (SCS); and means for communicating with the base station using the first configurable ECP specified for the first SCS.

Clause 117: An article of manufacture for use by a user equipment in a wireless communication network, the article comprising: a computer-readable medium having stored therein instructions executable by one or more processors of the user equipment to: receive a first indication from a base station; determine that the first indication specifies a first configurable extended cyclic prefix (ECP) to use for a first subcarrier spacing (SCS); and communicate with the base station using the first configurable ECP specified for the first SCS.

Clause 118: A method of wireless communication at a base station, the method comprising: generating a first indication that specifies a first configurable extended cyclic prefix (ECP) to use for a first subcarrier spacing (SCS); transmitting the first indication to a user equipment; and communicating with the user equipment using the first configurable ECP specified for the first SCS.

Clause 119: The method of clause 118, wherein the first indication further specifies a length of the first configurable ECP.

Clause 120: The method of clause 118, wherein the first indication further specifies that the first SCS is 120 kilohertz or 240 kilohertz.

Clause 121: The method of clause 118, wherein the transmitting the first indication to the user equipment comprises: transmitting the first indication via a medium access control-control element (MAC-CE), a downlink control information (DCI), or a radio resource control (RRC) message.

Clause 122: The method of clause 118, further comprising: receiving a request for the first configurable ECP from the user equipment prior to the transmitting the first indication to the user equipment.

Clause 123: The method of clause 118, wherein the request comprises a request to use the first configurable ECP instead of a normal cyclic prefix for the first SCS.

Clause 124: The method of clause 118, wherein the request specifies a length of the first configurable ECP.

Clause 125: The method of clause 118, wherein the request specifies that the first SCS is 120 kilohertz or 240 kilohertz.

Clause 126: The method of clause 118, wherein the receiving the request for the first configurable ECP from the user equipment comprises: receiving the request via a medium access control-control element (MAC-CE), an uplink control information (UCI), or a radio resource control (RRC) message.

Clause 127: The method of clause 118, further comprising: receiving an indication of a timing difference measured between a first timing for a downlink transmission received at the user equipment and a second timing for an uplink transmission received at the user equipment; determining that the timing difference is greater than a length of a normal cyclic prefix (CP) for the first SCS; and selecting the first configurable ECP for the first SCS after the determining that the timing difference is greater than the length of the normal CP for the first SCS.

Clause 128: The method of clause 118, further comprising: specifying the first SCS for a full-duplex communication; and selecting the first configurable ECP for the first SCS after the specifying the first SCS for the full-duplex communication.

Clause 129: The method of clause 118, further comprising: receiving a request from the user equipment, wherein the request comprises at least one of: a request for a smaller SCS for full-duplex communication, a request to switch to a different beam pair for full-duplex communication, a request for additional frequency domain separation for full-duplex communication, or a combination thereof.

Clause 130: The method of clause 118, further comprising: receiving an indication of a timing difference measured between a first timing for a downlink transmission received at the user equipment and a second timing for an uplink transmission received at the user equipment; determining that the timing difference is greater than a length of a normal cyclic prefix (CP) for the first SCS; and after the determining that the timing difference is greater than the length of the normal CP for the first SCS, performing at least one of: selecting a smaller SCS for full-duplex communication with the user equipment, switching to a different beam pair for full-duplex communication with the user equipment, increasing a frequency domain separation for full-duplex communication with the user equipment, or a combination thereof.

Clause 140: A base station, comprising: a transceiver; a memory; and a processor communicatively coupled to the transceiver and the memory, wherein the processor and the memory are configured to: generate a first indication that specifies a first configurable extended cyclic prefix (ECP) to use for a first subcarrier spacing (SCS); transmit the first indication to a user equipment via the transceiver; and communicate with the user equipment via the transceiver using the first configurable ECP specified for the first SCS.

Clause 141: The base station of clause 140, wherein the first indication further specifies a length of the first configurable ECP.

Clause 142: The base station of clause 140, wherein the first indication further specifies that the first SCS is 120 kilohertz or 240 kilohertz.

Clause 143: The base station of clause 140, wherein the processor and the memory are further configured to: transmit the first indication via a medium access control-control element (MAC-CE), a downlink control information (DCI), or a radio resource control (RRC) message.

Clause 144: The base station of clause 140, wherein the processor and the memory are further configured to: receive a request for the first configurable ECP from the user equipment prior to the transmitting the first indication to the user equipment.

Clause 145: The base station of clause 140, wherein the request comprises a request to use the first configurable ECP instead of a normal cyclic prefix for the first SCS.

Clause 146: The base station of clause 140, wherein the request specifies a length of the first configurable ECP.

Clause 147: The base station of clause 140, wherein the request specifies that the first SCS is 120 kilohertz or 240 kilohertz.

Clause 148: The base station of clause 140, wherein the processor and the memory are further configured to: receive the request via a medium access control-control element (MAC-CE), an uplink control information (UCI), or a radio resource control (RRC) message.

Clause 149: The base station of clause 140, wherein the processor and the memory are further configured to: receive an indication of a timing difference measured between a first timing for a downlink transmission received at the user equipment and a second timing for an uplink transmission received at the user equipment; determine that the timing difference is greater than a length of a normal cyclic prefix (CP) for the first SCS; and select the first configurable ECP for the first SCS after the determining that the timing difference is greater than the length of the normal CP for the first SCS.

Clause 150: The base station of clause 140, wherein the processor and the memory are further configured to: specify the first SCS for a full-duplex communication; and select the first configurable ECP for the first SCS after the specifying the first SCS for the full-duplex communication.

Clause 151: The base station of clause 140, wherein the processor and the memory are further configured to: receive a request from the user equipment, wherein the request comprises at least one of: a request for a smaller SCS for full-duplex communication, a request to switch to a different beam pair for full-duplex communication, a request for additional frequency domain separation for full-duplex communication, or a combination thereof.

Clause 152: The base station of clause 140, wherein the processor and the memory are further configured to: receive an indication of a timing difference measured between a first timing for a downlink transmission received at the user equipment and a second timing for an uplink transmission received at the user equipment; determine that the timing difference is greater than a length of a normal cyclic prefix (CP) for the first SCS; and after determination that the timing difference is greater than the length of the normal CP for the first SCS, perform at least one of: select a smaller SCS for full-duplex communication with the user equipment, switch to a different beam pair for full-duplex communication with the user equipment, increase a frequency domain separation for full-duplex communication with the user equipment, or a combination thereof.

Clause 153: A base station, comprising: means for generating a first indication that specifies a first configurable extended cyclic prefix (ECP) to use for a first subcarrier spacing (SCS); means for transmitting the first indication to a user equipment; and means for communicating with the user equipment using the first configurable ECP specified for the first SCS.

Clause 154: An article of manufacture for use by a base station in a wireless communication network, the article comprising: a computer-readable medium having stored therein instructions executable by one or more processors of the base station to: generate a first indication that specifies a first configurable extended cyclic prefix (ECP) to use for a first subcarrier spacing (SCS); transmit the first indication to a user equipment; and communicate with the user equipment using the first configurable ECP specified for the first SCS.

Clause 155: A method of wireless communication at a user equipment, the method comprising: generating at least one request comprising at least one of: a request for a smaller subcarrier spacing (SCS) for full-duplex communication, a request for a switch from a first beam pair to a second beam pair for full-duplex communication, a request for additional frequency domain separation for full-duplex communication, or a combination thereof; transmitting the at least one request to a base station; and receiving at least one response to the at least one request from the base station, wherein the at least one response comprises at least one of: an indication of the smaller SCS, an indication of the switch from the first beam pair to the second beam pair, an indication of the additional frequency domain separation, or any combination thereof.

Clause 156: The method of clause 155, wherein the transmitting the at least one request comprises: transmitting the at least one request via at least one of: a medium access control-control element (MAC-CE), an uplink control information (UCI), a radio resource control (RRC) message, or a combination thereof.

Clause 157: The method of clause 155, wherein the receiving the at least one response comprises: receiving the at least one response via at least one of: a medium access control-control element (MAC-CE), a downlink control information (DCI), a radio resource control (RRC) message, or a combination thereof.

Clause 158: The method of clause 155, further comprising: identifying a particular SCS based on a timing difference measured between a first timing for a downlink transmission received at the user equipment and a second timing for an uplink transmission received at the user equipment; wherein the request for the smaller SCS comprises an indication of the particular SCS.

Clause 159: The method of clause 155, further comprising: identifying a particular beam pair based on a timing difference measured between a first timing for a downlink transmission received at the user equipment and a second timing for an uplink transmission received at the user equipment; wherein the request for the switch from the first beam pair to the second beam pair specifies the particular beam pair as the second beam pair.

Clause 160: The method of clause 155, further comprising: identifying a particular increase of frequency domain separation based on a timing difference measured between a first timing for a downlink transmission received at the user equipment and a second timing for an uplink transmission received at the user equipment; wherein the request for the additional frequency domain separation specifies the particular increase of the frequency domain separation.

Clause 161: The method of clause 155, wherein the particular increase of the frequency domain separation specifies at least one resource block.

Clause 162: The method of clause 155, wherein the request for the additional frequency domain separation requests: a smaller overlap between a transmit band and a receive band, or a larger guard band between a transmit band and a receive band.

Clause 163: The method of clause 155, wherein the request for the additional frequency domain separation specifies at least one of: a frequency domain location for the additional frequency domain separation, a particular overlap between a transmit band and a receive band, a particular guard band between a transmit band and a receive band, or a combination thereof.

Clause 164: The method of clause 155, further comprising: measuring timing difference between a first timing for a downlink transmission received at the user equipment and a second timing for an uplink transmission received at the user equipment; and determining that the timing difference is greater than a length of a normal cyclic prefix (CP); wherein the transmitting the at least one request comprises transmitting the at least one request after the determining that the timing difference is greater than the length of the normal CP.

Clause 165: The method of clause 155, further comprising: measuring a timing difference between a first timing for a downlink transmission received at the user equipment and a second timing for an uplink transmission received at the user equipment; determining that the timing difference is greater than a length of a normal cyclic prefix (CP); and transmitting a request to the base station after the determining that the timing difference is greater than the length of the normal CP, wherein the request comprises a request to use an extended CP instead of the normal CP.

Clause 166: The method of clause 155, further comprising: measuring a timing difference between a first timing for a downlink transmission received at the user equipment and a second timing for an uplink transmission received at the user equipment; and transmitting an indication of the timing difference to the base station.

Clause 167: A user equipment, comprising: a transceiver; a memory; and a processor communicatively coupled to the transceiver and the memory, wherein the processor and the memory are configured to: generate at least one request comprising at least one of: a request for a smaller subcarrier spacing (SCS) for full-duplex communication, a request for a switch from a first beam pair to a second beam pair for full-duplex communication, a request for additional frequency domain separation for full-duplex communication, or a combination thereof transmit the at least one request to a base station via the transceiver; and receive at least one response to the at least one request from the base station via the transceiver, wherein the at least one response comprises at least one of: an indication of the smaller SCS, an indication of the switch from the first beam pair to the second beam pair, an indication of the additional frequency domain separation, or any combination thereof.

Clause 168: The user equipment of clause 167, wherein the processor and the memory are further configured to: transmit the at least one request via at least one of: a medium access control-control element (MAC-CE), an uplink control information (UCI), a radio resource control (RRC) message, or a combination thereof.

Clause 169: The user equipment of clause 167, wherein the processor and the memory are further configured to: receive the at least one response via at least one of: a medium access control-control element (MAC-CE), a downlink control information (DCI), a radio resource control (RRC) message, or a combination thereof.

Clause 170: The user equipment of clause 167, wherein the processor and the memory are further configured to: identify a particular SCS based on a timing difference measured between a first timing for a downlink transmission received at the user equipment and a second timing for an uplink transmission received at the user equipment; wherein the request for the smaller SCS comprises an indication of the particular SCS.

Clause 171: The user equipment of clause 167, wherein the processor and the memory are further configured to: identify a particular beam pair based on a timing difference measured between a first timing for a downlink transmission received at the user equipment and a second timing for an uplink transmission received at the user equipment; wherein the request for the switch from the first beam pair to the second beam pair specifies the particular beam pair as the second beam pair.

Clause 172: The user equipment of clause 167, wherein the processor and the memory are further configured to: identify a particular increase of frequency domain separation based on a timing difference measured between a first timing for a downlink transmission received at the user equipment and a second timing for an uplink transmission received at the user equipment; wherein the request for the additional frequency domain separation specifies the particular increase of the frequency domain separation.

Clause 173: The user equipment of clause 167, wherein the particular increase of the frequency domain separation specifies at least one resource block.

Clause 174: The user equipment of clause 167, wherein the request for the additional frequency domain separation requests: a smaller overlap between a transmit band and a receive band, or a larger guard band between a transmit band and a receive band.

Clause 175: The user equipment of clause 167, wherein the request for the additional frequency domain separation specifies at least one of: a frequency domain location for the additional frequency domain separation, a particular overlap between a transmit band and a receive band, a particular guard band between a transmit band and a receive band, or a combination thereof.

Clause 176: The user equipment of clause 167, wherein the processor and the memory are further configured to: measure a timing difference between a first timing for a downlink transmission received at the user equipment and a second timing for an uplink transmission received at the user equipment; and determine that the timing difference is greater than a length of a normal cyclic prefix (CP); wherein transmission of the at least one request comprises transmission of the at least one request after a determination that the timing difference is greater than the length of the normal CP.

Clause 177: The user equipment of clause 167, wherein the processor and the memory are further configured to: measure a timing difference between a first timing for a downlink transmission received at the user equipment and a second timing for an uplink transmission received at the user equipment; determine that the timing difference is greater than a length of a normal cyclic prefix (CP); and transmit a request to the base station after a determination that the timing difference is greater than the length of the normal CP, wherein the request comprises a request to use an extended CP instead of the normal CP.

Clause 178: The user equipment of clause 167, wherein the processor and the memory are further configured to: measure a timing difference between a first timing for a downlink transmission received at the user equipment and a second timing for an uplink transmission received at the user equipment; and transmit an indication of the timing difference to the base station.

Clause 179: A user equipment, comprising: means for generating at least one request comprising at least one of: a request for a smaller subcarrier spacing (SCS) for full-duplex communication, a request for a switch from a first beam pair to a second beam pair for full-duplex communication, a request for additional frequency domain separation for full-duplex communication, or a combination thereof; and means for transmitting the at least one request to a base station; and means for receiving at least one response to the at least one request from the base station, wherein the at least one response comprises at least one of: an indication of the smaller SCS, an indication of the switch from the first beam pair to the second beam pair, an indication of the additional frequency domain separation, or any combination thereof.

Clause 180: An article of manufacture for use by a user equipment in a wireless communication network, the article comprising: a computer-readable medium having stored therein instructions executable by one or more processors of the user equipment to: generate at least one request comprising at least one of: a request for a smaller subcarrier spacing (SCS) for full-duplex communication, a request for a switch from a first beam pair to a second beam pair for full-duplex communication, a request for additional frequency domain separation for full-duplex communication, or a combination thereof; and transmit the at least one request to a base station; and receive at least one response to the at least one request from the base station, wherein the at least one response comprises at least one of: an indication of the smaller SCS, an indication of the switch from the first beam pair to the second beam pair, an indication of the additional frequency domain separation, or any combination thereof.

Clause 181: A method of wireless communication at a base station, the method comprising: selecting for full-duplex communication with a user equipment at least one of: a smaller subcarrier spacing (SCS), a switch from a first beam pair to a second beam pair, an additional frequency domain separation, or any combination thereof; and transmitting at least one indication of the selecting to the user equipment.

Clause 182: The method of clause 181, wherein the transmitting the at least one indication comprises: transmitting the at least one indication via a medium access control-control element (MAC-CE), a downlink control information (DCI), or a radio resource control (RRC) message.

Clause 183: The method of clause 181, further comprising: receiving at least one request from the user equipment, wherein the at least one request comprises at least one of: a request for the smaller SCS, a request for the switch from the first beam pair to the second beam pair, a request for the additional frequency domain separation, or a combination thereof.

Clause 184: The method of clause 181, wherein the receiving the at least one request from the user equipment comprises: receiving the at least one request via a medium access control-control element (MAC-CE), an uplink control information (UCI), or a radio resource control (RRC) message.

Clause 185: The method of clause 181, further comprising: receiving a request to use a particular SCS from the user equipment; wherein the selecting comprises electing to use the particular SCS after receiving the request; and wherein the at least one indication specifies that the particular SCS will be used for the full-duplex communication.

Clause 186: The method of clause 181, further comprising: receiving a request to use a particular beam pair from the user equipment; wherein the selecting comprises electing to use the particular beam pair after receiving the request; wherein the at least one indication specifies that the particular beam pair will be used for the full-duplex communication.

Clause 187: The method of clause 181, further comprising: receiving a request to use a particular increase of the frequency domain separation from the user equipment; wherein the selecting comprises electing to use the particular increase of the frequency domain separation after receiving the request; wherein the at least one indication specifies that the particular increase of the frequency domain separation will be used for the full-duplex communication.

Clause 188: The method of clause 181, wherein the particular increase of the frequency domain separation specifies at least one resource block.

Clause 189: The method of clause 181, further comprising: receiving a request from the user equipment, wherein the request comprises a request for a smaller overlap between a transmit band and a receive band, or a request for a larger guard band between a transmit band and a receive band; wherein the selecting comprises electing to use the smaller overlap or the larger guard band after receiving the request; wherein the at least one indication specifies that the smaller overlap or the larger guard band will be used for the full-duplex communication.

Clause 190: The method of clause 181, further comprising: receiving a request from the user equipment, wherein the request specifies at least one of: a frequency domain location for the additional frequency domain separation, a particular overlap between a transmit band and a receive band, a particular guard band between a transmit band and a receive band, or a combination thereof; wherein the selecting comprises electing to use at least one of the frequency domain location, the particular overlap, the particular guard band, or a combination thereof, after receiving the request; wherein the at least one indication specifies that at least one of the frequency domain location, the particular overlap, the particular guard band, or a combination thereof, will be used for the full-duplex communication.

Clause 191: The method of clause 181, further comprising: receiving an indication of a timing difference measured between a first timing for a downlink transmission received at the user equipment and a second timing for an uplink transmission received at the user equipment; determining that the timing difference is greater than a length of a normal cyclic prefix (CP); and triggering the selecting based on the determining that the timing difference is greater than the length of the normal CP.

Clause 192: The method of clause 181, further comprising: receiving a request from the user equipment, wherein the request comprises a request to use an extended cyclic prefix (CP) instead of a normal CP; electing to use the extended CP instead of the normal CP after receiving the request; and transmitting an indication to the user equipment after the electing to use the extended CP, wherein the indication specifies that the extended CP will be used instead of the normal CP.

Clause 193: The method of clause 181, further comprising: receiving an indication of a timing difference measured between a first timing for a downlink transmission received at the user equipment and a second timing for an uplink transmission received at the user equipment; determining that the timing difference is greater than a length of a normal cyclic prefix (CP); and electing to use an extended CP instead of the normal CP after the determining that the timing difference is greater than the length of the normal CP.

Clause 194: A base station, comprising: a transceiver; a memory; and a processor communicatively coupled to the transceiver and the memory, wherein the processor and the memory are configured to: select for full-duplex communication with a user equipment at least one of: a smaller subcarrier spacing (SCS), a switch from a first beam pair to a second beam pair, an additional frequency domain separation, or any combination thereof; and transmit at least one indication of the selecting to the user equipment via the transceiver.

Clause 195: The base station of clause 194, wherein the processor and the memory are further configured to: transmit the at least one indication via a medium access control-control element (MAC-CE), a downlink control information (DCI), or a radio resource control (RRC) message.

Clause 196: The base station of clause 194, wherein the processor and the memory are further configured to: receive at least one request from the user equipment, wherein the at least one request comprises at least one of: a request for the smaller SCS, a request for the switch from the first beam pair to the second beam pair, a request for the additional frequency domain separation, or a combination thereof.

Clause 197: The base station of clause 194, wherein the processor and the memory are further configured to: receive the at least one request via a medium access control-control element (MAC-CE), an uplink control information (UCI), or a radio resource control (RRC) message.

Clause 198: The base station of clause 194, wherein the processor and the memory are further configured to: receive a request to use a particular SCS from the user equipment;

and elect to use the particular SCS after receipt of the request; wherein the at least one indication specifies that the particular SCS will be used for the full-duplex communication.

Clause 199: The base station of clause 194, wherein the processor and the memory are further configured to: receive a request to use a particular beam pair from the user equipment; and elect to use the particular beam pair after receipt of the request; wherein the at least one indication specifies that the particular beam pair will be used for the full-duplex communication.

Clause 200: The base station of clause 194, wherein the processor and the memory are further configured to: receive a request to use a particular increase of the frequency domain separation from the user equipment; and elect to use the particular increase of the frequency domain separation after receipt of the request; wherein the at least one indication specifies that the particular increase of the frequency domain separation will be used for the full-duplex communication.

Clause 201: The base station of clause 194, wherein the particular increase of the frequency domain separation specifies at least one resource block.

Clause 202: The base station of clause 194, wherein the processor and the memory are further configured to: receive a request from the user equipment, wherein the request comprises a request for a smaller overlap between a transmit band and a receive band, or a request for a larger guard band between a transmit band and a receive band; and elect to use the smaller overlap or the larger guard band after receipt of the request; wherein the at least one indication specifies that the smaller overlap or the larger guard band will be used for the full-duplex communication.

Clause 203: The base station of clause 194, wherein the processor and the memory are further configured to: receive a request from the user equipment, wherein the request specifies at least one of: a frequency domain location for the additional frequency domain separation, a particular overlap between a transmit band and a receive band, a particular guard band between a transmit band and a receive band, or a combination thereof; and elect to use at least one of the frequency domain location, the particular overlap, the particular guard band, or a combination thereof, after receipt of the request; wherein the at least one indication specifies that at least one of the frequency domain location, the particular overlap, the particular guard band, or a combination thereof, will be used for the full-duplex communication.

Clause 204: The base station of clause 194, wherein the processor and the memory are further configured to: receive an indication of a timing difference measured between a first timing for a downlink transmission received at the user equipment and a second timing for an uplink transmission received at the user equipment; determine that the timing difference is greater than a length of a normal cyclic prefix (CP); and trigger the selecting based on a determination that the timing difference is greater than the length of the normal CP.

Clause 205: The base station of clause 194, wherein the processor and the memory are further configured to: receive a request from the user equipment, wherein the request comprises a request to use an extended cyclic prefix (CP) instead of a normal CP; elect to use the extended CP instead of the normal CP after receipt of the request; and transmit an indication to the user equipment after an election to use the extended CP, wherein the indication specifies that the extended CP will be used instead of the normal CP.

Clause 206: The base station of clause 194, wherein the processor and the memory are further configured to: receive an indication of a timing difference measured between a first timing for a downlink transmission received at the user equipment and a second timing for an uplink transmission received at the user equipment; determine that the timing difference is greater than a length of a normal cyclic prefix (CP); and elect to use an extended CP instead of the normal CP after a determination that the timing difference is greater than the length of the normal CP.

Clause 207: A base station, comprising: means for selecting for full-duplex communication with a user equipment at least one of: a smaller subcarrier spacing (SCS), a switch from a first beam pair to a second beam pair, an additional frequency domain separation, or any combination thereof; and means for transmitting at least one indication of the selecting to the user equipment.

Clause 208: An article of manufacture for use by a base station in a wireless communication network, the article comprising: a computer-readable medium having stored therein instructions executable by one or more processors of the base station to: select for full-duplex communication with a user equipment at least one of: a smaller subcarrier spacing (SCS), a switch from a first beam pair to a second beam pair, an additional frequency domain separation, or any combination thereof; and transmit at least one indication of the selecting to the user equipment.

Clause 209: A method, an apparatus, a computer program product, a non-transitory computer-readable medium, a user equipment, a base station, a node, a wireless communication device, and a processing system as substantially described herein with reference to and as illustrated by the specification and drawings.

ADDITIONAL CONSIDERATIONS

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-25 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in any of FIGS. 1-25 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A user equipment (UE) configured for full-duplex (FD) wireless communication, the UE comprising:
   one or more memories; and
   one or more processors coupled to the one or more memories, the one or more processors configured to:
   transmit, to a base station (BS), a request to modify one or more parameters for FD communication between the UE and one or more BSs that include the BS,
   wherein the request is based on the one or more parameters causing a difference in time to be greater than a threshold,
   wherein the difference in time is between (i) a start of reception at the UE of energy from an uplink transmission transmitted by the UE, and (ii) a start of reception at the UE of a downlink transmission from at least one of the one or more BSs,
   wherein the uplink transmission and the downlink transmission correspond to a same scheduled time resource; and
   communicate with the one or more BSs using one or more modified parameters based on the request.

2. The UE of claim 1, wherein the threshold comprises a cyclic prefix (CP) length as defined by the one or more parameters.

3. The UE of claim 1, wherein the reception at the UE of the energy from the uplink transmission transmitted by the UE comprises reception at one or more antenna panels of the UE of the energy of the uplink transmission transmitted by the UE, and wherein the reception at the UE of the downlink transmission from the at least one of the one or more BSs comprises reception at the one or more antenna panels of the UE of the downlink transmission from the at least one of the one or more BSs.

4. The UE of claim 1, wherein the one or more parameters comprise one or more of: a sub-carrier spacing (SCS), a duration of a cyclic prefix (CP), a downlink and uplink beam pair for FD communication, or a frequency domain separation between the uplink transmission and the downlink transmission for FD communication.

5. The UE of claim 1, wherein the request to modify the one or more parameters comprises a request to reduce a sub-carrier spacing (SCS) used for FD communication.

6. The UE of claim 1, wherein the request to modify the one or more parameters comprises a request to increase a duration of a cyclic prefix (CP).

7. The UE of claim 6, wherein a sub-carrier spacing (SCS) defined in the one or more parameters is greater than 60 kHz.

8. The UE of claim 6, wherein the request to increase the duration of the CP comprises a request to use an extended CP (ECP).

9. The UE of claim 1, wherein the request to modify the one or more parameters comprises a request to change a downlink and uplink beam pair used for FD communication.

10. The UE of claim 1, wherein the request to modify the one or more parameters comprises a request to increase frequency domain separation between the uplink transmission and the downlink transmission for FD communication.

11. The UE of claim 10, wherein the request comprises an amount to increase the frequency domain separation as a guard band.

12. The UE of claim 1, wherein the request to modify the one or more parameters is transmitted via one or more of a medium access control-control element (MAC-CE), an uplink control information (UCI), or a radio resource control (RRC) message.

13. The UE of claim 1, wherein the one or more processors are further configured to receive, from the BS, the one or more modified parameters.

14. A base station (BS) configured for full-duplex (FD) wireless communication, the BS comprising:
   one or more memories; and
   one or more processors coupled to the one or more memories, the one or more processors configured to:

receive, from a user equipment (UE), a request to modify one or more parameters for FD communication between the UE and one or more BSs that include the BS,
    wherein the request is based on the one or more parameters causing a difference in time to be greater than a threshold,
    wherein the difference in time is between (i) a start of reception at the UE of energy from an uplink transmission transmitted by the UE, and (ii) a start of reception at the UE of a downlink transmission from at least one of the one or more BSs,
    wherein the uplink transmission and the downlink transmission correspond to a same scheduled time resource; and
one or more of:
    transmit, in response to the request, one or more modified parameters to another BS of the one or more BSs, the one or more modified parameters indicating a parameter for FD communication between the UE and the other BS; or
    communicate with the UE using the one or more modified parameters.

15. The BS of claim 14, wherein the threshold comprises a cyclic prefix (CP) length as defined by the one or more parameters.

16. The BS of claim 14, wherein the reception at the UE of the energy from the uplink transmission transmitted by the UE comprises reception at one or more antenna panels of the UE of the uplink transmission transmitted by the UE, and wherein the reception at the UE of the downlink transmission from the at least one of the one or more BSs comprises reception at the one or more antenna panels of the UE of the downlink transmission from the at least one of the one or more BSs.

17. The BS of claim 14, wherein the one or more parameters comprise one or more of: a sub-carrier spacing (SCS), a duration of a cyclic prefix (CP), a downlink and uplink beam pair for FD communication, or a frequency domain separation between the uplink transmission and the downlink transmission for FD communication.

18. The BS of claim 14, wherein the request to modify the one or more parameters comprises a request to reduce a sub-carrier spacing (SCS) used for FD communication.

19. The BS of claim 14, wherein the request to modify the one or more parameters comprises a request to increase a duration of a cyclic prefix (CP).

20. The BS of claim 19, wherein a sub-carrier spacing (SCS) defined in the one or more parameters is greater than 60 kHz.

21. The BS of claim 19, wherein the request to increase the duration of the CP comprises a request to use an extended CP (ECP).

22. The BS of claim 14, wherein the request to modify the one or more parameters comprises a request to change a downlink and uplink beam pair used for FD communication.

23. The BS of claim 14, wherein the request to modify the one or more parameters comprises a request to increase frequency domain separation between the uplink transmission and the downlink transmission for FD communication.

24. The BS of claim 23, wherein the request comprises an amount to increase the frequency domain separation as a guard band.

25. The BS of claim 14, wherein the request to modify the one or more parameters is received via one or more of a medium access control-control element (MAC-CE), an uplink control information (UCI), or a radio resource control (RRC) message.

26. The BS of claim 14, wherein the one or more processors are further configured to transmit, to the UE, an indication of the one or more modified parameters based on the request.

27. A method of full-duplex (FD) wireless communication by a user equipment (UE), the method comprising:
    transmitting, to a base station (BS), a request to modify one or more parameters for FD communication between the UE and one or more BSs that include the BS,
        wherein the request is based on the one or more parameters causing a difference in time to be greater than a threshold,
        wherein the difference in time is between (i) a start of reception at the UE of energy from an uplink transmission transmitted by the UE, and (ii) a start of reception at the UE of a downlink transmission from at least one of the one or more BSs,
        wherein the uplink transmission and the downlink transmission correspond to a same scheduled time resource; and
    communicating with the one or more BSs using one or more modified parameters based on the request.

28. A method of full-duplex (FD) wireless communication by a base station (BS), the method comprising:
    receiving, from a user equipment (UE), a request to modify one or more parameters for FD communication between the UE and one or more BSs that include the BS,
        wherein the request is based on the one or more parameters causing a difference in time to be greater than a threshold,
        wherein the difference in time is between (i) a start of reception at the UE of energy from an uplink transmission transmitted by the UE, and (ii) a start of reception at the UE of a downlink transmission from at least one of the one or more BSs,
        wherein the uplink transmission and the downlink transmission correspond to a same scheduled time resource; and
    one or more of:
        transmitting, in response to the request, one or more modified parameters to another BS of the one or more BSs, the one or more modified parameters indicating a parameter for FD communication between the UE and the other BS; or
        communicating with the UE using the one or more modified parameters.

29. The UE of claim 3, wherein the reception at the UE of the downlink transmission from the at least one of the one or more BSs comprises reception at a first antenna panel of the UE of the downlink transmission from the at least one of the one or more BSs, and wherein the reception at the UE of the energy from the uplink transmission transmitted by the UE comprises reception at a second antenna panel of the UE of the energy of the uplink transmission transmitted by the UE.

30. The method of claim 27, wherein the reception at the UE of the energy from the uplink transmission transmitted by the UE comprises reception at one or more antenna panels of the UE of the energy of the uplink transmission transmitted by the UE, and wherein the reception at the UE of the downlink transmission from the at least one of the one or more BSs comprises reception at the one or more antenna panels of the UE of the downlink transmission from the at least one of the one or more BSs.

\* \* \* \* \*